US012201154B2

(12) United States Patent
Chong et al.

(10) Patent No.: US 12,201,154 B2
(45) **Date of Patent: *Jan. 21, 2025**

(54) HEAT-NOT-BURN DEVICE AND METHOD

(71) Applicant: CQENS Technologies Inc., Minneapolis, MN (US)

(72) Inventors: Alexander Chinhak Chong, St. Louis Park, MN (US); William Bartkowski, Edina, MN (US); David Crosby, Watsonville, CA (US); David Wayne, Aptos, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 17/694,518

(22) Filed: Mar. 14, 2022

(65) Prior Publication Data

US 2022/0202091 A1 Jun. 30, 2022

Related U.S. Application Data

(60) Division of application No. 16/958,655, filed as application No. PCT/US2019/012204 on Jan. 3,
(Continued)

(51) Int. Cl.
*A24F 47/00* (2020.01)
*A24D 3/10* (2006.01)
(Continued)

(52) U.S. Cl.
CPC .............. *A24F 40/465* (2020.01); *A24D 3/10* (2013.01); *A24F 40/51* (2020.01); *A24F 40/57* (2020.01);
(Continued)

(58) Field of Classification Search
CPC ..................................................... A24F 40/465
See application file for complete search history.

(56) References Cited

U.S. PATENT DOCUMENTS

| | | | |
|---|---|---|---|
| 2,991,788 | A | 7/1961 | Brost |
| 3,292,634 | A | 12/1966 | Beucler |

(Continued)

FOREIGN PATENT DOCUMENTS

| | | | |
|---|---|---|---|
| AU | 2015261876 | A1 | 7/2016 |
| AU | 2015261877 | A1 | 7/2016 |

(Continued)

OTHER PUBLICATIONS

Patent Cooperation Treaty, "Notification of Transmittal of the International Search Report and the Written Opinion of the International Searching Authority or the Declaration," PCT/US22022/39794, Dec. 22, 2022, 22 pages.

(Continued)

*Primary Examiner* — Eric Yaary
(74) *Attorney, Agent, or Firm* — Cislo & Thomas, LLP

(57) ABSTRACT

A device for converting a consumable into an aerosol with high heat without burning the consumable by packaging the consumable containing an internal susceptor inside an encasement having a plurality of holes with an induction heating element wrapped around the consumable-containing package to heat the susceptor using a magnetic field generated by the induction heating element. Combustion of the consumable-containing package can be minimized by limiting air inside the consumable-containing package by coating the encasement material that melts at high temperatures. The coating may also include a flavoring. Efficiency of the device can be enhanced with a self-resonant oscillator, moving coils, multi-prong susceptors, sensors, heat dissipation, air flow control, alignment mechanisms, and the like.

20 Claims, 42 Drawing Sheets

Related U.S. Application Data

2019, now Pat. No. 11,272,741, which is a continuation-in-part of application No. 16/022,482, filed on Jun. 28, 2018, now Pat. No. 10,750,787.

(60) Provisional application No. 62/613,355, filed on Jan. 3, 2018.

(51) Int. Cl.

| | |
|---|---|
| ***A24F 40/465*** | (2020.01) |
| ***A24F 40/51*** | (2020.01) |
| ***A24F 40/57*** | (2020.01) |
| ***A24F 40/70*** | (2020.01) |
| ***H05B 6/10*** | (2006.01) |
| ***H05B 6/44*** | (2006.01) |

(52) U.S. Cl.

CPC ............ *A24F 40/70* (2020.01); *H05B 6/105* (2013.01); *H05B 6/44* (2013.01)

(56) References Cited

U.S. PATENT DOCUMENTS

| | | | |
|---|---|---|---|
| 3,765,428 | A | 10/1973 | Beam |
| 3,834,399 | A | 9/1974 | Beam |
| 4,800,247 | A | 1/1989 | Schneider et al. |
| 4,864,089 | A | 9/1989 | Tighe et al. |
| 5,129,409 | A | 7/1992 | White et al. |
| 5,338,921 | A | 8/1994 | Maheux et al. |
| 5,613,505 | A | 3/1997 | Campbell |
| 9,399,110 | B2 | 7/2016 | Goodman et al. |
| 9,675,109 | B2 | 6/2017 | Monsees |
| 9,717,277 | B2 | 8/2017 | Mironov |
| 9,888,719 | B2 | 2/2018 | Cadieux et al. |
| 9,894,936 | B2 | 2/2018 | Krietzman |
| 9,913,950 | B2 | 3/2018 | Goodman et al. |
| 10,051,890 | B2 | 8/2018 | Mironov et al. |
| 10,104,912 | B2 | 10/2018 | Sur |
| 10,362,804 | B2 | 7/2019 | Bessant et al. |
| 10,362,806 | B2 | 7/2019 | Cadieux et al. |
| 10,499,690 | B2 | 12/2019 | Thorens |
| 10,524,508 | B2 | 1/2020 | Sur et al. |
| 10,588,347 | B2 | 3/2020 | Malgat et al. |
| 10,660,368 | B2 | 5/2020 | Thorens |
| 10,820,630 | B2 | 11/2020 | Davis et al. |
| 10,863,770 | B2 | 12/2020 | Mironov et al. |
| 10,869,504 | B2 | 12/2020 | Mironov et al. |
| 10,893,582 | B1 | 1/2021 | Watkins |
| 10,918,135 | B2 | 2/2021 | Thorens |
| 10,945,456 | B2 | 3/2021 | Mironov et al. |
| 10,945,466 | B2 | 3/2021 | Mironov et al. |
| 10,952,469 | B2 | 3/2021 | Mironov |
| 10,952,472 | B2 | 3/2021 | Thorens |
| 10,966,462 | B2 | 4/2021 | Alarcon et al. |
| 10,986,869 | B2 | 4/2021 | Zinovik et al. |
| 11,019,848 | B2 | 6/2021 | Rojo-Calderon |
| 11,033,055 | B2 | 6/2021 | Fraser et al. |
| 11,058,141 | B2 | 7/2021 | Sanna et al. |
| 11,083,213 | B2 | 8/2021 | Malgat et al. |
| 11,116,916 | B2 | 9/2021 | Thorens |
| 11,116,920 | B2 | 9/2021 | Thorens |
| 11,140,923 | B2 | 10/2021 | Courbat et al. |
| 11,141,548 | B2 | 10/2021 | Ballesteros Gomez et al. |
| 11,160,309 | B2 | 11/2021 | Mironov et al. |
| 2004/0025865 | A1 | 2/2004 | Nichols et al. |
| 2004/0045546 | A1 | 3/2004 | Hirsh |
| 2006/0032496 | A1 | 2/2006 | Hale |
| 2006/0049190 | A1 | 3/2006 | Middleton |
| 2006/0108359 | A1 | 5/2006 | Brough |
| 2007/0045288 | A1 | 3/2007 | Nelson |
| 2008/0156319 | A1 | 7/2008 | Avni |
| 2010/0059070 | A1 | 3/2010 | Potter et al. |
| 2011/0162187 | A1 | 7/2011 | Patel |
| 2011/0277780 | A1 | 11/2011 | Terry |
| 2012/0298123 | A1 | 11/2012 | Woodcock et al. |
| 2012/0325226 | A1 | 12/2012 | Snaidr et al. |
| 2014/0360515 | A1 | 12/2014 | Vasiliev et al. |
| 2015/0040925 | A1 | 2/2015 | Saleem et al. |
| 2015/0245669 | A1 | 9/2015 | Cadieux et al. |
| 2015/0320116 | A1 | 11/2015 | Bleloch et al. |
| 2016/0044963 | A1 | 2/2016 | Saleem |
| 2016/0135495 | A1 | 5/2016 | Poget et al. |
| 2016/0150825 | A1 | 6/2016 | Mironov et al. |
| 2016/0211693 | A1 | 7/2016 | Stevens et al. |
| 2016/0295921 | A1 | 10/2016 | Mironov et al. |
| 2016/0295922 | A1 | 10/2016 | John et al. |
| 2016/0324216 | A1 | 11/2016 | Li et al. |
| 2016/0325055 | A1 | 11/2016 | Cameron |
| 2017/0027233 | A1 | 2/2017 | Mironov |
| 2017/0055584 | A1 | 3/2017 | Blandino et al. |
| 2017/0055585 | A1 | 3/2017 | Fursa et al. |
| 2017/0055587 | A1 | 3/2017 | Zinovik et al. |
| 2017/0079326 | A1 | 3/2017 | Mironov |
| 2017/0079330 | A1 | 3/2017 | Mironov et al. |
| 2017/0119047 | A1 | 5/2017 | Blandino |
| 2017/0119048 | A1 | 5/2017 | Kaufman et al. |
| 2017/0156403 | A1 | 6/2017 | Gill et al. |
| 2017/0245550 | A1 | 8/2017 | Freelander |
| 2017/0251723 | A1 | 9/2017 | Kobal et al. |
| 2017/0280779 | A1 | 10/2017 | Qiu |
| 2017/0311648 | A1 | 11/2017 | Gill et al. |
| 2017/0340010 | A1 | 11/2017 | Bilat et al. |
| 2018/0007974 | A1 | 1/2018 | Thorens |
| 2018/0020733 | A1 | 1/2018 | Jochnowitz |
| 2018/0029782 | A1 | 2/2018 | Zuber et al. |
| 2018/0192700 | A1 | 7/2018 | Fraser et al. |
| 2018/0263286 | A1 | 9/2018 | Reevell |
| 2019/0008206 | A1 | 1/2019 | Gimkiewicz et al. |
| 2019/0045837 | A1 | 2/2019 | Spencer |
| 2019/0053535 | A1 | 2/2019 | Apetrei Birza |
| 2019/0075845 | A1 | 3/2019 | Malgat et al. |
| 2019/0098927 | A1 | 4/2019 | Mironov |
| 2019/0182909 | A1 | 6/2019 | Fursa et al. |
| 2019/0200677 | A1 | 7/2019 | Chong et al. |
| 2019/0269174 | A1 | 9/2019 | Robert et al. |
| 2019/0281892 | A1 | 9/2019 | Hejazi et al. |
| 2019/0364973 | A1 | 12/2019 | Kaufman et al. |
| 2019/0380391 | A1 | 12/2019 | Reevell |
| 2019/0387787 | A1 | 12/2019 | Hejazi |
| 2020/0037664 | A1 | 2/2020 | Fursa et al. |
| 2020/0060348 | A1 | 2/2020 | Mironov et al. |
| 2020/0128878 | A1 | 4/2020 | Stura et al. |
| 2020/0138098 | A1 | 5/2020 | Mironov et al. |
| 2020/0163384 | A1 | 5/2020 | Rossoll et al. |
| 2020/0163386 | A1 | 5/2020 | Courbat et al. |
| 2020/0170300 | A1 | 6/2020 | Gill |
| 2020/0229497 | A1 | 7/2020 | Aoun et al. |
| 2020/0236999 | A1 | 7/2020 | Mironov et al. |
| 2020/0329760 | A1 | 10/2020 | Gonzalez Florez et al. |
| 2020/0367565 | A1 | 11/2020 | Batista |
| 2021/0045455 | A1 | 2/2021 | Davis et al. |
| 2021/0106046 | A1 | 4/2021 | Courbat et al. |
| 2021/0137170 | A1 | 5/2021 | Taurino et al. |
| 2021/0145057 | A1 | 5/2021 | Reevell |
| 2021/0145061 | A1 | 5/2021 | Fursa et al. |
| 2021/0145062 | A1 | 5/2021 | Courbat et al. |
| 2021/0145071 | A1 | 5/2021 | Butin et al. |
| 2021/0153547 | A1 | 5/2021 | Thorens |
| 2021/0161208 | A1 | 6/2021 | Mironov et al. |
| 2021/0204604 | A1 | 7/2021 | Mironov et al. |
| 2021/0219617 | A1 | 7/2021 | Lee et al. |
| 2021/0219618 | A1 | 7/2021 | Fernando et al. |
| 2021/0251287 | A1 | 8/2021 | Emmett et al. |
| 2021/0298360 | A1 | 9/2021 | Acconcia et al. |
| 2021/0315278 | A1 | 10/2021 | Fraser et al. |
| 2021/0329964 | A1 | 10/2021 | Deforel et al. |
| 2021/0345659 | A1 | 11/2021 | Arndt et al. |
| 2021/0345674 | A1 | 11/2021 | Emmett et al. |

(56) References Cited

U.S. PATENT DOCUMENTS

| | | | |
|---|---|---|---|
| 2022/0175040 A1 | 6/2022 | Spencer et al. | |
| 2024/0114955 A1 | 4/2024 | Emmett | |

FOREIGN PATENT DOCUMENTS

| | | | |
|---|---|---|---|
| AU | 2015261887 | A1 | 7/2016 |
| AU | 2015263436 | A1 | 9/2016 |
| AU | 2015222843 | A1 | 10/2016 |
| AU | 2016286401 | A1 | 1/2018 |
| AU | 2017320216 | A1 | 12/2018 |
| AU | 2017301985 | A1 | 2/2019 |
| AU | 2018219468 | A1 | 9/2019 |
| AU | 2019222811 | A1 | 9/2019 |
| AU | 2019261824 | A1 | 12/2019 |
| AU | 2019356134 | A1 | 2/2021 |
| AU | 2019358424 | A1 | 4/2021 |
| AU | 2020235790 | A1 | 9/2021 |
| AU | 2020281604 | A1 | 9/2021 |
| AU | 2020235315 | A1 | 10/2021 |
| AU | 2020235462 | A1 | 10/2021 |
| BR | 112019026139 | A2 | 6/2020 |
| BR | 112021001594 | A2 | 4/2021 |
| CA | 2937065 | A1 | 11/2015 |
| CA | 2937719 | A1 | 11/2015 |
| CA | 3014594 | A1 | 8/2017 |
| CA | 3021251 | A1 | 10/2017 |
| CA | 3014149 | A1 | 12/2017 |
| CA | 3026992 | A1 | 3/2018 |
| CA | 3032879 | A1 | 5/2018 |
| CA | 3041012 | A1 | 8/2018 |
| CA | 3074883 | A1 | 3/2019 |
| CA | 3108453 | A1 | 4/2020 |
| CA | 3111358 | A1 | 4/2020 |
| CA | 3132230 | A1 | 9/2020 |
| CA | 3132765 | A1 | 9/2020 |
| CA | 3133067 | A1 | 9/2020 |
| CA | 3132105 | A1 | 12/2020 |
| CH | 707222 | | 5/2014 |
| CN | 104095291 | | 10/2014 |
| CN | 104095291 | A | 10/2014 |
| CN | 104664608 | | 6/2015 |
| CN | 105263346 | A | 1/2016 |
| CN | 204949521 | | 1/2016 |
| CN | 105407750 | A | 3/2016 |
| CN | 105764367 | A | 7/2016 |
| CN | 205648931 | | 10/2016 |
| CN | 106163309 | A | 11/2016 |
| CN | 106455704 | A | 2/2017 |
| CN | 106455715 | A | 2/2017 |
| CN | 206687155 | | 12/2017 |
| CN | 107708453 | A | 2/2018 |
| CN | 108135276 | A | 6/2018 |
| CN | 108135278 | A | 6/2018 |
| CN | 108366629 | A | 8/2018 |
| CN | 108471808 | A | 8/2018 |
| CN | 108471813 | A | 8/2018 |
| CN | 108697171 | A | 10/2018 |
| CN | 109068741 | A | 12/2018 |
| CN | 109195462 | A | 1/2019 |
| CN | 109414067 | A | 3/2019 |
| CN | 109496129 | A | 3/2019 |
| CN | 109640716 | A | 4/2019 |
| CN | 109890233 | A | 6/2019 |
| CN | 109998171 | | 7/2019 |
| CN | 110248561 | A | 9/2019 |
| CN | 110545680 | A | 12/2019 |
| CN | 110573035 | A | 12/2019 |
| CN | 110621175 | A | 12/2019 |
| CN | 110771258 | A | 2/2020 |
| CN | 110799050 | A | 2/2020 |
| CN | 110800372 | A | 2/2020 |
| CN | 110891442 | A | 3/2020 |
| CN | 110913712 | A | 3/2020 |
| CN | 111031821 | A | 4/2020 |
| CN | 111052858 | A | 4/2020 |
| CN | 111107757 | A | 5/2020 |
| CN | 111246761 | A | 6/2020 |
| CN | 111902055 | A | 11/2020 |
| CN | 112088577 | A | 12/2020 |
| CN | 112153909 | A | 12/2020 |
| CN | 112203539 | A | 1/2021 |
| CN | 112367872 | A | 2/2021 |
| CN | 112384091 | A | 2/2021 |
| CN | 112638183 | A | 4/2021 |
| CN | 112638186 | A | 4/2021 |
| CN | 112739226 | A | 4/2021 |
| CN | 112739227 | A | 4/2021 |
| CN | 112739228 | A | 4/2021 |
| CN | 112739229 | A | 4/2021 |
| CN | 112804899 | A | 5/2021 |
| CN | 112822950 | A | 5/2021 |
| CN | 112911949 | A | 6/2021 |
| CN | 113226084 | A | 8/2021 |
| CN | 113329643 | A | 8/2021 |
| CN | 113329644 | A | 8/2021 |
| CN | 113423289 | A | 9/2021 |
| CN | 113473871 | A | 10/2021 |
| CN | 113557792 | A | 10/2021 |
| CN | 113597263 | A | 11/2021 |
| CN | 113613519 | A | 11/2021 |
| CN | 113710113 | A | 11/2021 |
| EA | 202090426 | A1 | 7/2020 |
| EP | 0703735 | A1 | 4/1996 |
| EP | 2975957 | A1 | 1/2016 |
| EP | 2975958 | A1 | 1/2016 |
| EP | 2994000 | A1 | 3/2016 |
| EP | 2996504 | A1 | 3/2016 |
| EP | 3076810 | A1 | 10/2016 |
| EP | 3110270 | A1 | 1/2017 |
| EP | 3145338 | A1 | 3/2017 |
| EP | 3145341 | A1 | 3/2017 |
| EP | 3145343 | A1 | 3/2017 |
| EP | 3145344 | A1 | 3/2017 |
| EP | 3183979 | A1 | 6/2017 |
| EP | 3313213 | A1 | 5/2018 |
| EP | 3183979 | B1 | 6/2018 |
| EP | 3337342 | A1 | 6/2018 |
| EP | 3337343 | A1 | 6/2018 |
| EP | 3364788 | A1 | 8/2018 |
| EP | 3364793 | A1 | 8/2018 |
| EP | 3370553 | A1 | 9/2018 |
| EP | 3399876 | A1 | 11/2018 |
| EP | 3405051 | A1 | 11/2018 |
| EP | 3416507 | A1 | 12/2018 |
| EP | 3426071 | A1 | 1/2019 |
| EP | 3445186 | A1 | 2/2019 |
| EP | 3462933 | A1 | 4/2019 |
| EP | 3462934 | A1 | 4/2019 |
| EP | 3462935 | A1 | 4/2019 |
| EP | 3462936 | A1 | 4/2019 |
| EP | 3490395 | A1 | 6/2019 |
| EP | 3506771 | A1 | 7/2019 |
| EP | 3541212 | A1 | 9/2019 |
| EP | 3544452 | A1 | 10/2019 |
| EP | 3579711 | A1 | 12/2019 |
| EP | 3621465 | A1 | 3/2020 |
| EP | 3629782 | A1 | 4/2020 |
| EP | 3638058 | A1 | 4/2020 |
| EP | 3646667 | A1 | 5/2020 |
| EP | 3646669 | A1 | 5/2020 |
| EP | 3646670 | A1 | 5/2020 |
| EP | 3654790 | A1 | 5/2020 |
| EP | 3664634 | A1 | 6/2020 |
| EP | 3664642 | A1 | 6/2020 |
| EP | 3664643 | A1 | 6/2020 |
| EP | 3664644 | A1 | 6/2020 |
| EP | 3679765 | A1 | 7/2020 |
| EP | 3691479 | A1 | 8/2020 |
| EP | 3695734 | A1 | 8/2020 |
| EP | 3695735 | A1 | 8/2020 |
| EP | 3760062 | A1 | 1/2021 |
| EP | 3760063 | A1 | 1/2021 |
| EP | 3760064 | A1 | 1/2021 |
| EP | 3760065 | A1 | 1/2021 |

(56) References Cited

FOREIGN PATENT DOCUMENTS

| | | | |
|---|---|---|---|
| EP | 3772248 | A1 | 2/2021 |
| EP | 3800966 | A1 | 4/2021 |
| EP | 3801077 | A1 | 4/2021 |
| EP | 3804461 | A1 | 4/2021 |
| EP | 3806583 | A1 | 4/2021 |
| EP | 3817607 | A1 | 5/2021 |
| EP | 3818886 | A1 | 5/2021 |
| EP | 3829356 | A1 | 6/2021 |
| EP | 3829360 | A1 | 6/2021 |
| EP | 3843570 | A1 | 7/2021 |
| EP | 3855953 | A1 | 8/2021 |
| EP | 3855954 | A1 | 8/2021 |
| EP | 3855955 | A1 | 8/2021 |
| EP | 3855956 | A1 | 8/2021 |
| EP | 3855960 | A1 | 8/2021 |
| EP | 3863432 | A1 | 8/2021 |
| EP | 3863433 | A1 | 8/2021 |
| EP | 3863449 | A1 | 8/2021 |
| EP | 3900552 | A1 | 10/2021 |
| EP | 3911187 | A1 | 11/2021 |
| EP | 3915403 | A1 | 12/2021 |
| EP | 3915404 | A1 | 12/2021 |
| EP | 3915405 | A1 | 12/2021 |
| IL | 272494 | | 12/1899 |
| IL | 272894 | | 12/1899 |
| IL | 278103 | | 12/1899 |
| IL | 278583 | | 12/1899 |
| IL | 278791 | | 12/1899 |
| IL | 281654 | | 12/1899 |
| IL | 281655 | | 12/1899 |
| IL | 281656 | | 12/1899 |
| IL | 281985 | | 12/1899 |
| IL | 282015 | | 12/1899 |
| IL | 282124 | | 12/1899 |
| IL | 284470 | | 12/1899 |
| IL | 286004 | | 12/1899 |
| IL | 286027 | | 12/1899 |
| IL | 286112 | | 12/1899 |
| IL | 246477 | A | 12/2019 |
| IN | 201617026912 | | 12/1899 |
| IN | 201617026913 | | 12/1899 |
| IN | 201817041404 | | 12/1899 |
| IN | 201917004559 | | 12/1899 |
| IN | 201917004916 | | 12/1899 |
| IN | 201917034455 | | 12/1899 |
| IN | 202117008016 | | 12/1899 |
| IN | 202117013168 | | 12/1899 |
| JP | 5986694 | B1 | 12/1899 |
| JP | 6001201 | B1 | 12/1899 |
| JP | 6077145 | B2 | 12/1899 |
| JP | 6532067 | B2 | 12/1899 |
| JP | 6535350 | B2 | 12/1899 |
| JP | 6557660 | B2 | 12/1899 |
| JP | 6629458 | B2 | 12/1899 |
| JP | 6653260 | B2 | 12/1899 |
| JP | 6666854 | B2 | 12/1899 |
| JP | 6684720 | B2 | 12/1899 |
| JP | 6714740 | B2 | 12/1899 |
| JP | 6830126 | B2 | 12/1899 |
| JP | 6866314 | B2 | 12/1899 |
| JP | 6878684 | B2 | 12/1899 |
| JP | 6882273 | B2 | 12/1899 |
| JP | 6883029 | B2 | 12/1899 |
| JP | 6898499 | B2 | 12/1899 |
| JP | 6898500 | B2 | 12/1899 |
| JP | 6911167 | B2 | 12/1899 |
| JP | 6946328 | B2 | 12/1899 |
| JP | 6949043 | B2 | 12/1899 |
| JP | 03039077 | | 2/2003 |
| JP | 2016528874 | A | 9/2016 |
| JP | 2016214258 | | 12/2016 |
| JP | 2018512141 | | 5/2018 |
| JP | 2019510469 | A | 4/2019 |
| JP | 2019521657 | A | 8/2019 |
| JP | 2019526247 | A | 9/2019 |
| JP | 2019535283 | A | 12/2019 |
| JP | 2020505077 | A | 2/2020 |
| JP | 2020519266 | A | 7/2020 |
| JP | 2020521439 | A | 7/2020 |
| JP | 2020522998 | A | 8/2020 |
| JP | 2020524982 | A | 8/2020 |
| JP | 2020525014 | A | 8/2020 |
| JP | 2020527338 | A | 9/2020 |
| JP | 2020529217 | A | 10/2020 |
| JP | 2020529218 | A | 10/2020 |
| JP | 2020529842 | A | 10/2020 |
| JP | 2020532314 | A | 11/2020 |
| JP | 2020535797 | A | 12/2020 |
| JP | 2018537960 | | 4/2021 |
| JP | 2021512627 | A | 5/2021 |
| JP | 2021520219 | A | 8/2021 |
| JP | 2021524257 | A | 9/2021 |
| JP | 2021525540 | A | 9/2021 |
| JP | 2021528953 | A | 10/2021 |
| JP | 6967169 | B1 | 11/2021 |
| JP | 2018525978 | | 11/2021 |
| JP | 2021532748 | A | 12/2021 |
| JP | 2021532798 | A | 12/2021 |
| KR | 101647936 | B1 | 12/1899 |
| KR | 101648324 | B1 | 12/1899 |
| KR | 102171229 | B1 | 12/1899 |
| KR | 102278589 | B1 | 12/1899 |
| KR | 102284091 | B1 | 12/1899 |
| KR | 102323793 | B1 | 12/1899 |
| KR | 102326187 | B1 | 12/1899 |
| KR | 102326189 | B1 | 12/1899 |
| KR | 1020170107518 | | 12/1899 |
| KR | 20150143885 | A | 12/2015 |
| KR | 20170107618 | | 9/2017 |
| KR | 20180135927 | A | 12/2018 |
| KR | 20190011235 | A | 2/2019 |
| KR | 20190039713 | A | 4/2019 |
| KR | 20190084952 | A | 7/2019 |
| KR | 20190141012 | A | 12/2019 |
| KR | 20200011935 | A | 2/2020 |
| KR | 20200019856 | A | 2/2020 |
| KR | 20200024150 | A | 3/2020 |
| KR | 20200031570 | A | 3/2020 |
| KR | 20200038926 | A | 4/2020 |
| KR | 20200040251 | A | 4/2020 |
| KR | 20200069112 | A | 6/2020 |
| KR | 20200078410 | A | 7/2020 |
| KR | 20200092267 | A | 8/2020 |
| KR | 20200134321 | A | 12/2020 |
| KR | 20210014103 | A | 2/2021 |
| KR | 20210014628 | A | 2/2021 |
| KR | 20210018946 | A | 2/2021 |
| KR | 20210027259 | A | 3/2021 |
| KR | 20210035888 | A | 4/2021 |
| KR | 20210047302 | A | 4/2021 |
| KR | 20210061409 | A | 5/2021 |
| KR | 20210064276 | A | 6/2021 |
| KR | 20210064301 | A | 6/2021 |
| KR | 20210064306 | A | 6/2021 |
| KR | 20210064307 | A | 6/2021 |
| KR | 20210070289 | A | 6/2021 |
| KR | 20210070352 | A | 6/2021 |
| KR | 20210075137 | A | 6/2021 |
| KR | 20210099638 | A | 8/2021 |
| KR | 20210132069 | A | 11/2021 |
| KR | 20210132697 | A | 11/2021 |
| KR | 20210134921 | A | 11/2021 |
| KR | 20210134923 | A | 11/2021 |
| KR | 20210135297 | A | 11/2021 |
| KR | 20210136111 | A | 11/2021 |
| RU | 2640438 | | 1/2018 |
| RU | 2643421 | C2 | 2/2018 |
| RU | 2665435 | C1 | 8/2018 |
| RU | 2674612 | C2 | 12/2018 |
| RU | 2709000 | C2 | 12/2019 |
| RU | 2710773 | C2 | 1/2020 |
| RU | 2736106 | C1 | 11/2020 |
| RU | 2736745 | C2 | 11/2020 |
| RU | 2737382 | C2 | 11/2020 |

(56) References Cited

FOREIGN PATENT DOCUMENTS

| | | | |
|---|---|---|---|
| RU | 2738701 | C2 | 12/2020 |
| RU | 2746348 | C2 | 4/2021 |
| RU | 2747537 | C2 | 5/2021 |
| RU | 2019138679 | A | 6/2021 |
| RU | 2751032 | C2 | 7/2021 |
| RU | 2753568 | C1 | 8/2021 |
| RU | 2760355 | C2 | 11/2021 |
| TW | I669072 | B | 12/1899 |
| TW | I670017 | B | 12/1899 |
| TW | 201902372 | A | 1/2019 |
| TW | 202038780 | A | 11/2020 |
| WO | 9527411 | A1 | 10/1995 |
| WO | 2011063970 | A1 | 6/2011 |
| WO | 2015019099 | A1 | 2/2015 |
| WO | 2015070405 | | 5/2015 |
| WO | 2015070405 | A1 | 5/2015 |
| WO | 15177253 | A1 | 11/2015 |
| WO | 15177264 | A1 | 11/2015 |
| WO | 2017068093 | | 10/2016 |
| WO | 2017029268 | A1 | 2/2017 |
| WO | 2017068094 | | 4/2017 |
| WO | 2017068094 | A1 | 4/2017 |
| WO | WO2017068099 | | 4/2017 |
| WO | 17085242 | A1 | 5/2017 |
| WO | 2017108991 | A1 | 6/2017 |
| WO | WO2017109448 | | 6/2017 |
| WO | 2017122196 | A1 | 7/2017 |
| WO | 17141017 | A1 | 8/2017 |
| WO | 2017129617 | A1 | 8/2017 |
| WO | 2017072148 | | 10/2017 |
| WO | 2017178394 | A1 | 10/2017 |
| WO | 2017191176 | | 11/2017 |
| WO | 2017191176 | A1 | 11/2017 |
| WO | WO2017186455 | | 11/2017 |
| WO | WO20170191176 | | 11/2017 |
| WO | 17207584 | A1 | 12/2017 |
| WO | 2017216671 | A1 | 12/2017 |
| WO | 18041450 | A1 | 3/2018 |
| WO | 18096000 | A1 | 5/2018 |
| WO | 18146071 | A1 | 8/2018 |
| WO | 2018162515 | | 9/2018 |
| WO | 18206616 | A1 | 11/2018 |
| WO | 18220558 | A1 | 12/2018 |
| WO | 19002329 | A1 | 1/2019 |
| WO | 19016740 | A1 | 1/2019 |
| WO | 19030364 | A1 | 2/2019 |
| WO | WO2019136165 | | 7/2019 |
| WO | 2019149881 | A1 | 8/2019 |
| WO | 2019175810 | A1 | 9/2019 |
| WO | 19197170 | A1 | 10/2019 |
| WO | WO2019185747 | | 10/2019 |
| WO | 19224380 | A1 | 11/2019 |
| WO | 19234582 | A1 | 12/2019 |
| WO | 20008008 | A1 | 1/2020 |
| WO | 2020011815 | A2 | 1/2020 |
| WO | 20025562 | A1 | 2/2020 |
| WO | 20025746 | A1 | 2/2020 |
| WO | 20044181 | A1 | 3/2020 |
| WO | 20064682 | A1 | 4/2020 |
| WO | 20064683 | A1 | 4/2020 |
| WO | 20064684 | A1 | 4/2020 |
| WO | 20064685 | A1 | 4/2020 |
| WO | 20064686 | A1 | 4/2020 |
| WO | 20074494 | A1 | 4/2020 |
| WO | 20074535 | A1 | 4/2020 |
| WO | 20074622 | A1 | 4/2020 |
| WO | 20116811 | A1 | 6/2020 |
| WO | 20148214 | A1 | 7/2020 |
| WO | 20153828 | A1 | 7/2020 |
| WO | 20153829 | A1 | 7/2020 |
| WO | 20153830 | A1 | 7/2020 |
| WO | 20174026 | A1 | 9/2020 |
| WO | 20174027 | A1 | 9/2020 |
| WO | 20174028 | A1 | 9/2020 |
| WO | 20174029 | A1 | 9/2020 |
| WO | 20182735 | A1 | 9/2020 |
| WO | 20182754 | A1 | 9/2020 |
| WO | 20183165 | A1 | 9/2020 |
| WO | 20229465 | A1 | 11/2020 |
| WO | 20239597 | A1 | 12/2020 |
| WO | 20245338 | A1 | 12/2020 |
| WO | 20260883 | A1 | 12/2020 |
| WO | 20260884 | A1 | 12/2020 |
| WO | 20260885 | A1 | 12/2020 |
| WO | 20260886 | A1 | 12/2020 |
| WO | 21001267 | A1 | 1/2021 |
| WO | 21001268 | A1 | 1/2021 |
| WO | 21001511 | A1 | 1/2021 |
| WO | 21001512 | A1 | 1/2021 |
| WO | 21001548 | A2 | 1/2021 |
| WO | 21001552 | A1 | 1/2021 |
| WO | 21001566 | A1 | 1/2021 |
| WO | 21037403 | A1 | 3/2021 |
| WO | 21037655 | A1 | 3/2021 |
| WO | 21074254 | A1 | 4/2021 |
| WO | 21083986 | A1 | 5/2021 |
| WO | 21105476 | A1 | 6/2021 |
| WO | 21116241 | A1 | 6/2021 |
| WO | 21140018 | A1 | 7/2021 |
| WO | 21170640 | A1 | 9/2021 |
| WO | 21170642 | A1 | 9/2021 |
| WO | 21170649 | A1 | 9/2021 |
| WO | 21170650 | A1 | 9/2021 |
| WO | 21170651 | A1 | 9/2021 |
| WO | 21170671 | A1 | 9/2021 |
| WO | 21170672 | A1 | 9/2021 |
| WO | 21170673 | A1 | 9/2021 |
| WO | 21170675 | A1 | 9/2021 |
| WO | 21170677 | A1 | 9/2021 |
| WO | 2021194541 | | 9/2021 |
| WO | 21233914 | A1 | 11/2021 |
| WO | 21233916 | A1 | 11/2021 |
| WO | 21233918 | A1 | 11/2021 |
| WO | 2022128585 | | 6/2022 |

OTHER PUBLICATIONS

Patel, "How Exactly is Steel Wool Made?" 10 pages.

150
105

281
280
150

105
150

281
280
105
M
281
280

105
150
280

HEAT-NOT-BURN DEVICE AND METHOD

CROSS-REFERENCE TO RELATED APPLICATIONS

This patent application is a divisional application of U.S. patent application Ser. No. 16/958,655, filed Jun. 26, 2020, which is a national phase entry of PCT Application No. PCT/US2019/012204, filed Jan. 3, 2019, which is a continuation-in-part of U.S. patent application Ser. No. 16/022,482, filed Jun. 28, 2018, which claims priority to U.S. Provisional Patent Application No. 62/613,355, filed Jan. 3, 2018, which applications are incorporated in their entirety here by this reference.

TECHNICAL FIELD

This invention relates to devices used as alternatives to conventional smoking products, such as electronic cigarettes, vaping systems, and in particular, heat-not-burn devices.

BACKGROUND

Heat-not-burn (HNB) devices heat tobacco at temperatures lower than those that cause combustion to create an inhalable aerosol containing nicotine and other tobacco constituents, which is then made available to the device's user. Unlike traditional cigarettes, the goal is not to burn the tobacco, but rather to heat the tobacco sufficiently to release the nicotine and other constituents through the production of aerosol. Igniting and burning the cigarette creates unwanted toxins that can be avoided using the HNB device. However, there is a fine balance between providing sufficient heat to effectively release the tobacco constituents in aerosol form and not burn or ignite the tobacco. Current HNB devices have not found that balance, either heating the tobacco at temperatures that produce an inadequate amount of aerosol or over heating the tobacco and producing an unpleasant or "burnt" flavor profile. Additionally, the current methodology leaves traditional HNB device internal components dirtied with burning tobacco byproducts and the byproducts of accidental combustion.

For the foregoing reasons there is a need for an aerosol producing device that provides its user the ability to control the power of the device, which will affect the temperature at which the tobacco will be heated via the inductive method to reduce the risk of combustion—even at what would otherwise be sufficient temperatures to ignite—while increasing the efficiency and flavor profile of the aerosol produced.

SUMMARY

The present invention is directed to a system and method by which a consumable tobacco component is quickly and incrementally heated by induction, so that it produces an aerosol that contains certain of its constituents but, not with the byproducts most often associated with combustion, for example, smoke, ash, tar and certain other potentially harmful chemicals. This invention involves positioning and incrementally advancing heat along a consumable tobacco component with the use of an induction heating element that provides an alternating electro-magnetic field around the component.

An object of the present invention is a device wherein an induction heating source is provided for use to heat a consumable tobacco component.

Another object of the present invention is a consumable tobacco component comprised of several, sealed, individual, airtight, coated encasements containing a consumable tobacco preparation—and an induction heating source. The encasement may be an aluminum shell with pre-set openings. The encasements may be coated with a gel that seals the openings until an inductive heating process melts the gel, clearing the openings. In some embodiments, the gel can include a flavoring agent that can add flavor to or enhance the flavor of the tobacco aerosol.

In some embodiments, multiple encasements are stacked inside a paper tube with spaces between them, formed by excess aluminum wrapping at the bottom end of each encasement and channels on either side to allow for the aerosol produced. When the inductive heating source is activated, the pre-set openings are cleared, and flavor is combined with the aerosol to travel through the tube and be made available to the user of the device.

Using these methods and apparatus, the device is required to heat less mass, can heat-up immediately, cool down quickly and conserve power, allowing for greater use between re-charging sessions. This contrasts with the well-known, current, commercially available heat-not-burn devices.

Another object of the present invention is a tobacco-containing consumable component comprised of several, sealed, individual, airtight, coated encasements and an induction heating source. The encasements are then coated with a gel that seals them until an inductive heating process can melt the gel, clearing the openings. In some embodiments, the gel can include a flavoring agent that can add flavor to or enhance the flavor of the consumable tobacco component.

Another object of the present invention is to create a consumable-containing package that is easy to replace and minimizes fouling the inside of the case during use so as to reduce cleaning efforts of the case.

Another object of the present invention is to move the heating element relative to the susceptor or the consumable to heat segments of the consumable independent of other segments.

Another object of the invention is to maximize the efficiency of energy usage in the device for generating aerosol.

Another object of the invention is to control the heat of the heating element to maximize the longevity of the device.

Another object is to create the ability to change the airflow through the device to change the flavor or dosage of a consumable.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The invention of the present application is a device for generating aerosols from a consumable-containing product for inhalation in a manner that utilizes relatively high heat with minimal burning of the consumable-containing product. For the purposes of this application, the term "consumable" is to be interpreted broadly to encompass any type of pharmaceutical agent, drug, chemical compound, active agent, constituent, and the like, regardless of whether the consumable is used to treat a condition or disease, is for nutrition, is a supplement, or used for recreation. By way of example only, a consumable can include pharmaceuticals, nutritional supplements, over-the-counter medicants, tobacco, *cannabis*, and the like.

Figure 1:
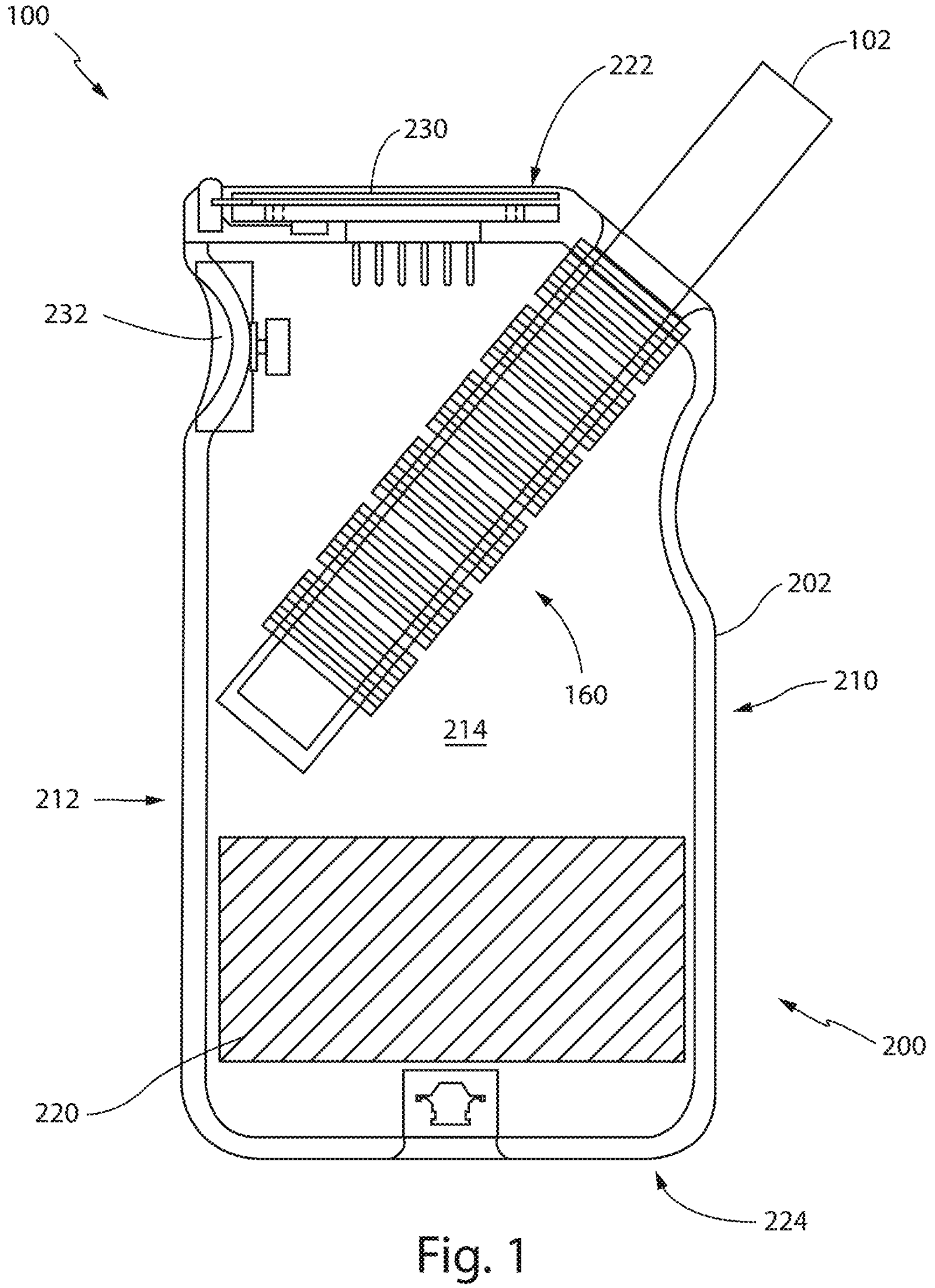
FIG. 1 shows a side view inside of an embodiment of the present invention.

With reference to FIG. 1, the device 100 comprises a consumable-containing package 102 and an aerosol producing device 200. The device 100 generates aerosols through a heat-not-burn process in which a consumable-containing unit 104 is heated to a temperature that does not burn the consumable-containing unit 104, but does release the consumable from the consumable-containing unit in the form of an aerosol product that can be inhaled. Thus, a consumable-containing unit 104 is any product that contains a consumable that can be released into aerosol form when heated to the proper temperature. The present application discusses application of the invention to a tobacco product to provide a concrete example. The invention, however, is not limited to use with tobacco products.

Consumable-Containing Package

With reference to FIGS. 2A-6B, the consumable-containing package 102 is the component that is heated to release the consumable in aerosol form. The consumable-containing package 102 comprises a consumable-containing unit 104, a metal (also referred to as the susceptor) 106 for heating the consumable-containing unit 104 through an inductive heating system, and an encasement 108 to contain the consumable-containing unit 104 and the susceptor 106. How well the consumable-containing package 102 is heated is dependent on product consistency. Product consistency takes into consideration various factors, such as the position, shape, orientation, composition, and other characteristics of the consumable-containing unit 104. Other characteristics of the consumable-containing unit 104 may include the amount of oxygen contained in the unit. The goal is to maximize product consistency by keeping each of these factors consistent in the manufacturing process.

If the form of the consumable-containing unit 104 is in direct physical contact with the susceptor 106 with maximal contact area between each, then it can be inferred that the thermal energy induced in the susceptor 106 will be largely transferred to the consumable-containing unit 104. As such, the shape and arrangement of the consumable-containing unit 104 relative to the susceptor 106 is an important factor. In some embodiments, the consumable-containing unit 104 is generally cylindrical in shape. As such, the consumable-containing unit 104 may have a circular or oval-shaped cross-section.

In addition, another objective with respect to the design of the consumable-containing unit 104 is to minimize the amount of air to which the consumable-containing unit 104 is exposed. This eliminates or mitigates the risk of oxidation or combustion during storage or during the heating process. As a result, at certain settings, it is possible to heat the consumable-containing unit 104 to temperatures that would otherwise cause combustion when used with prior art devices that allow more air exposure.

As such, in the preferred embodiment, the consumable-containing unit 104 is made from a powdered form of the consumable that is compressed into a pellet or rod. Compression of the consumable reduces the oxygen trapped inside the consumable-containing unit 104. In some embodiments, the consumable-containing unit 104 may further comprise an additive, such as a humectant, flavorant, filler to displace oxygen, or vapor-generating substance, and the like. The additive may further assist with the absorption and transfer of the thermal energy as well as eliminating the oxygen from the consumable-containing unit 104. In an alternative embodiment, the consumable may be mixed with a substance that does not interfere with the function of the device, but displaces air in the interstitial spaces of the consumable and/or surrounds the consumable to isolate it from the air. In yet another alternative embodiment, the consumable could be formed into tiny pellets or other form that can be encapsulated to further reduce the air available to the consumable.

As shown in FIGS. 2A-2D, in the preferred embodiment, the consumable-containing unit 104 may be one elongated unit defining a longitudinal axis L. For example, the consumable-containing unit 104 may be an elongated cylinder or tube having a circular transverse cross-section or an oval transverse cross-section. As such, the consumable-containing unit 104 may be defined by two opposing ends 105, 107 and a sidewall 109 therebetween extending from the first end 105 to the second end 107 defining the length of the consumable-containing unit 104.

The susceptor 106 may be similarly elongated and embedded in the consumable-containing unit 104, preferably, along the longitudinal axis L and extending substantially the length and width (i.e. the diameter) of the consumable-containing unit 104. In consumable-containing units 104 having an oval cross-section, the diameter refers to the major diameter defining the long axis of the oval.

Figure 2A:
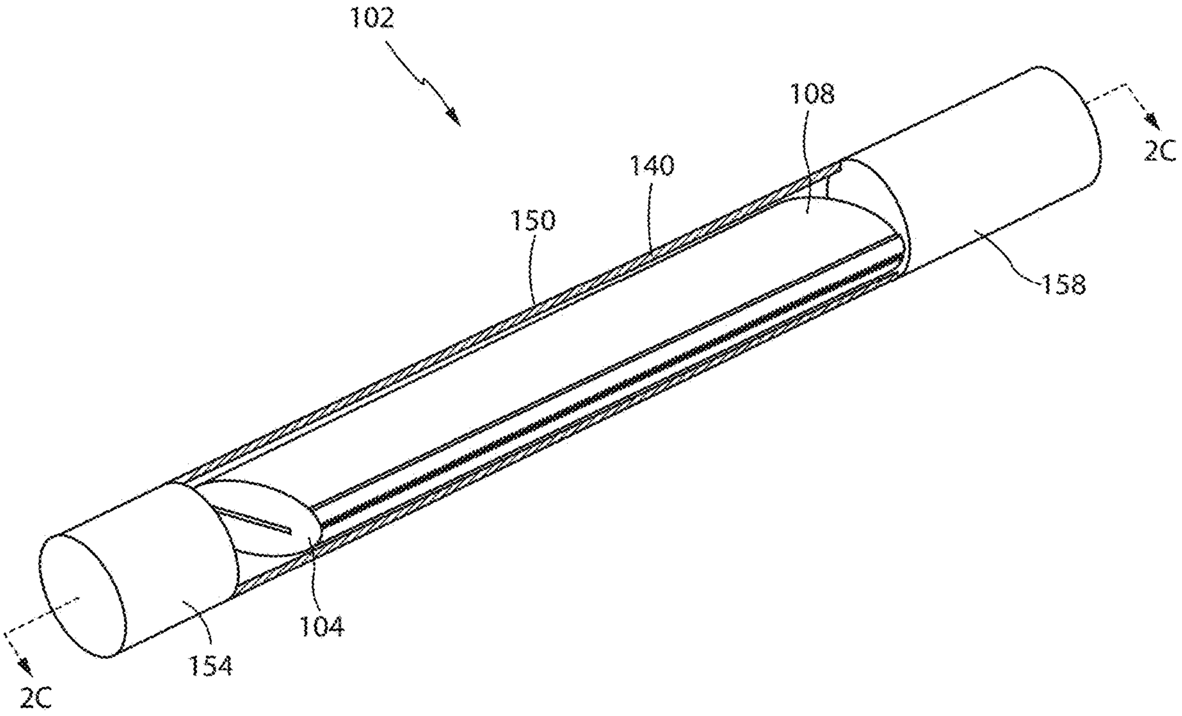
FIG. 2A shows a perspective view of an embodiment of the present invention with portions removed to show inside the embodiment.
Figure 2B:
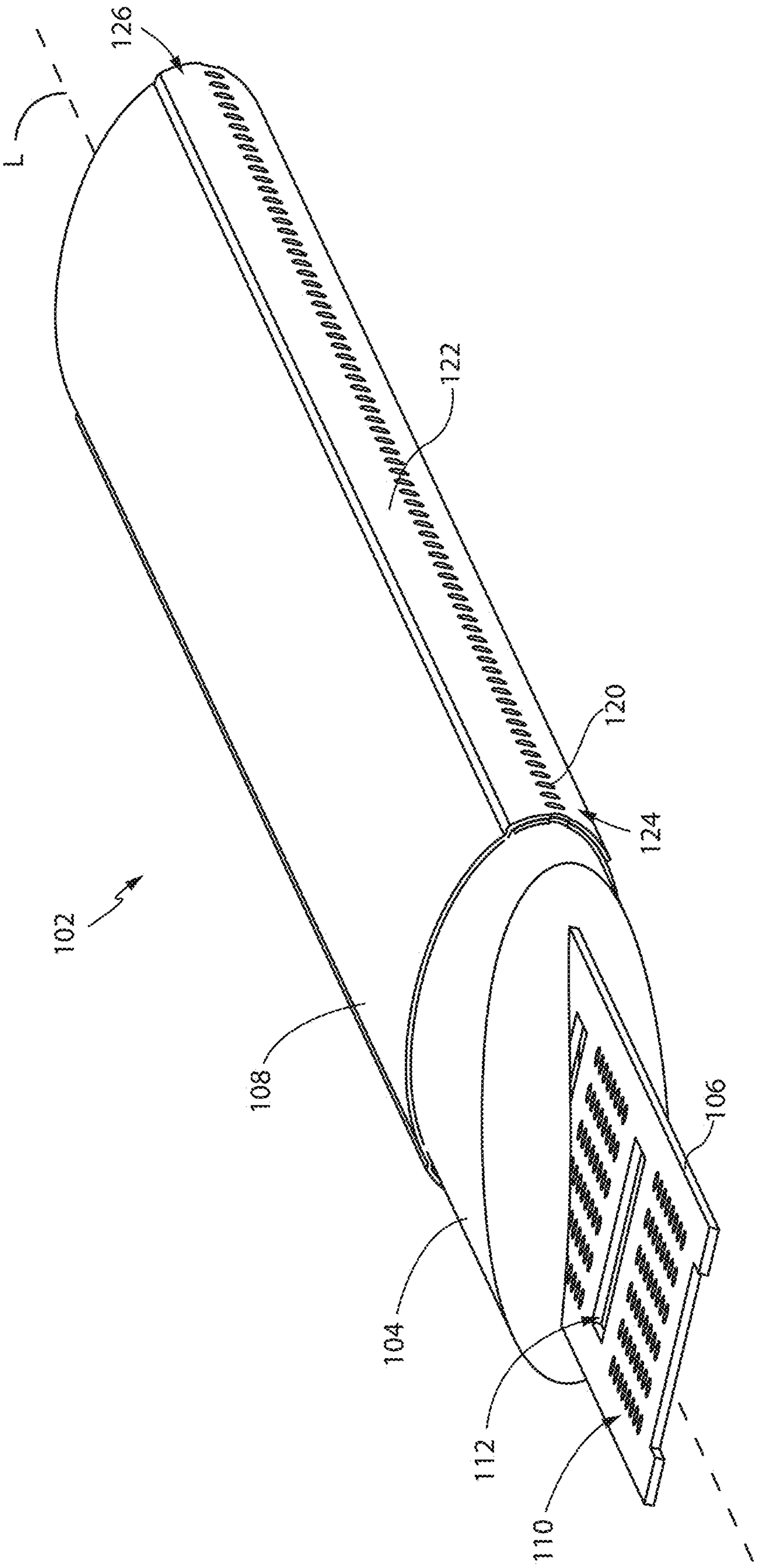
FIG. 2B shows a perspective view of the embodiment shown in FIG. 2A with portions cut away and/or removed to reveal internal components.
Figure 2C:
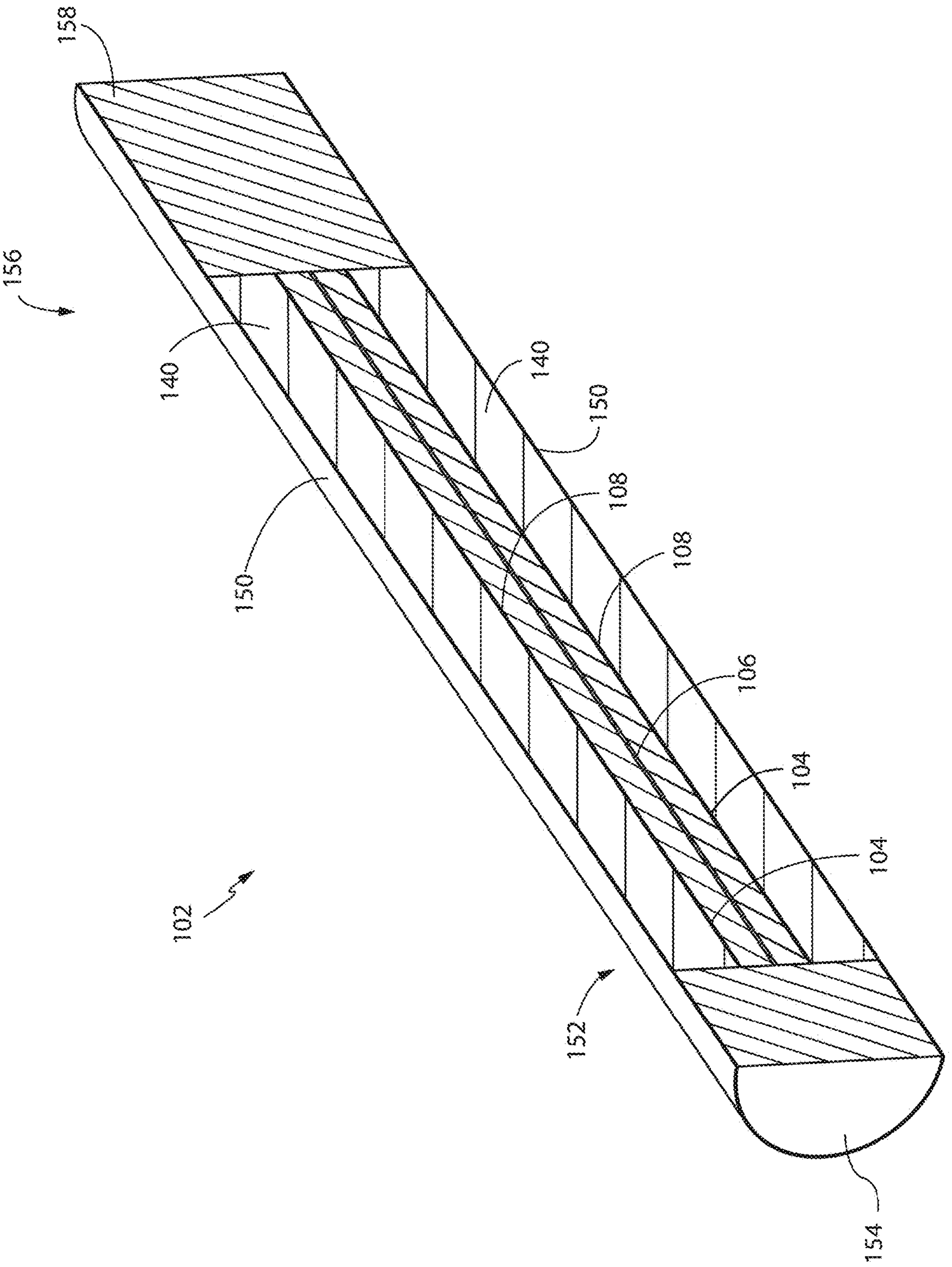
FIG. 2C shows a cross-sectional view of the embodiment shown in FIG. 2A cut along line 2C-2C.
Figure 2D:
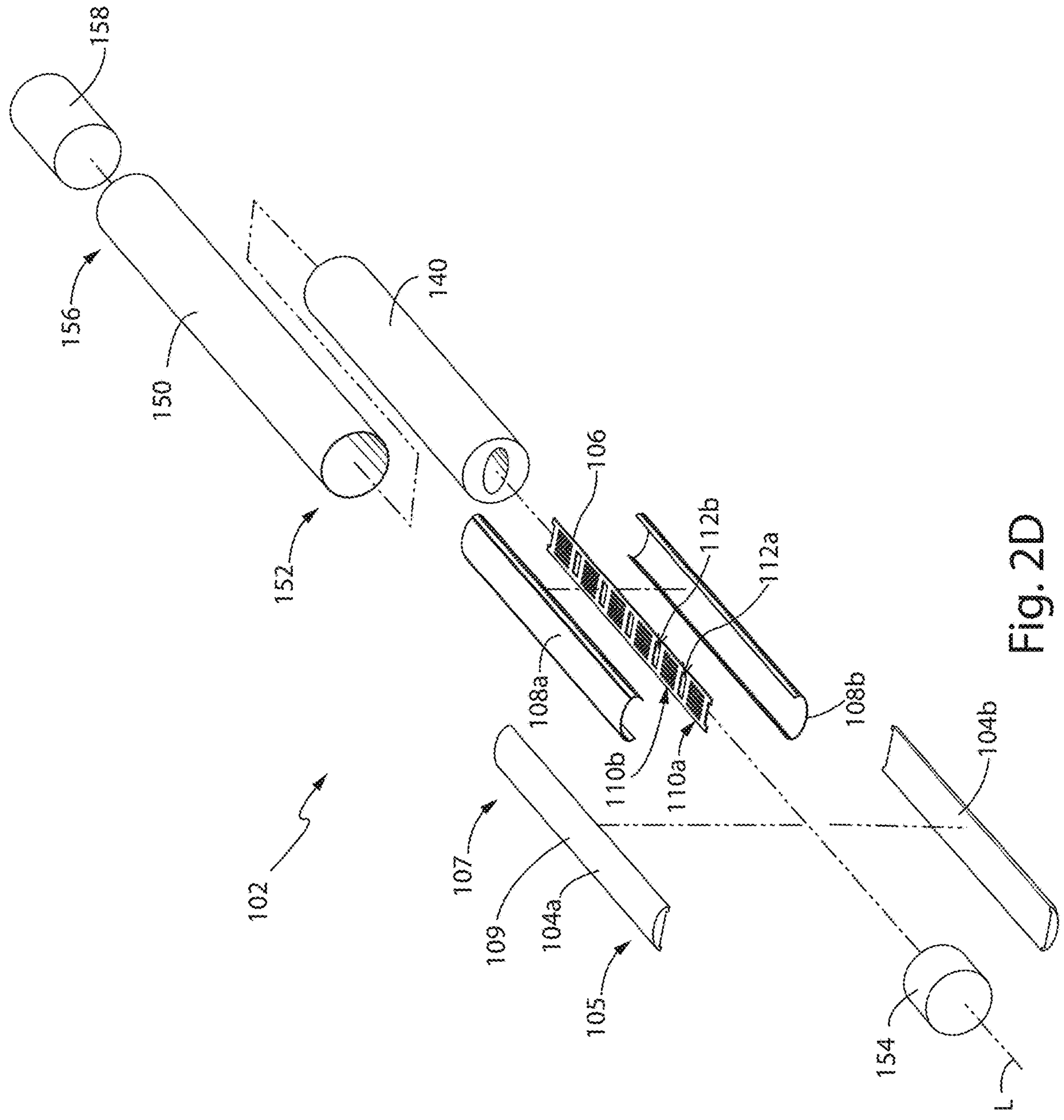
FIG. 2D shows an exploded view of the embodiment shown in FIG. 2A.
Figure 2E:
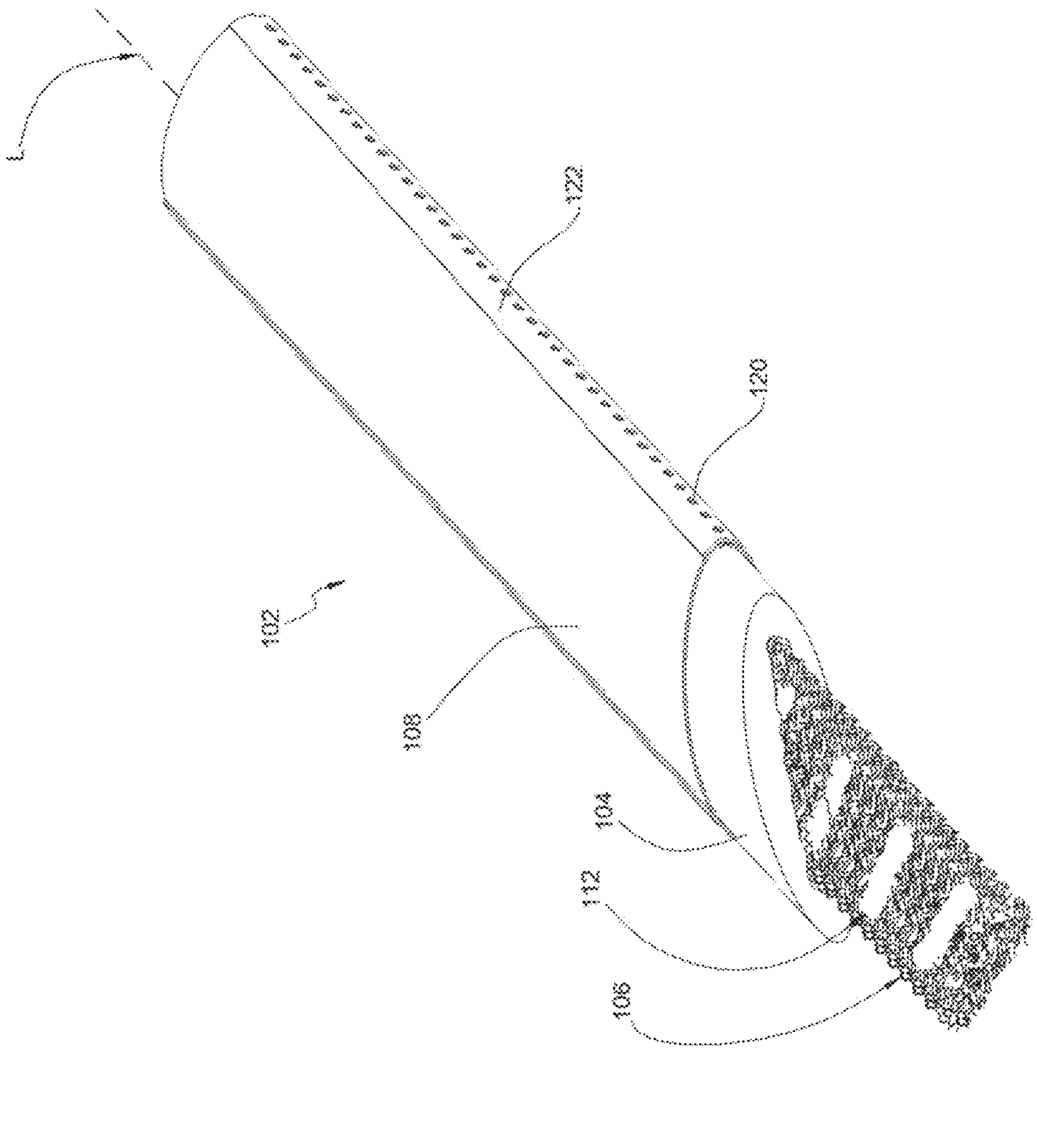
FIG. 2E shows a perspective view of another embodiment of the present invention with portions cut away and/or removed to reveal internal components.

The susceptor 106 can be machine extruded. Once extruded, the consumable-containing unit 104 can be compressed around the susceptor 106 along the length of the susceptor 106. Alternatively, the susceptor 106 could be stamped from flat metal stock or any other suitable method of fabrication prior to assembling the consumable containing unit 104 around the susceptor 106. In some embodiments, as shown in FIG. 2E, the susceptor 106 may be made of steel wool. For example, the susceptor 106 may be comprised of fine filaments of steel wool bundled together in the form of a pad. As such, the steel wool pad comprises numerous fine edges. In some embodiments, the steel wool pad may be doused with, immersed in, or fully filled with the additive, such as a humectant, flavorant, vapor-generating substance, a substance to retard oxidation of the steel wool (rust), and/or a filler to eliminate air between the steel wool filaments, and the like. As shown in FIG. 2E, there may be cut-outs along the steel wool pad to divide the consumable containing unit 104 into discrete segments for individual heating, as described below. Alternatively, individual pads of steel wool may be used, separated by space and/or consumable, so that each pad may be heated individually during use.

Advantages of the steel wool, include, but are not limited to, easy disposability from an environmental standpoint in that it begins to oxidize soon after it is heated; and thereby, becomes friable and degrades easily without dangerous sharp edges. Being composed of iron and carbon it is relatively non-toxic.

The susceptor 106 can be made of any metal material that generates heat when exposed to varying magnetic fields as in the case of induction heating. Preferably, the metal comprises a ferrous metal. To maximize efficient heating of the consumable-containing unit 104, the susceptor 106 generally matches the shape of the largest cross-sectional area of the consumable-containing unit 104 so as to maximize the surface area with which the consumable-containing unit 104 comes into contact with the susceptor 106, but other configurations may also be used. In the embodiments in which the consumable-containing unit 104 is an elongated cylinder, the largest cross-sectional area would be defined by dividing the elongated cylinder down the longitudinal axis L along its major diameter creating a rectangular cross-sectional area. As such, the susceptor 106 would also be rectangular with dimensions substantially similar to the dimensions of the cross-sectional area of the elongated cylinder.

In some embodiments, the susceptor 106 may be a metal plate. In some embodiments, the susceptor 106 may be a metal plate with a plurality of openings 110, like a mesh screen. Inductive heating appears to be most effective and efficient at the edges of the susceptor 106. A mesh screen creates more edges in the susceptor 106 that can contact the consumable-containing unit 104 because the edges define the openings 110.

Preferably, the susceptor 106 may be a strip patterned with an array of small openings 110 to increase the amount of edges that can be utilized in an efficient inductive heating process, followed by a larger gap 112 that allows for that length of the susceptor 106 that will not allow for inductive heating, or at least mitigate inductive heating and/or mitigate conduction from the segment being heated. This configuration allows for the consumable-containing package 102 to be heated in discrete segments. The elongated susceptor 106 may be an elongated metal plate having a longitudinal direction, the elongated metal plate comprising sets of openings 110*a*, 110*b* and sets of gaps 112*a*, 112*b* wherein the sets of openings 110*a*, 110*b* alternate in series with the sets of gaps 112*a*, 112*b* along the longitudinal direction of the elongated metal plate such that each set of openings 110*a*, 110*b* is adjacent to one of the gaps 112*a*, 112*b*. Therefore, moving from one end of the susceptor 106 to the opposite end, there is a first set of openings 110*a*, then a first gap 112*a*, then a second set of openings 110*b*, then a second gap 112*b*, and so on. In the area of the gaps 112, there is very little metal material; therefore, there is minimal heat transfer. As such, even though the consumable-containing unit 104 is a single unit, it can still be heated in discrete sections. The consumable-containing unit 104 and susceptor 106 are then wrapped in an encasement 108.

In the preferred embodiment, the encasement 108 may be made of aluminum with pre-punched openings 120. The consumable-containing unit 104 is placed inside the encasement 108 to contain the heat generated by the susceptor 106. The openings 120 in the encasement 108 allow the consumable aerosol to escape when heated. Because the openings 120 create an avenue through which air can enter into the encasement 108 to be exposed to the consumable-containing unit 104, the openings 120 may be temporarily sealed using a coating. The coating is preferably made of a composition that melts at temperatures that create consumable aerosols. Therefore, as the susceptor 106 is heated, due to the lack of air inside the encasement 108, the consumable-containing unit 104 can be raised to exceedingly high temperatures without combusting. As the susceptor 106 reaches high temperatures, the consumable aerosols that begin to form, are not able to escape. When the coating melts away and exposes the opening 120, then the consumable aerosols are able to escape the encasement 108 for inhalation. In the preferred embodiment, the coating may be propylene glycol alginate ("PGA") gel. The coating may also include a flavoring. Therefore, as the coating melts away and the consumable aerosol is released, the flavoring is also released with the consumable aerosol. In some embodiments, the flavoring can be mixed with the additive.

In some embodiments, the openings 120 may be a plurality of holes or slits. The openings 120 may be formed along the length of the sidewall 122 of the encasement 108, arranged radially around the sidewall 122, arranged randomly or uniformly throughout the sidewall 122, and the like. In some embodiments, the openings 120 may be a plurality of holes along the opposite ends 124, 126 of the encasement 108. In some embodiments with the elongated consumable-containing unit 104, the encasement 108 may also be elongated with the opening 120 in the form of one or more elongated slits traversing the length of the encasement parallel to the longitudinal axis L, thereby creating a seam. That seam may be folded or crimped, but still leave a gap through which consumable aerosols may travel, either along its entire length or in discrete areas. Like the openings 120 described above, the seam may be sealed with a coating.

The consumable-containing package 102 may further comprise a filter tube 140 to encapsulate the consumable-containing unit 104, susceptor 106, and the encasement 108. The filter tube 140 may be made of filter material to capture any unwanted debris while allowing the consumable aerosol that is released from the heating of the encasement to pass transversely through the filter. The filter tube 140 may surround the encasement 108 and further cover the coated openings 120. Because the filter tube 140 may be made of filtering material, the consumable aerosol is able to travel through the filter tube 140. By way of example only, the filter tube may be made of cellulose or cellulose acetate, although any suitable filter material may be used.

The consumable-containing package 102 may further comprise a housing 150 to enclose the filter tube 140. The housing 150 may be a paper tube. The housing 150 is less likely to allow the consumable aerosols to pass through. As such, the housing 150 wrapped around the filter tube 140 creates a longitudinal channel through the filter tube 140 through which the consumable aerosol travels, rather than escaping radially out the filter tube 140. This allows the consumable aerosol to follow the path of inhalation towards the user's mouth. One end 152 of the housing 150 may be capped with an end cap 154. The end cap 154 may be comprised of a type of filter material. At the opposite end 156 of the housing 150 is a mouthpiece 158 that the user sucks on to draw the heated consumable aerosol out of the encasement 108 along the filter tube 140 towards the mouthpiece 158 and into the user's mouth. As such, the mouthpiece 158 may also be a type of filter, similar to that of the end cap 154. Where the consumable containing package 102 includes a channel through which the consumable aerosol travels, and that channel leads directly to the mouthpiece 158 that is also part of the consumable containing package 102, and the channel is isolated from the case 202, the case 202 will remain free of any residue or byproducts formed during operation of the device. In this configuration, the case 202 stays clean and does not require the user to periodically clean out the case 202.

In some embodiments, the encasements 108 may be made of a two piece unit having a first encasement section 108*a* and a second encasement section 108*b*. The consumable-containing unit 104 can be inserted into the first encasement section 108*a* and the second encasement section 108*b* may be placed on top of the first encasement section 108*a* to cover the consumable-containing unit 104. Preset openings 120 can be formed into the encasement 108 prior to encapsulating the consumable-containing unit 104.

Having established the general principles of the consumable-containing package 102, variations have also been contemplated that achieve the same objectives. For example, in some embodiments, the consumable-containing unit 104 may comprise two elongated sections 104*a*, 104*b*. The two elongated sections 104*a*, 104*b* of the consumable-containing unit 104 may be defined by a plane parallel to and cutting through the longitudinal axis L along the diameter. Therefore, the two elongated sections 104*a*, 104*b* may be half-cylinder sections that when mated together form a full cylindrical consumable-containing unit 104.

In some embodiments, as shown in FIGS. 3A-3D, the consumable-containing unit 104 may be in the form of pellet or tablet. Unlike the consumable-containing unit 104 that is an elongated cylinder or tube in which the length of the sidewall 109 is much longer than the diameter, in the tablet embodiment, the tablet may be a short cylinder defining a longitudinal axis L, wherein the length of the sidewall 109 is closer to the size of the diameter, or shorter than the diameter. The susceptor 106 may have a flat, circular shape to match the cross-sectional shape of the tablet when cut transversely, perpendicular to the longitudinal axis L. The consumable-containing unit 104 can be compressed about the susceptor 106. To mimic a cigarette, a plurality of the consumable-containing units 104 can be stacked, end-to-end along their longitudinal axes L, to form an elongated cylinder. Therefore, each individual consumable-containing unit 104 can be heated separately, effectively mimicking the segments of the consumable-containing unit 104 having an elongated, tubular body.

Other shapes can also be used, such as square or rectangular with a susceptor 106 having a corresponding shape. The cylindrical shape, however, is preferred because of the ease with which such shape can be used to mimic the shape of an actual cigarette.

Figure 4A:
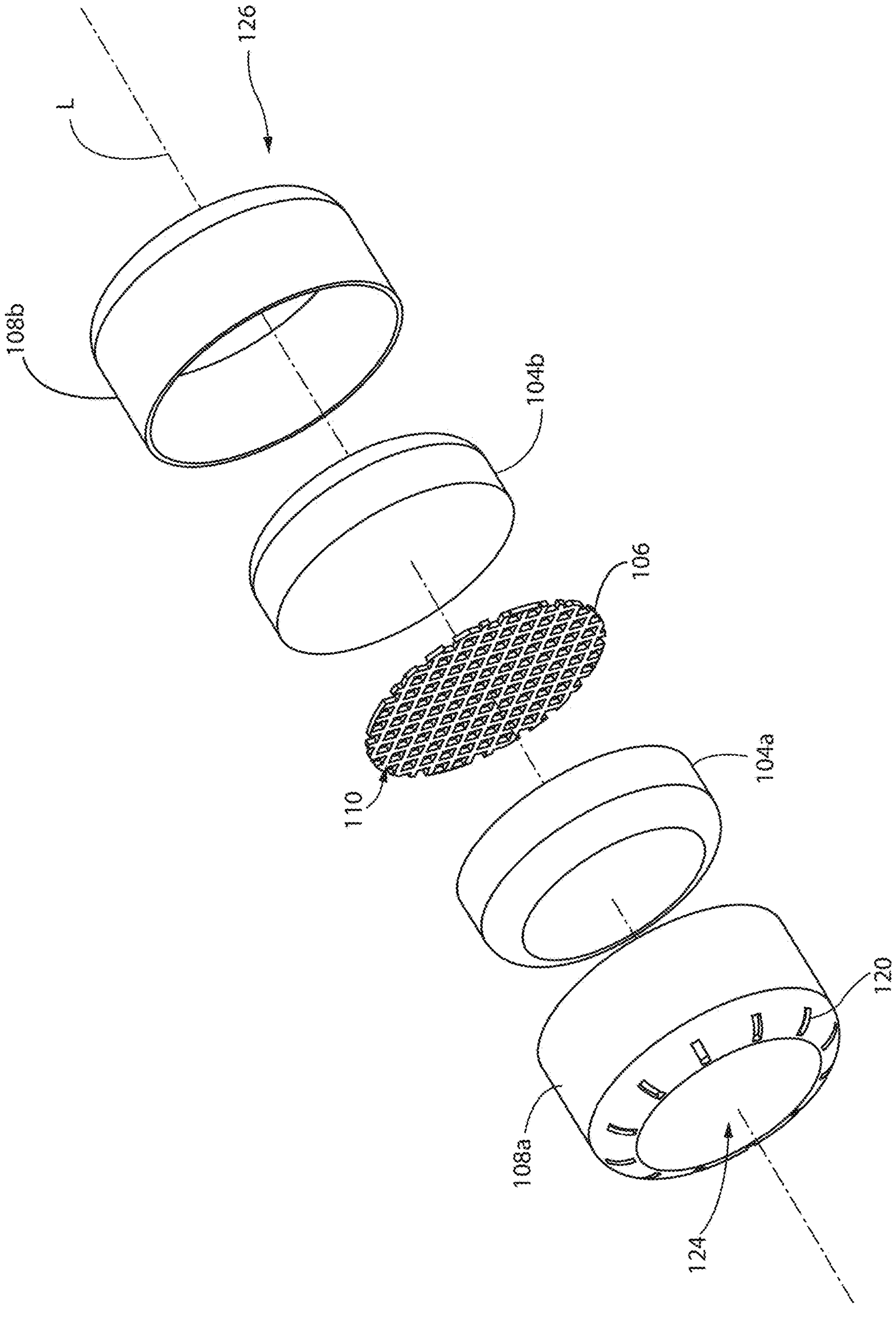
FIGS. 4A and 4B show an exploded views of embodiments of a consumable-containing unit.
Figure 4B:
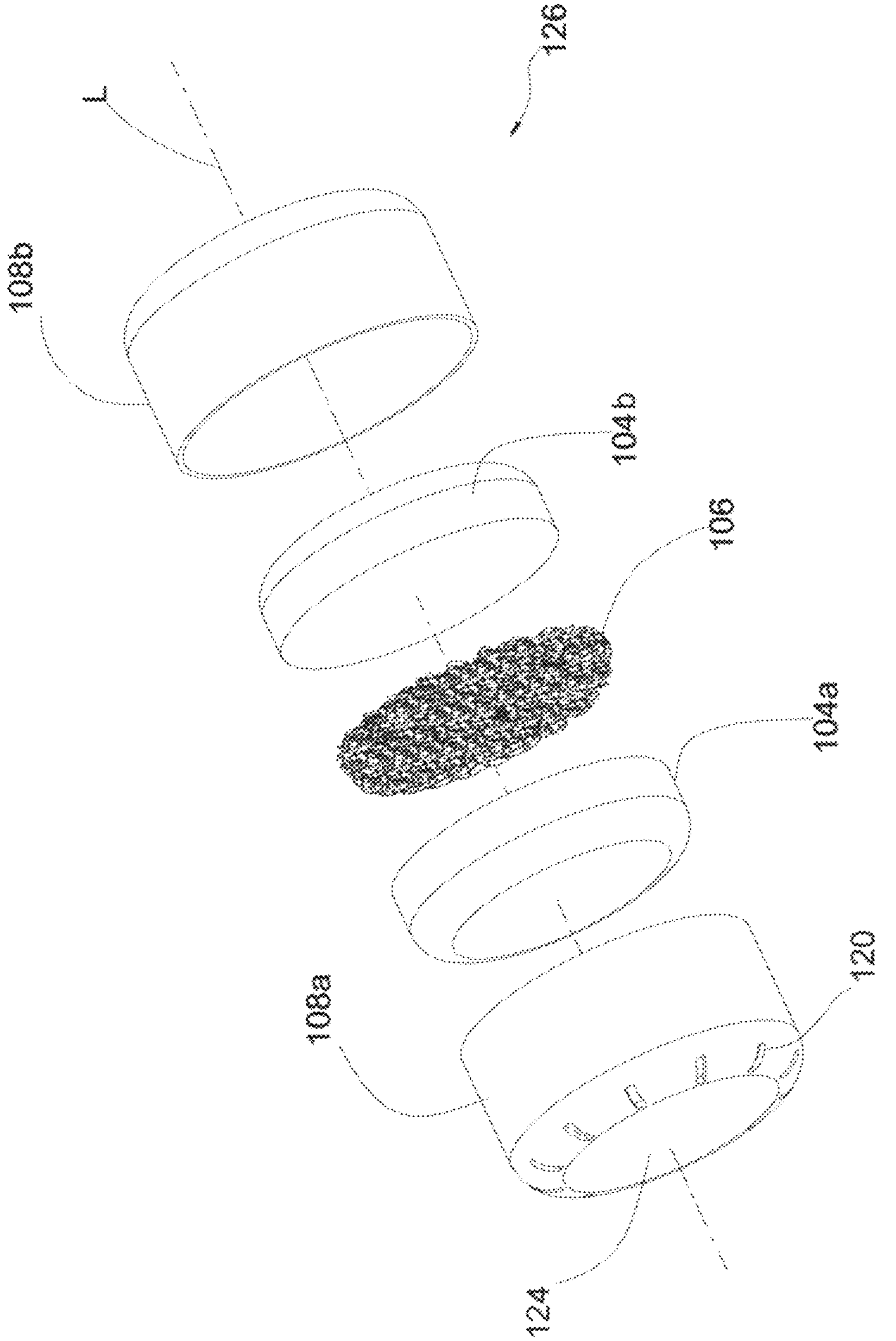
Figure 5A:
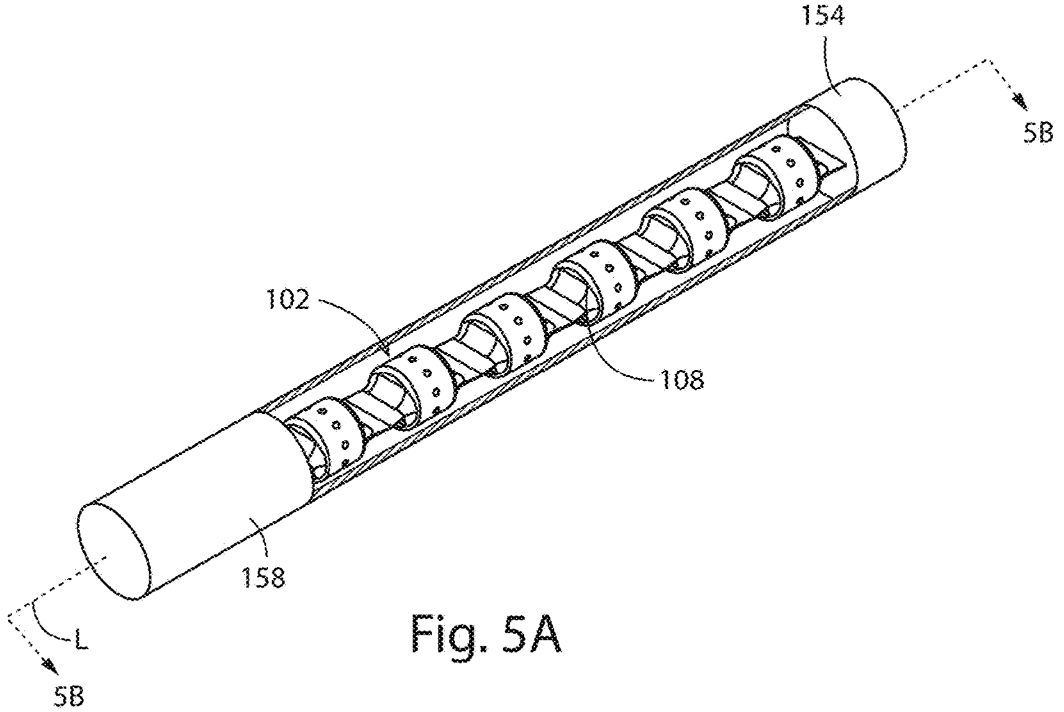
FIG. 5A shows a perspective view of another embodiment of the present invention.
Figure 5B:
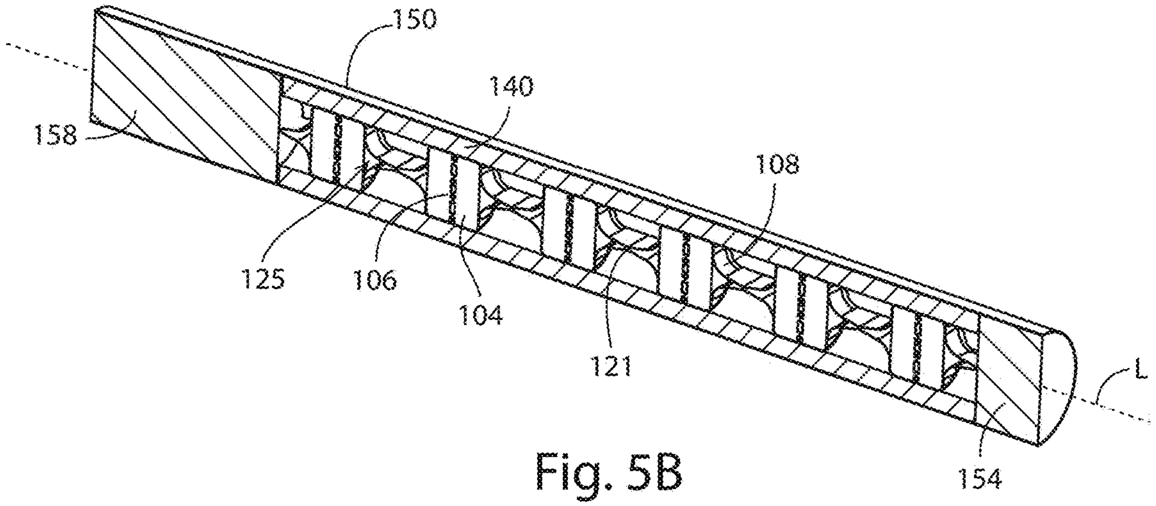
FIG. 5B shows a cross-sectional view of the embodiment shown in FIG. 5A taken along line 5B-5B.
Figure 5C:
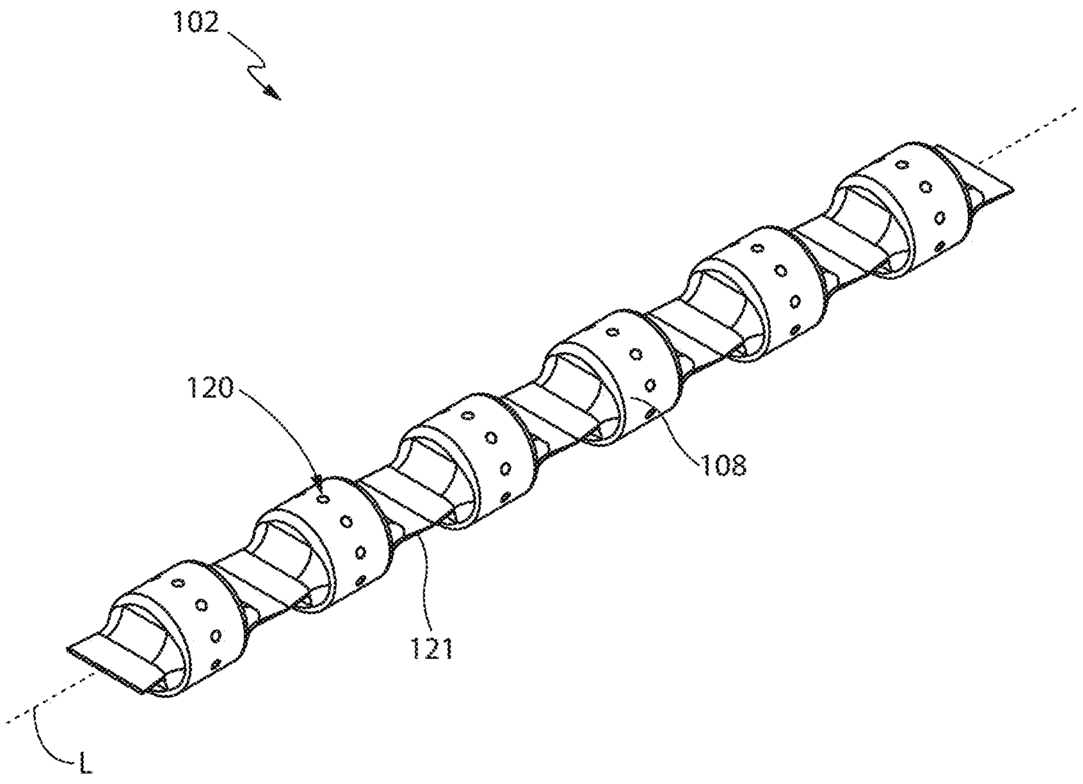
FIG. 5C shows a perspective view of a consumable-containing package from the embodiment shown in FIG. 5A.

In some embodiments, the consumable-containing unit 104 may be formed from two sections 104*a*, 104*b* of the consumable-containing unit 104 combined together to make a whole, as shown in FIGS. 4A and 4B. The two sections 104*a*, 104*b* are defined by splitting the consumable-containing unit 104 in half transversely along a plane perpendicular to the longitudinal axis L. The susceptor 106 may be sandwiched in between the two sections 104*a*, 104*b*. With the susceptor 106 sandwiched in between the two consumable-containing sections 104*a*, 104*b*, the consumable-containing unit 104 can be enclosed by the encasement 108. This process can be repeated to create a plurality of individual consumable-containing units 104 sandwiching respective susceptors 106, each individually contained in a respective encasement 108. The plurality of consumable-containing units 104 may be stacked, one on top of the other to create the consumable-containing package 102 in which each individual consumable-containing unit 104 may be heated individually, one at a time.

Figure 3A:
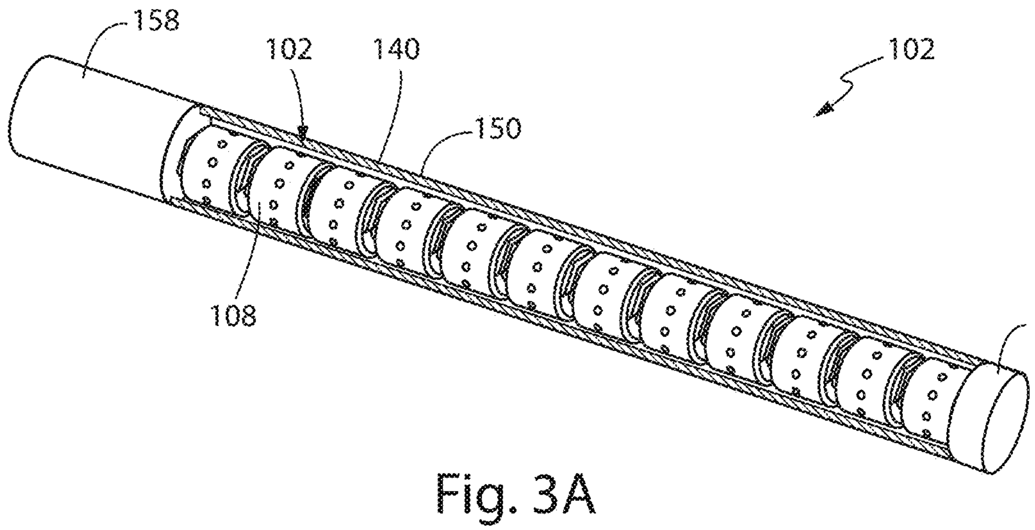
FIG. 3A shows a perspective view of another embodiment of the present invention.
Figure 3B:
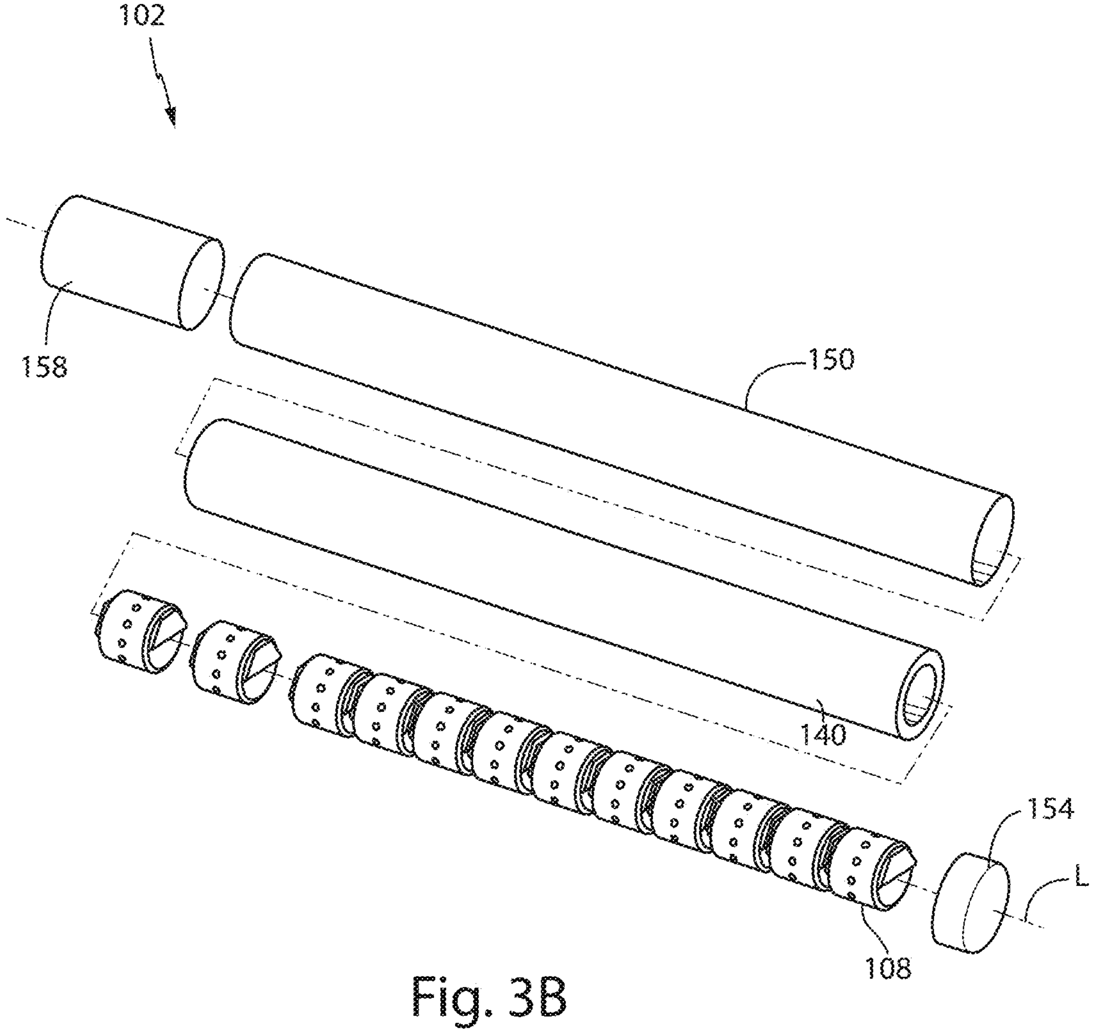
FIG. 3B shows a partially exploded view of the embodiment shown in FIG. 3A.
Figure 3C:
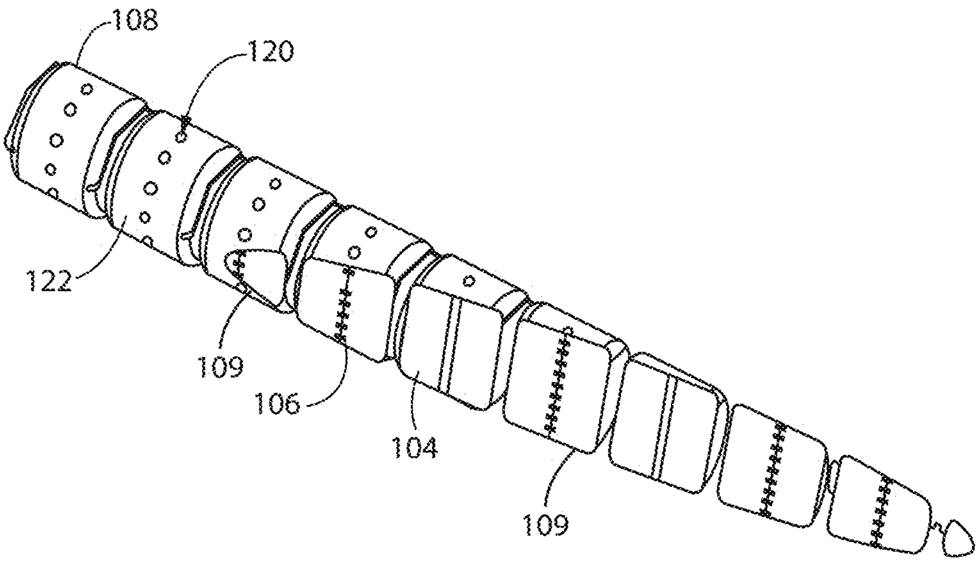
FIG. 3C shows a perspective view of the embodiment shown in FIG. 3A with portions cut away and/or removed to reveal internal components.
Figure 3D:
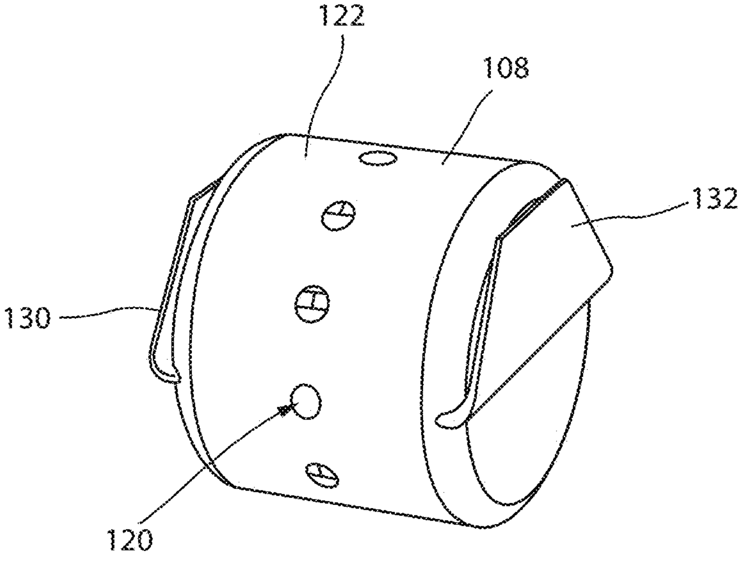
FIG. 3D shows a close-up, perspective view of a consumable-containing unit shown in FIG. 3A.

In some embodiments, the encasement 108 may be aluminum wrapped around a consumable-containing unit 104. The aluminum can have excess folds 130, 132 at opposite ends as shown in FIG. 3D. These excess folds 130, 132 create a gap in between adjacent consumable-containing units 104 when stacked on top of each other.

In some embodiments, the encasement 108 may be two-pieces having a first encasement section 108*a* and a second encasement section 108*b* that serves as a covering or cap to enclose the consumable-containing unit 104 inside the first encasement section 108*a*, as shown in FIGS. 4A and 4B. As described previously, the openings 120 on the encasement 108 may be along the sidewall 122 or at the ends 124, 126. As described previously, the susceptor 106 may be any type of metal that is subject to induced heating, including steel wool as shown in FIG. 4B. In the preferred embodiments, numerous edges are created in the susceptor 106 by creating a plurality of holes 110 or using steel wool filaments compressed together. The steel wool filaments may be fine to medium grade. As discussed above, the steel wool pad may be soaked in, coated, or filled with additive, flavorant, protectant, and/or filler.

Figure 6A:
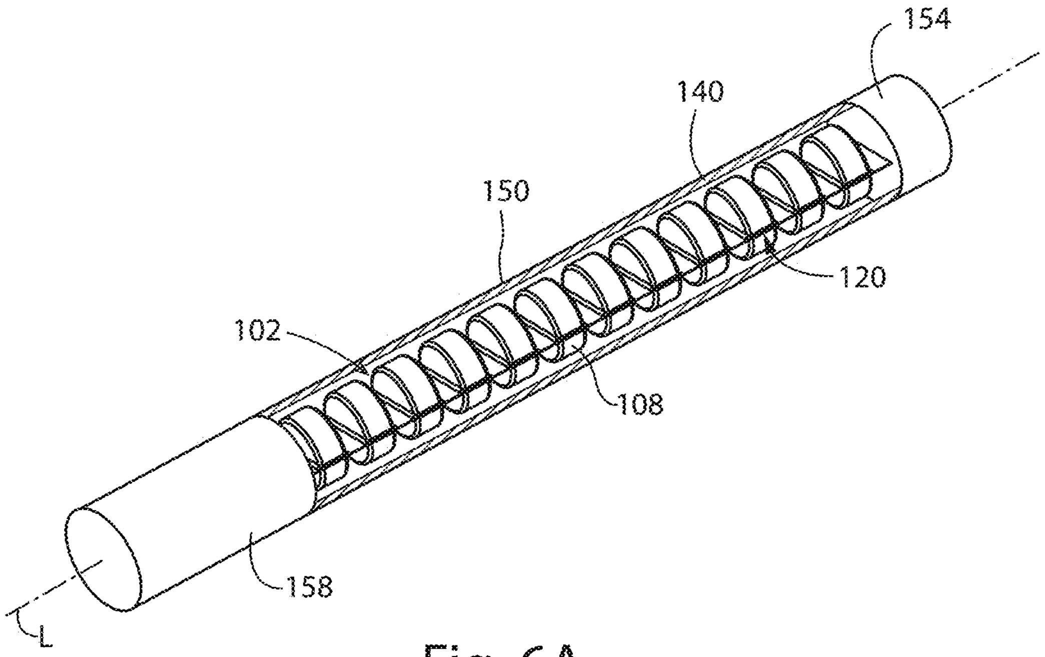
FIG. 6A shows a perspective view of another embodiment of the present invention.
Figure 6B:
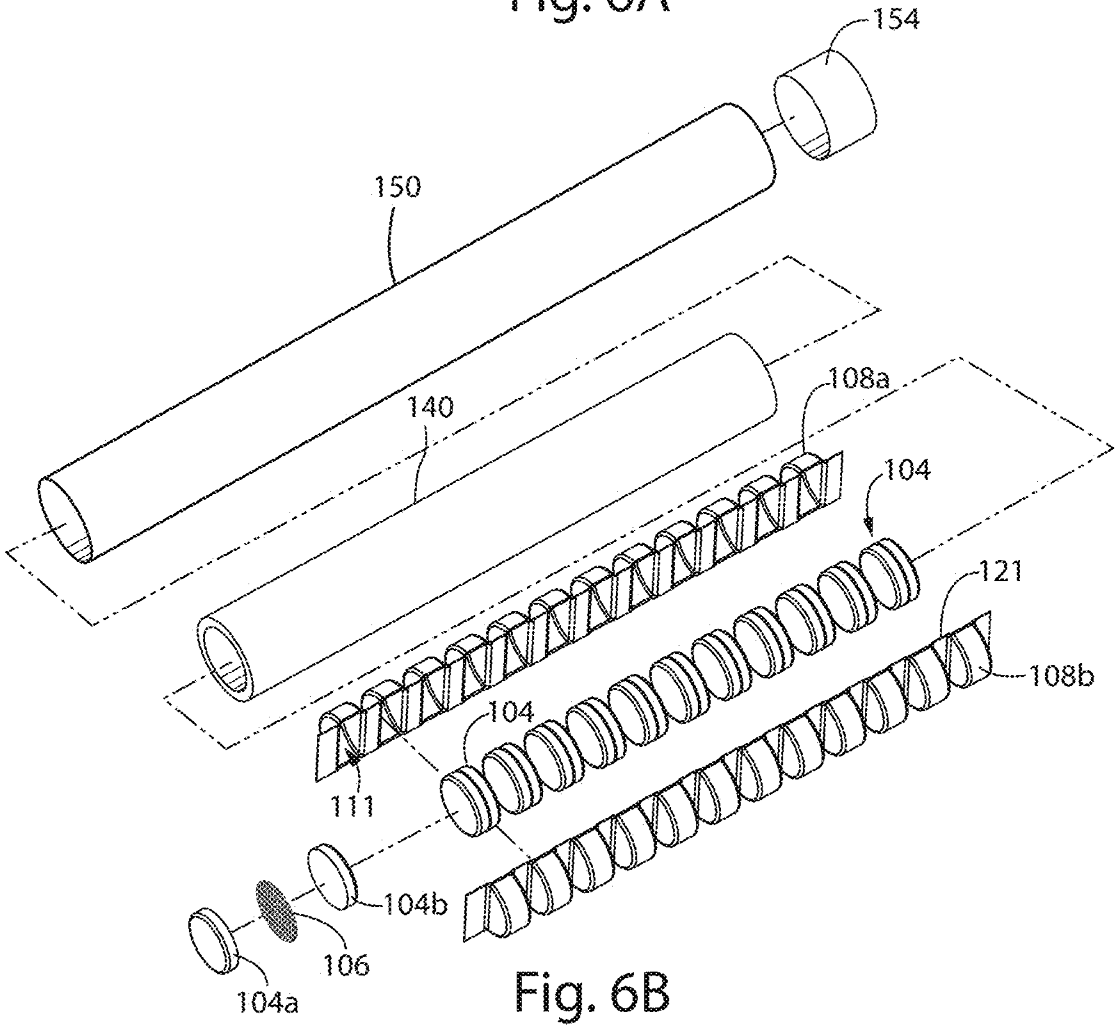
FIG. 6B shows an exploded view of the embodiment shown in FIG. 6A.

In some embodiments, a plurality of consumable-containing units 104 may be contained in a single elongated encasement 108, as shown in FIGS. 5A-6B. The encasement 108 may be molded with compartments 111 to receive each individual consumable-containing unit 104. In some embodiments, the individual compartments 111 may be connected to each other by a bridge 121. In some embodiments, the bridge 121 may define a channel 125 that allows fluid communication from one compartment 111 to another. In some embodiments, the bridge 121 may be crimped to prevent fluid communication between one compartment 111 and the other through the bridge 121. In some embodiments, the elongated encasement 108 may be a two-piece assembly split transversely along the longitudinal axis L, as shown in FIGS. 6A-6B. The consumable-containing units 104 can be seated in the compartments 1/1 of one of the encasement sections 108*a*. The second encasement section 108*b* can then be mated to the first encasement section 108*a* to cover the consumable-containing units 104. The split between the first encasement section 108*a* and the second encasement section 108*b* can be used as the opening 120. Alternatively, preset openings 120 can be formed in one or both of the encasement sections 108*a*, 108*b*.

Figure 7A:
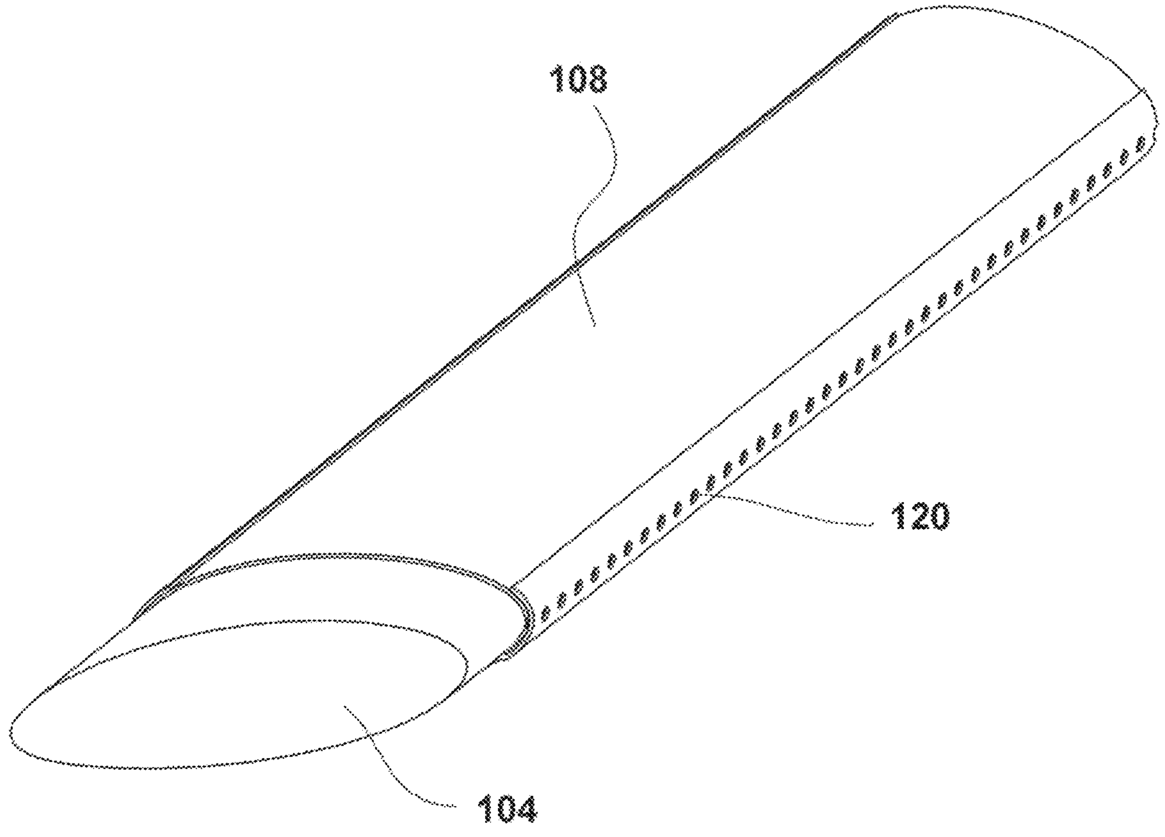
FIGS. 7A and 7B show perspective views of other embodiments of the present invention.
Figure 7B:
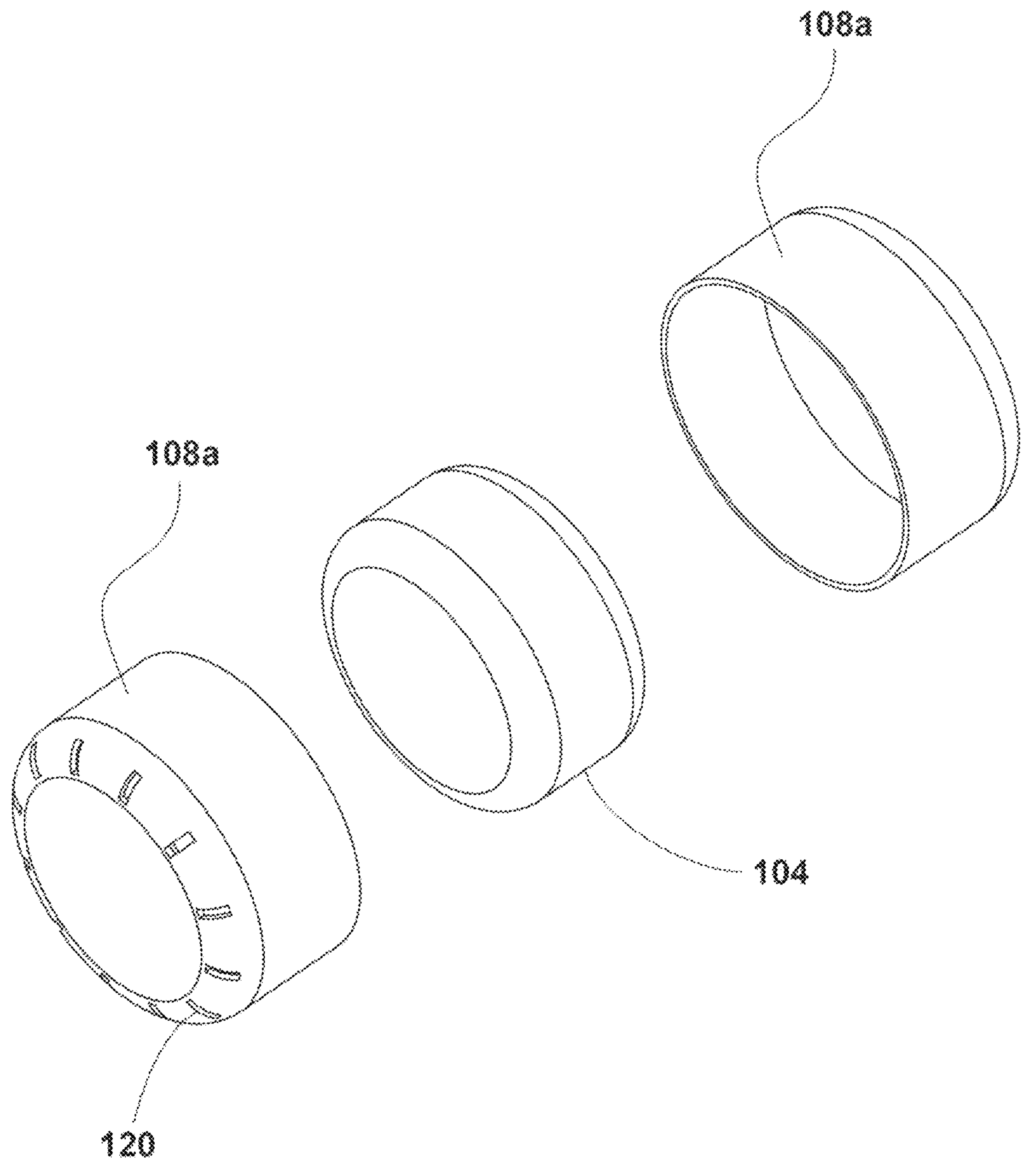

In some embodiments, as shown in FIG. 7A-7D, the encasement 108 may be made out of material that allows the encasement 108 to serve as the susceptor. For example, the encasement 108 can be made of steel, or otherwise comprise ferrous metal, or any other metal that can be heated using induction heating. In such an embodiment, an interior susceptor 106 would not be required to be embedded into the consumable-containing unit 104. The encasement 108 can still comprise a plurality of holes 120, and be covered with an additive and/or sealant such as PGA. Such an embodiment can be made into an elongated tube as shown in FIG. 7A or into tablets or disks as shown in FIG. 7B. The encasement 108 can be a two piece encasement having a first encasement section 108*a* and a second encasement section 108*b* as discussed previously.

Figure 7C:
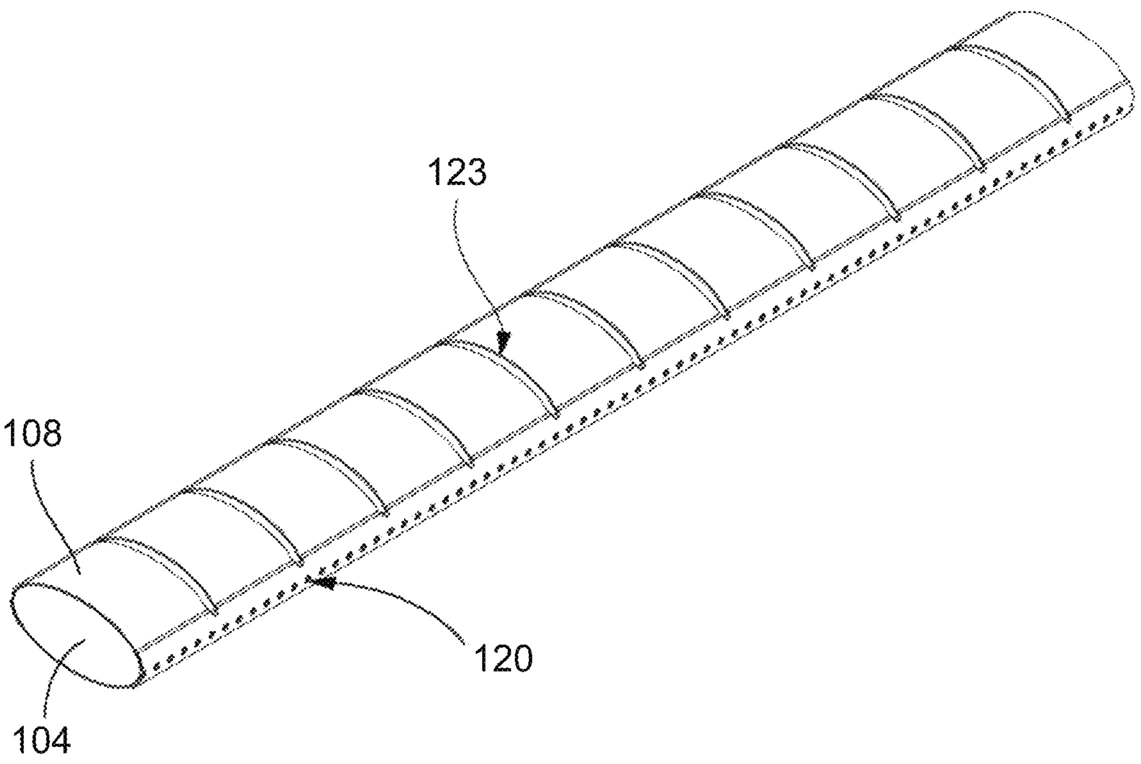
FIG. 7C shows another embodiment of the present invention.
Figure 7D:
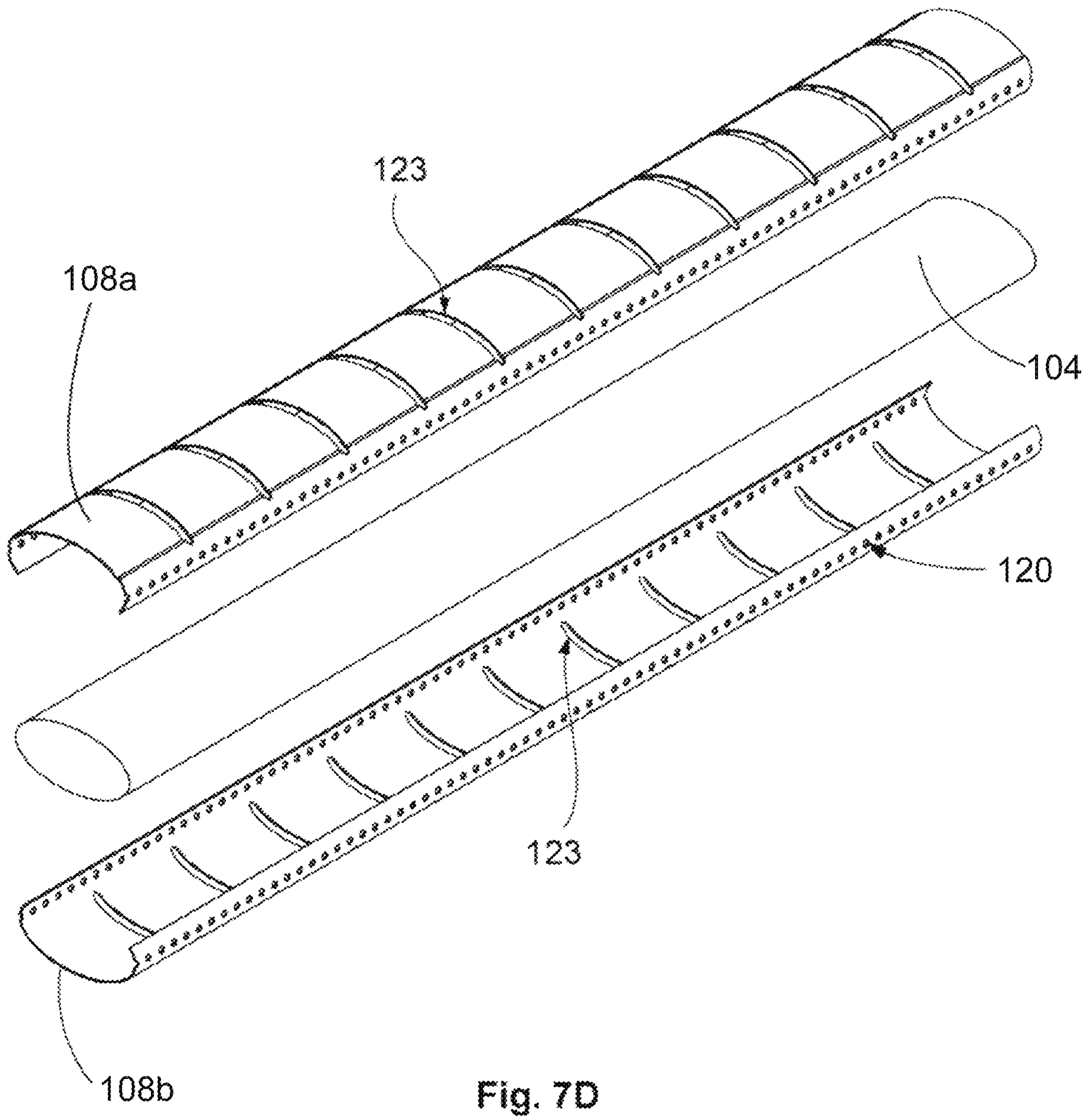
FIG. 7D shows an exploded view of the embodiment in FIG. 7C.

In some embodiments, the encasement 108 may have transverse slits 123 transversely across the encasement 108, generally perpendicular to the longitudinal axis L as shown in FIGS. 7C and 7D. The slits 123 create segmentation in the encasement 108 so that only a small segment of the consumable-containing unit 104 is heated per actuation. The transverse slits 123 may be through holes, which expose the consumable-containing unit 104 underneath. In such embodiments, the segments may be filled with a coating or some other plug to seal the hole, either permanently or with a substance that will melt upon heating and allow the aerosol to escape through the slit 123. In some embodiments, the plug may be made from material that can function as a heat sink and/or a substance that is not easily heated via induction to reduce the heating effect at the transverse slits 123. In some embodiments, the transverse slit 123 may be a recessed portion of or an indentation in the encasement 108. In other words, the transverse slit 123 may be a thinned portion of the encasement 108. As such, the transverse slit 123 may define a well. The well can be filled with a plug that can function as a heat sink and/or a substance that is not easily heated via induction to reduce the heat transfer along the transverse slit 123.

Induction Heating

Figure 8A:
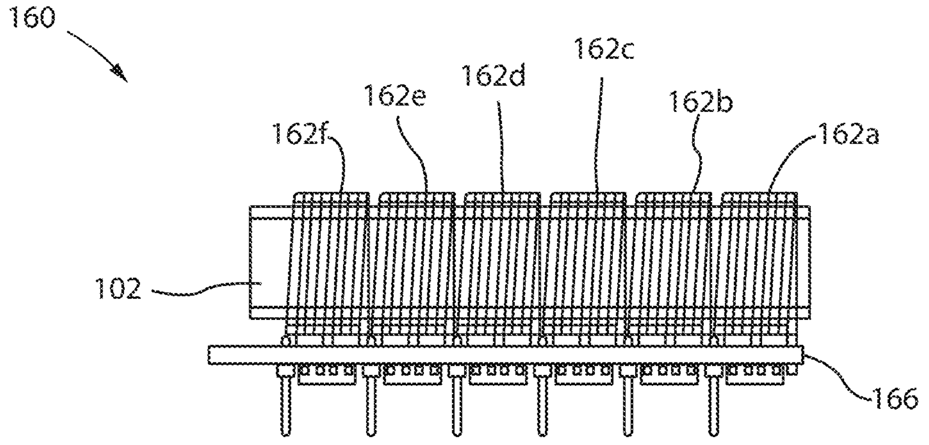
FIG. 8A shows a side view of an embodiment of the heating element.
Figure 8B:
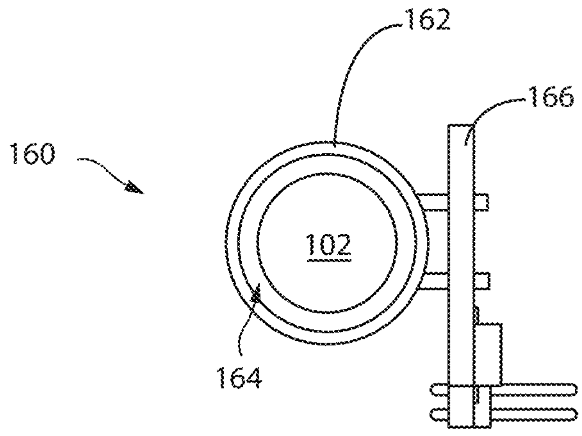
FIG. 8B shows a front view of the heating element shown in FIG. 7A.

Heating the consumable-containing unit 104 is achieved by an induction heating process that provides non-contact heating of a metal, preferably ferrous metal, by placing the metal in the presence of a varying magnetic field generated by an inductive heating element 160, as shown in FIGS. 8A-8B. In the preferred embodiment, inductive heating element 160 is a conductor 162 wrapped around into a coil that generates the magnetic field when current is passed through the coil. The metal susceptor 106 is placed close enough to the conductor 162 so as to be within the magnetic field. In the preferred embodiment, the coil is wrapped in a manner that defines a central cavity 164. This allows the consumable-containing package 102 to be inserted into the cavity 164 to have the coil surround the susceptor 106 without touching the susceptor 106. The current passed through the coil is alternating current creating a rapidly alternating magnetic field. The alternating magnetic field may create eddy currents in the susceptor 106, which may generate heat within the susceptor 106. Thus the consumable-containing package 102 is generally heated from the inside out. In embodiments in which the encasement 108 also serves as the susceptor, the consumable-containing package 102 is heated from the outside in.

In the preferred embodiment, segments of the consumable-containing package 102 are to be heated individually. As such, the conductor 162 may also be provided as individual sets of coiled conductors 162*a-f*, as shown in FIG. 8A. Each conductor coil 162*a-f* may be attached to a controller 166 that can be controlled to activate one conductor coil 162*a-f* at a time. Although there are six (6) conductor coils 162*a-f* shown in FIG. 8A, greater or fewer coils could be used. In an alternative embodiment, a single conductor coil 162 may be used, with a mechanical mechanism that translates the coil along the consumable-containing package 102 to individually heat each segment of the consumable-containing package 102.

The individual conductor coils 162*a-f* may match up with discrete segments of the consumable-containing package 102, as described above, and shown in FIGS. 3A-6B. Alternatively, the conductor coils 162*a-f* could each correspond to a certain length of a continuous consumable-containing package 102 such as shown in FIGS. 2A-2D, 7A, and 7D, to heat only that certain length. In preliminary testing of such embodiments, heating along discrete lengths of the consumable-containing package 102 does not appreciably heat adjacent portions of the consumable-containing package 102, as the adjacent non-heated consumable appears to act as an insulator. Thus, structures to limit heat transfer may not be necessary, although such structures have been discussed herein and may be useful.

The efficiency of conversion of electric power into thermal heat in the susceptor 106 is referred to herein as the "conversion efficiency," and is based on a variety of factors, such as bulk resistivity of the metal, dielectric of the metal, metal geometry and heat loss, power supply consistency and efficiency, coil geometry, and losses and overall frequency of operation—to identify some of these factors. The device 100 is designed and configured to maximize the conversion efficiency.

Aerosol Producing Device

Figure 9A:
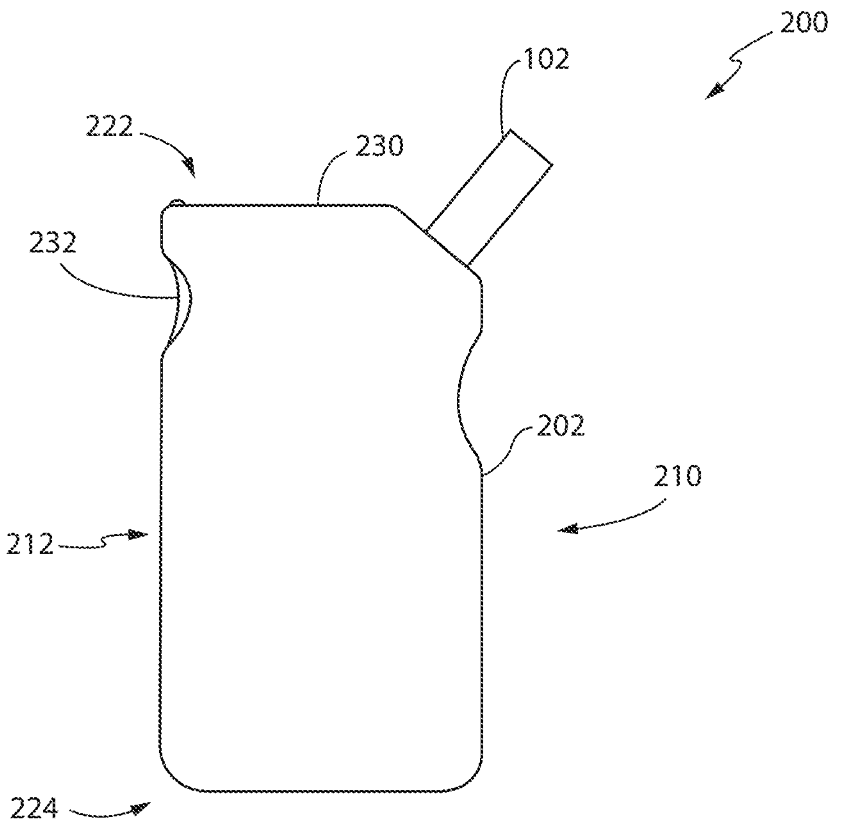
FIG. 9A shows a side view of an embodiment of the aerosol producing device.
Figure 9B:
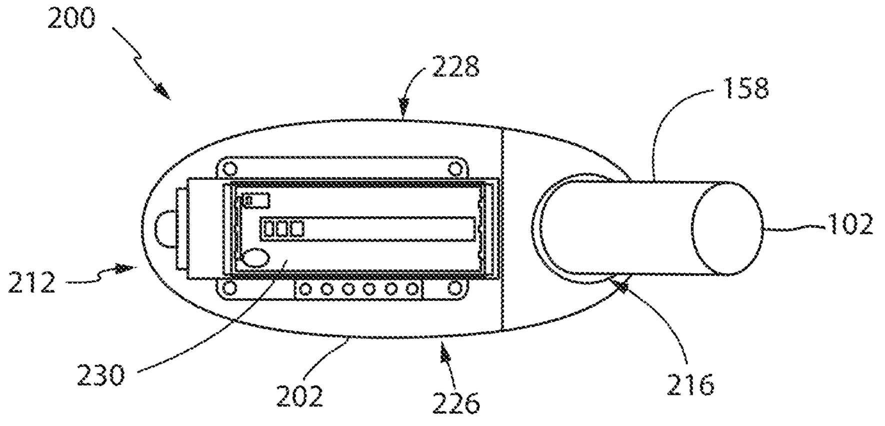
FIG. 9B shows a top view of the aerosol producing device shown in FIG. 8A.
Figure 9C:
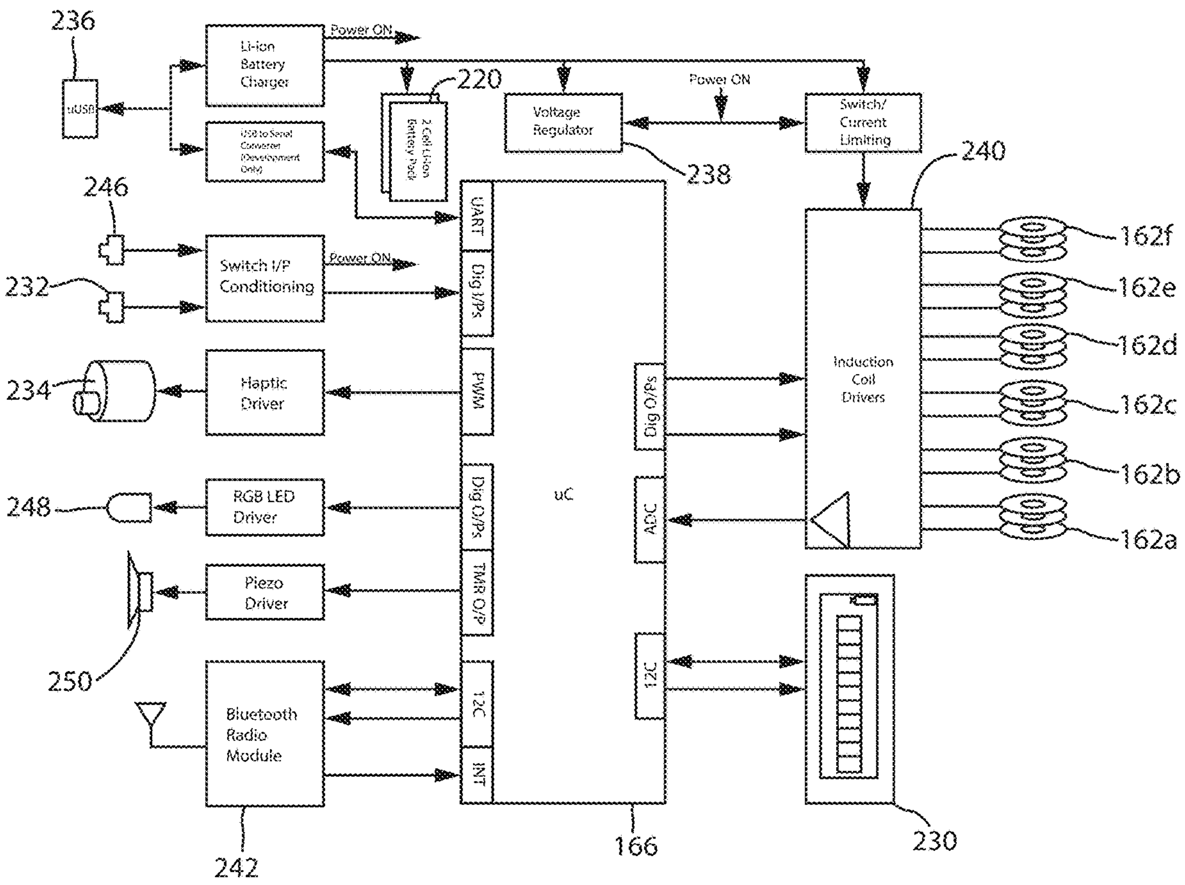
FIG. 9C shows a schematic diagram of an embodiment of the controller and its connection to other components of the present invention.

To effectuate the heating and conversion to an aerosol of the consumable, the housing 150 containing the filter tube 140 wrapped around the consumable-containing unit 104 is placed inside an aerosol producing device 200, as shown in FIGS. 9A-9C. The aerosol producing device 200 comprises a case 202 to contain the consumable-containing package 102, the induction heating element 160 to heat the susceptor 106, and a controller 166 to control the induction heating element 160.

The case 202 is designed for ergonomic use. For ease of nomenclature, the case 202 is described using terms such as front, back, sides, top and bottom. These terms are not meant to be limiting, but rather, used to describe the positions of various components relative to each other. For purposes of describing the present invention, the front 210 will be the portion of the case 202 that faces the user when used as intended as described herein. As intended, when the user grasps the case 202 for use, the fingers of the user will wrap around the back 212 of the device 100 with the thumb wrapping around the front 210.

The case 202 defines a cavity 214 (see FIG. 1) in which the components of the device 100 are contained. As such, the case 202 is designed to contain a substantial portion of the consumable-containing package 102, the controller 166, the inductive heating element 160, and the power source 220. In the preferred embodiment, the top-front portion of the case 202 defines an orifice 216. The mouthpiece portion 158 of the consumable-containing package 102 projects out from the orifice 216 so that the user has access to the consumable-containing package 102. The mouthpiece 158 projects sufficiently out of the case 202 to allow the user to place his or her lips around the mouthpiece 158 to inhale the consumable aerosol.

The case 202 is intended to be user-friendly and easily carried. In the preferred embodiment, the case 202 may have dimensions of approximately 85 mm tall (measured from top 222 to bottom 224) by 44 mm deep (measured from front 210 to back 212) by 22 mm wide (measured from side 226 to side 228). This may be manufactured by proto-molding for higher quality/sturdier plastic parts.

In some embodiments, the consumable-containing package 102 may be held in a retractor that allows the consumable-containing package 102 to be retracted inside the case 202 for storage and travel. Due to the configuration of the consumable-containing package 102, the case 202 does not need a clean-out through-hole like other devices in which some combustion is still prevalent creating byproduct residue from the combustion. In embodiments where the consumable-containing package 102 comprises a user mouthpiece 158 and filter tube 140, if there are any byproducts created during operation they will remain in the disposable consumable-containing package 102, which is changed out when the user inserts a new consumable-containing package 102, and filter tube 140 if necessary, into the case 202. Thus, the interior of case 202 stays clean during operation.

In the preferred embodiment, the top 222 of the case 202 comprises a user interface 230. Placing the user interface 230 at the top 222 of the case 202 allows the user to easily check the status of the device 100 prior to use. The user could potentially view the user interface 230 even while inhaling. The user interface 230 may be multi-color LED (RGB) display for device status indication during use. A light-pipe may be used to provide wide angle visibility of this display. By way of example only, user interface 230 has a 0.96 inch (diagonal) OLED display with 128×32 format and I2C (or SPI) interface. The user interface 230 is capable of haptic feedback 234 (vibration) and audio feedback 250 (piezo-electric transducer). In some embodiments, a clear plastic (PC or ABS) cover may be placed over the OLED glass to protect it from damage/scratches.

The back 212 of the case comprises a trigger 232, which is a finger activated (squeeze) button to turn the device on/initiate "puff." Preferably, the trigger 232 is adjacent to the top 212. In this configuration, the user can hold the case 202 as intended with his or her index finger on or near the trigger 232 for convenient actuation. In some embodiments, a locking mechanism may be provided on the trigger 232—either mechanically or through electrical interlock that requires the case 202 to be opened before the trigger 232 is electrically enabled. In some embodiments, a haptic feedback motor 234 may be mechanically coupled to the trigger 232 to improve recognition of haptic feedback by the user during operation. Actuation of the trigger 232 powers the induction heating element 160 to heat the susceptor 106.

The device 100 is powered by a battery 220. Preferably, the battery 220 is a dual cell Li-ion battery pack (series connected) with 4A continuous draw capability, and 650-750 mAh rated. The dual cell pack may include protection circuit. The battery 220 can be charged with a USB Type "C" connector 236. The USB type "C" connector 236 can also be used for communications. The controller 166 may also provide for battery voltage monitoring 238 for battery state of charge/discharge display.

The trigger 232 is operatively connected to the induction coil driver 240 via the controller 166. The induction coil driver 240 activates the inductive heating element 160 to heat the susceptor 106. The present invention eliminates the motor driven coil design in the prior art. The induction coil driver 240 can provide drive/multiplexing for multiple coils. For example, the induction coil driver 240 may provide drive/multiplexing for 6 or more coils. Each coil is wrapped around one segment of the consumable-containing package 102 and can be actuated at least one or more times. Therefore, one segment of the consumable-containing package 102 can be heated twice, for example. In a device 100 having six coils, the user could extract 12 "puffs" from the device 100.

The induction coil drive circuit in the preferred embodiment may be directly controlled by a microprocessor controller 166. A special peripheral in this processor (Numerically Controlled Oscillator) allows it to generate the frequency drive waveforms with minimal CPU processing overhead. The induction coil circuit may have one or more parallel connected capacitors, making it a parallel resonant circuit.

The drive circuit may include current monitoring with a "peak detector" that feeds back to an analog input on the processor. The function of the peak detector is to capture the maximum current value for any voltage cycle of the drive circuit providing a stable output voltage for conversion by an analog-to-digital converter (part of the microprocessor chip) and then used in the induction coil drive algorithm.

The induction coil drive algorithm is implemented in firmware running on the microprocessor. The resonant frequency of the induction coil and capacitors will be known with reasonable accuracy by design as follows:

$$\text{Frequency of resonance (in Hertz)}=1/(2*pi*\text{SQRT}\{L*C\})$$

where: pi=3.1415 . . . ,

SQRT indicates the square root of the contents in the brackets { . . . },

L=the measured inductance of the induction coil, and

C=the known capacitance of the parallel connected capacitors.

There will be manufacturing tolerances to the values of L and C (from above), which will produce some variation in the actual resonant frequency versus that which is calculated using the formula above. Additionally, there will be variation in the inductance of the induction coil based on what is located inside of this coil. In particular, the presence of a ferrous metal inside (or in the immediate vicinity) of this coil will result in some amount of inductance change resulting in a small change in the resonant frequency of the L-C circuit.

The firmware algorithm for driving the induction coil will sweep the frequency of operation over the maximum expected frequency range, while simultaneously monitoring the current, looking for the frequency where the current draw is at a minimum. This minimum value will occur at the frequency of resonance. Once this "center frequency" is found, the algorithm will continue to sweep the frequency by a small amount on either side of the center frequency and adjust the value of the center frequency as required to maintain the minimum current value.

The electronics are connected to the controller 166. The controller 166 allows for a processor based control of frequency to optimize heating of the susceptor 106. The relationship between frequency and temperature seldom correlates in a direct way, owing in large part to the fact that temperature is the result of frequency, duration and the manner in which the consumable-containing package 102 is configured. The controller 166 may also provide for current monitoring to determine power delivery, and peak voltage monitoring across the induction coil to establish resonance. By way of example only, the controller may provide a frequency of approximately 400 kHz to approximately 500 kHz, and preferably, 440 kHz with a three-second pre-heat cycle to bring the temperature of the susceptor 106 to 400 degrees Celsius or higher in one second. In some embodiments, the temperature of the susceptor 106 can be raised to 550 degrees Celsius or higher in one second. In some embodiments, the temperature can be raised as high as 800 degrees Celsius. Thus, the present invention has an effective range of 400-800 degrees Celsius. In prior art devices, such temperatures would combust the consumable, making the prior art devices ineffective at these temperatures. In the present invention, such high temperatures can still be used to improve the efficiency of aerosol production and allow for quicker heat times.

The device 100 may also comprise a communications system 242. In the preferred embodiment, Bluetooth low energy radio may be used to communicate with a peripheral device. The communications system 242 may serial interface to the main processor for communicating information with a phone, for example. Off-the-shelf RF module (pre-certified: FCC, IC, CE, MIC) can also be used. One example utilizes Laird BL652 module because SmartBasic support allows for rapid application development. The communication system 242 allows the user to program the device 100 to suit personal preferences related to the aerosol density, the amount of flavor released, and the like by controlling the frequency and the 3-stage duty cycle, specifically, the preheat stage, heating stage, and wind-down stage of the inductive heating elements 160. The communication system 242 may have one or more USB ports 236.

In some embodiments, an RTC (Real-time Clock/Calendar) with battery back-up may be used to monitor usage information. The RTC can measure and store relevant user data to be used in conjunction with an external app downloaded on to a peripheral device, such as a smartphone.

In some embodiments, a micro-USB connector (or USB type C connector or other suitable connector) may be located on the bottom of the case 202. Support connector with plastics may be provided on all sides to reduce stress on connector due to cable forces.

By way of example only, the device 100 may be used as follows. Power for the device may be turned on from momentary actuation of the trigger 232. For example, a short press of the trigger (<1.5 sec) may turn the device 100 on but does not initiate the heating cycle. A second short press of the trigger 232 (<1 sec) during this time will keep the device 100 on for a longer period of time and initiate Bluetooth advertising if no active (bonded) Bluetooth connection with phone currently exists. A longer press of the trigger 232 (>1.5 sec) initiates the heating cycle. The power for the device 100 may remain on for a short period of time after each heating cycle (e.g., 5 sec) to display updated unit status on the OLED user interface 230 before powering off. In some embodiments, the device 100 may power on when the consumable-containing package 102 is deployed from the case 202. In some embodiments, a separate power switch 246 may be used to turn the device on and off.

When an active connection is found with a smartphone and the custom application is running on the smartphone, then the device 100 will remain powered on for up to 2 minutes before powering off. When the battery level is too low to operate, the user interface display 230 flashes several times (showing battery icon at "0%" level) before turning unit off.

In some embodiments, the user interface 230 may display a segmented cigarette showing which segments remain (solid fill) versus which segments have been used (dotted outline) as an indicator of how much of the consumable-containing package 102 still contains consumable products to be released. The user interface 230 can also display a battery icon updated with current battery status, charging icon (lightning bolt) when the device is plugged in, and a Bluetooth icon when active connection exists with a smartphone. The user interface 230 may show the Bluetooth icon flashing slowly when no connection exists but the device 100 is advertising.

The device may also have an indicator 248 to inform the user of the power status. The indicator 248 may be an RGB LED. By way of example only, the RGB LED can show a green LED on when the device is first powered on, a red LED flashing during the preheat time, a red LED on (solid) during the "inhale" time, and a blue LED flashing during charging. Duty cycle of flashing indicates the battery's relative state of charge (20-100%) in 20% increments (solid blue means fully charged). A fast flashing of blue LED may be presented when an active Bluetooth connection is detected (phone linked to device and custom app on phone is running).

Haptic feedback can provide additional information to the user during use. For example, 2 short pulses can be signaled immediately when power is turned on (from finger trigger button). An extended pulse at the end of preheat cycle can be signaled to indicate the devices refer inhalation (start of HNB "inhale" cycle). A short pulse can be signaled when USB power is first connected or removed. A short pulse can be signaled when an active Bluetooth connection is established with an active phone app running on the smartphone.

A Bluetooth connection can be initiated after power is turned on from a short (<1.5 sec) press of the finger grip button. If no "bonded" BLE (Bluetooth Low Energy) connection exists, that the devices may begin slow advertising ("pairing" mode) once a second short press is detected after initial short press is detected that powers the device on. Once a connection is established with the smartphone application, the Bluetooth icon on the user interface display 230 may stop flashing and the blue LED will turn on (solid). If the device 100 is powered on and it has a "bonded" connection with a smartphone, then it may begin advertising to attempt to re-establish this connection with the phone up until it powers off. If the connection with this smartphone is able to be re-established, then the unit may remain powered on for up to 2 minutes before powering itself off. To delete a bonded connection, the user can power the device on with a short press followed by another short press. While BLE icon is flashing, the user can press and hold the trigger 232 until the device 100 vibrates and the Bluetooth icon disappears.

So, by tight control of the afore-mentioned conversion efficiency factors and the product consistency factors, it is possible to provide controlled delivery of heat to the consumable-containing unit 104. This controlled delivery of heat involves a microprocessor controller 166 for the monitoring of the induction heating system 160 to maintain various levels of electrical power delivery to the susceptor 106 over controlled intervals of time. These properties enable a user-control feature that would allow the selection of certain consumable flavors as determined by the temperature at which the consumable aerosol is produced.

Figure 10A:
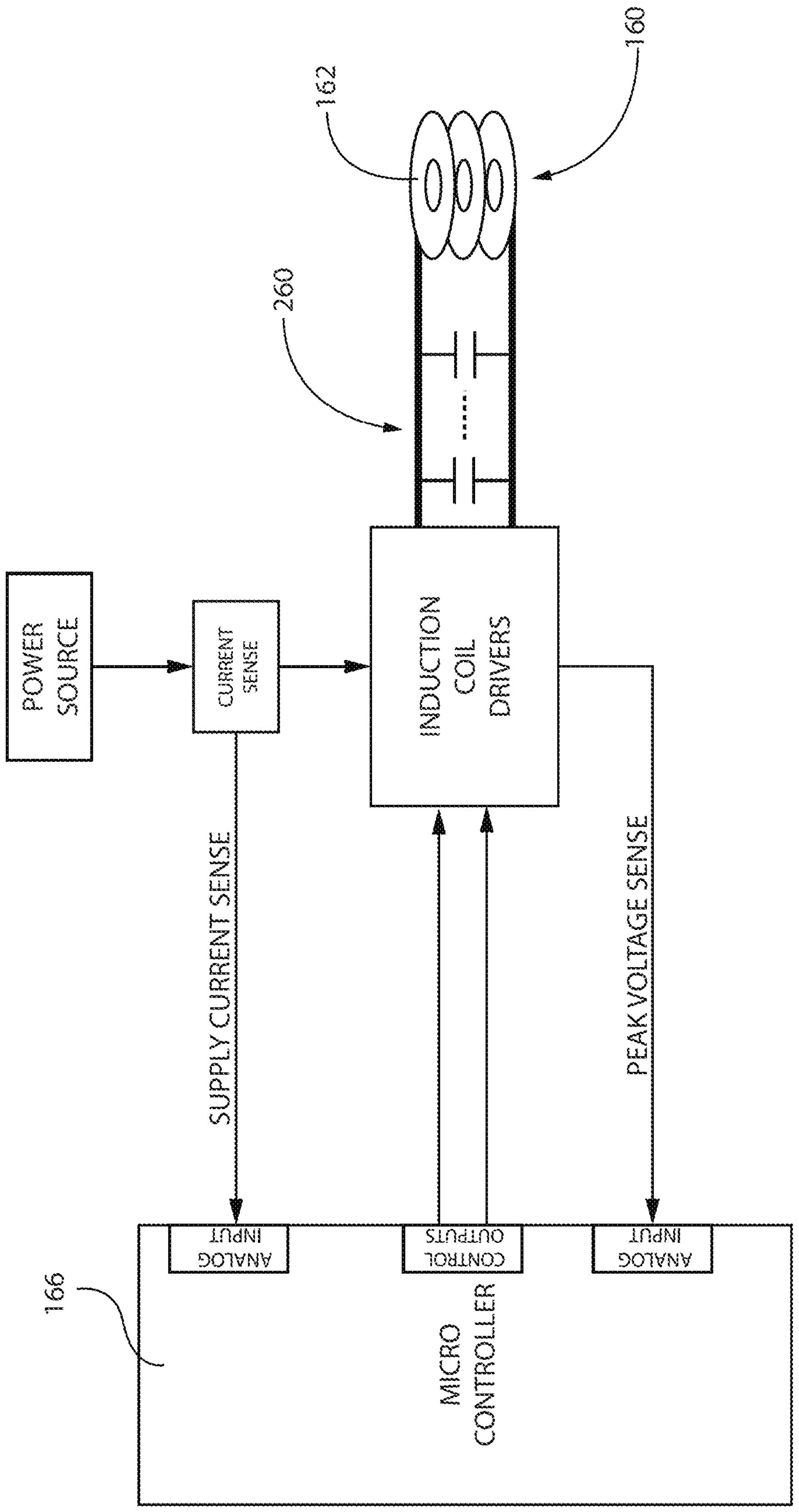
FIGS. 10A-10B show schematic diagrams of embodiments of the controller and its connection to other components of the present invention.

In some embodiments a microprocessor or configurable logic block can be used to control the frequency and power delivery of the induction heating system. As shown in FIG. 10A, an induction heating system 160 may comprise a wire coil 162 in parallel with one or more capacitors 260 to and from a self-resonant oscillator. The inductance of the coil 162 in combination with the capacitance of the capacitor(s) 260 largely defines the resonant frequency at which the circuit will operate. In this embodiment, however, a microprocessor/microcontroller 166 can instead be used to drive the power switches and hence control the frequency of oscillation of the circuit. With this approach, the peak voltage and current are used as feedback to allow the microprocessor control program to provide closed tuning to find resonance. The benefit of this approach is that it allows efficient control of the power delivered to the susceptor by synchronously switching the oscillation of the circuit on and off under the control of the microprocessor 166 control program and provides optimal on/off switching of the power control elements driving the induction coil system.

Based on these concepts, a number of variations have been contemplated by the inventors. Thus, as discussed above, the present invention comprises a consumable-containing unit 104, a susceptor 106 embedded within the consumable-containing unit 104, a heating element 160 configured to at least partially surround the consumable-containing unit 104, a controller 166 to control the heating element 160, and a case 202 to contain the consumable-containing unit 104, the susceptor 106, the heating element 160, and the controller 166. Preferably, the consumable-containing unit 104 is contained with the susceptor 106 in a consumable-containing package 102. As such, any description of the relationships between the consumable-containing package 102 with other components of the invention may also apply to the consumable-containing unit 104, as some embodiments may not necessarily require packaging of the consumable-containing unit 104.

Figure 10B:
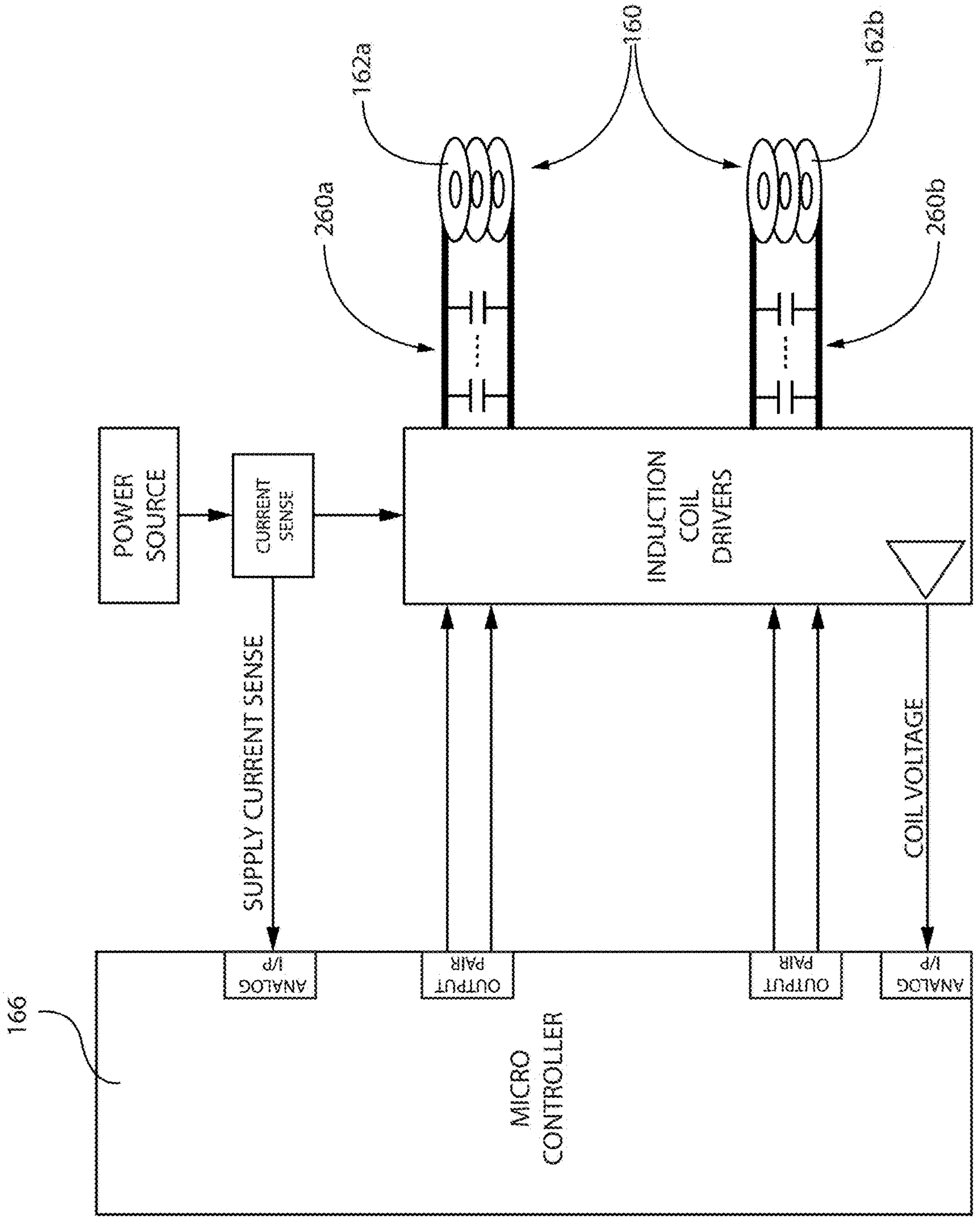

In some embodiments, as shown in FIG. 10A, the device comprises a self-resonant oscillator for controlling the inductive heating element 160. The self-resonant oscillator comprises a capacitor 260 operatively connected to the inductive heating element 160 in parallel. In some embodiments, as shown in FIG. 10B, multiple heating elements 160 may be connected in parallel with their respective capacitors 260*a*, 260*b*. Preferably, the heating elements are in the form of a coiled wire 162*a*, 162*b*.

To allow a single consumable-containing package 102 to generate aerosol multiple times, multiple heating elements 160 and/or moveable heating elements 160 may be used. Thus, the heating element 160 comprises a plurality of coiled wires 162*a, b*, where each coiled wire may be operatively connected to the controller 166 for activation independent of the other coiled wires.

Figure 11:
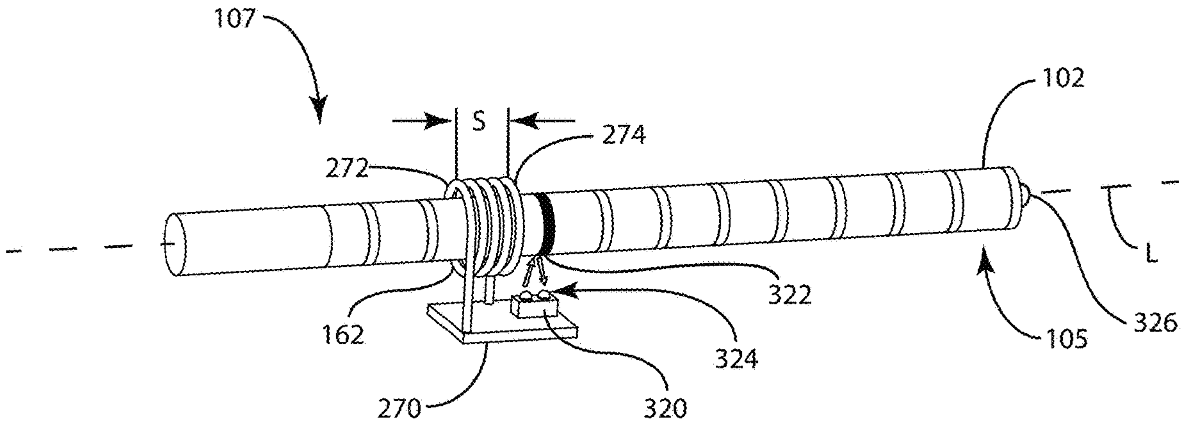
FIG. 11 shows a perspective view of an embodiment of a moveable heating element.

In some embodiments, the heating element 160 may be moveable. In such embodiments, the consumable-containing package 102 may be an elongated member defining a first longitudinal axis L, and the heating element may 162 be configured to move axially along the first longitudinal axis L. For example, as shown in FIG. 11, the heating element 160 may be attached to a carrier 270. The carrier 270 may be operatively connected to the housing 202 so as to move along the length of the consumable-containing package 102 while the heating element 160 remains coiled around the consumable-containing package 102. The span S of the coil (measured as the linear distance from the first turn 272 of the coil to the last turn of the coil 274) may be short enough only to cover a segment of the consumable-containing package 102. Once the heating element 160 has been activated at that segment, the carrier 270 advances along the consumable-containing package 102 along its longitudinal axis L to another segment of the consumable-containing package 102. The distance of travel of the carrier 270 is such that the first turn 272 of the coil stops adjacent to where the last turn 274 of the coil had previously resided. Thus, a new segment of equal size to the previously heated segment is ready to be heated. This can continue until the carrier 270 moves from the first end 105 of the consumable-containing package 102 to the opposite end 107.

In embodiments in which the consumable-containing package 102 contains multiple consumable-containing units 104, the span S of the coil, may be approximately the same size as the length of the consumable-containing unit 104. The carrier 270 may be configured to align the coil with a consumable-containing unit 104 so that the coil can heat an entire consumable-containing unit 104. The carrier 270 may be configured to move the coil from one consumable-containing unit 104 to the next, again allowing a single consumable-containing package 102 to be heated multiple times with the aerosol being released each time.

As shown in FIGS. 12A-12E, to facilitate proper alignment of the heating element 160 around the consumable-containing package 102, the device 200 may comprise a package aligner. For example, the package aligner may be a magnet 280. Preferably, the magnet 280 is a cylindrical magnet defining a second longitudinal axis M. In embodiments in which the heating element 160 is a cylindrical coil wrapped around the consumable-containing package 102, the cylindrical coil defines a third longitudinal axis C. The cylindrical magnet 280 and the heating element 160 are configured to maintain collinear alignment of the second longitudinal axis M with the third longitudinal axis C. Preferably, the cylindrical magnet 280 is a round ring magnet, where the center is a path for air flow. Preferably, any magnet 280 would be a rare earth neodymium type. It would be axially magnetized.

In the embodiment using a magnet 280 for alignment, one end 105 of the consumable-containing package 102 may comprise a magnetically attractive element 281. Preferably, the magnetically attractive element 281 is a stamped ferrous sheet metal component that is manufactured into the first end 105 of the consumable-containing package 102. The cylindrical magnet 280 could be part of the aerosol producing device 200 and the consumable-containing package 102 could have a magnetically attractive element 281 or washer attached to its end 105 so that the consumable-containing package 102 is pulled onto the magnet 280 affixed to the aerosol producing device 200. Other combinations of magnets 280 and magnetically-attractive elements 281, in various positions, may be used to accomplish the desired alignment.

Figures 12A, 12B, 12C, 12D:
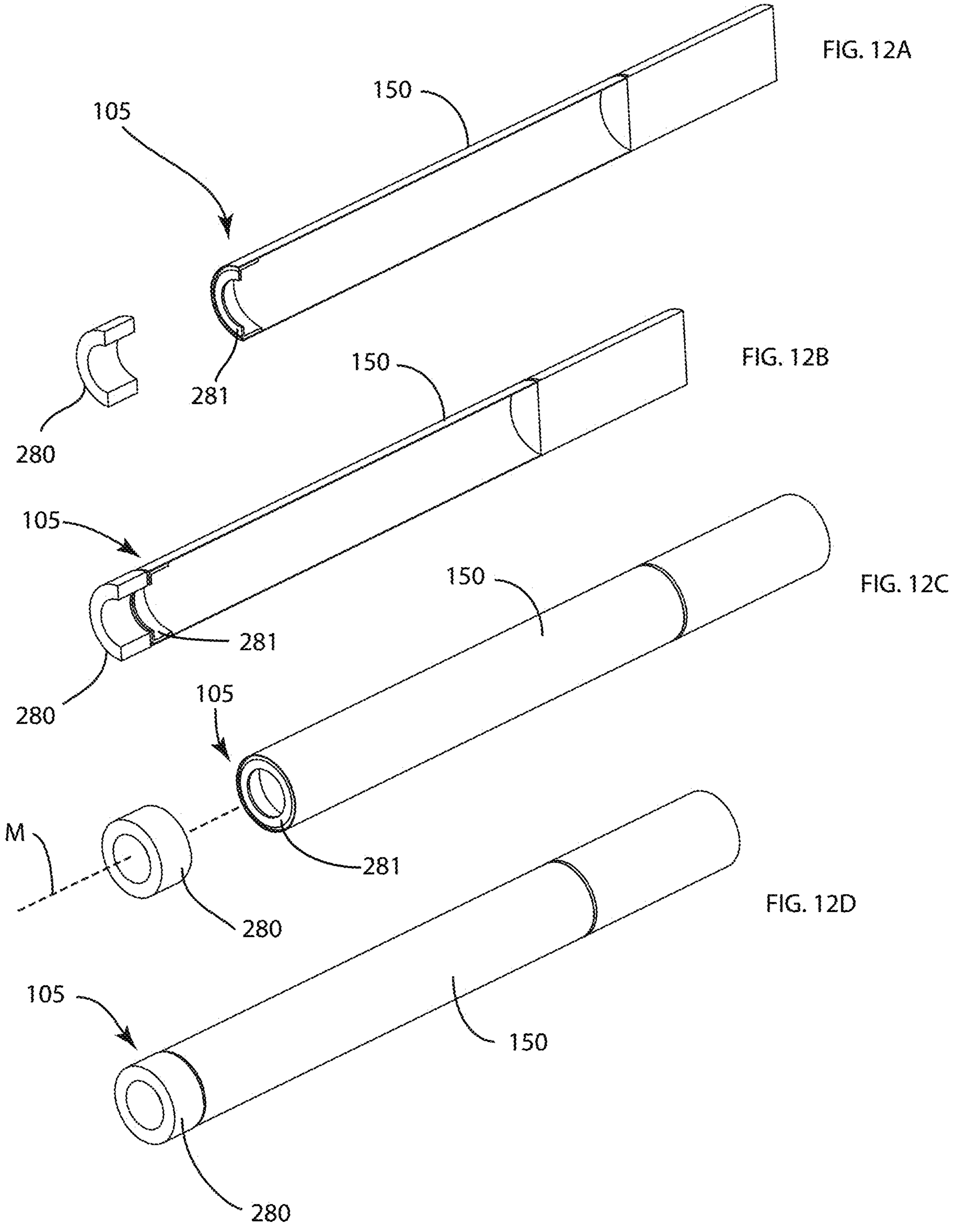
FIGS. 12A-12D show exploded views, cross-sectional views and perspective views of an embodiment of the present invention using a magnet for alignment.
Figure 12E:
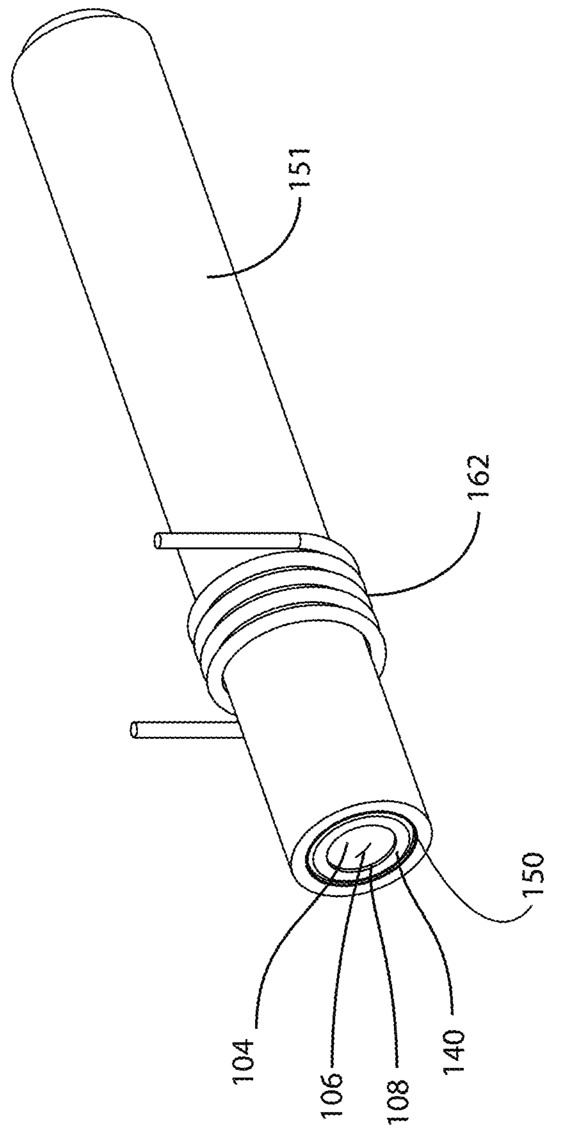
FIG. 12E shows a perspective view of another embodiment of an alignment mechanism.

In some embodiments, preferably one that uses a consumable-containing package 102 with a filter tube 140 and a housing 150, the package aligner may be a receiver 151, such as a closely-fitting cylinder (if the housing 150 is cylindrical) that may be used to align the consumable-containing package 102, and the coil 162 could be positioned outside the receiver 151, as shown in FIG. 12E. Preferably, the receiver 151 would be made of non-conductive material to avoid induction heating, such as borosilicate glass, quartz glass, Pyroceram glass, Robax glass, high-temperature plastics such as Vespel, Torlon, polyimide, PTFE (polytetratluoroethylene), PEEK (polyetheretherketone), or other suitable materials. Alternatively, the cylinder could be made of a conductive material that has a lower resistivity than the susceptor 106 in the consumable-containing package 102, which would allow some induction heating of the receiver 151, but not as much as the susceptor 106. Examples of lower-resistive materials may include copper, aluminum, and brass, where the susceptor 106 is made of higher-resistance materials such as iron, steel, tin, carbon, or tungsten, although other materials may be used. In some embodiments, a receiver 151 with an equal or higher resistivity than the susceptor 106 may be used, which will heat the outside of the consumable-containing package 102 as the receiver 151 heats up via induction. The receiver 151 can be fixed to the device 200 and aligned properly with the coils 162 such than when the consumable-containing package 102 is inserted into the coils 162, the susceptor 106 is properly aligned with the coils 162.

In some embodiments, the housing 150 may function as the receiver. Therefore, rather than a separate receiver 151, the housing 150 may have the characteristics described above and insertion into the coils 162 may function as the alignment process, or the housing can be fixed within the coils 162 and the filter tube 140 containing the consumable-containing unit 104 and the susceptor 106 can be inserted into the housing 150.

In some embodiments, multiple activations of a single consumable-containing package can be accomplished with a susceptor 106 having multiple prongs 290 as shown in FIGS. 13A-D. A multi-pronged susceptor is a susceptor 106 with two or more prongs 290. In some embodiments, the susceptor may have three prongs 290*a*, 290*b*, 290*c*. In some embodiments, the susceptor 106 may have four prongs. In some embodiments, the susceptor 106 may have more than four prongs. In the preferred embodiment, the multi-pronged susceptor 106 has three or four prongs.

Figure 13A:
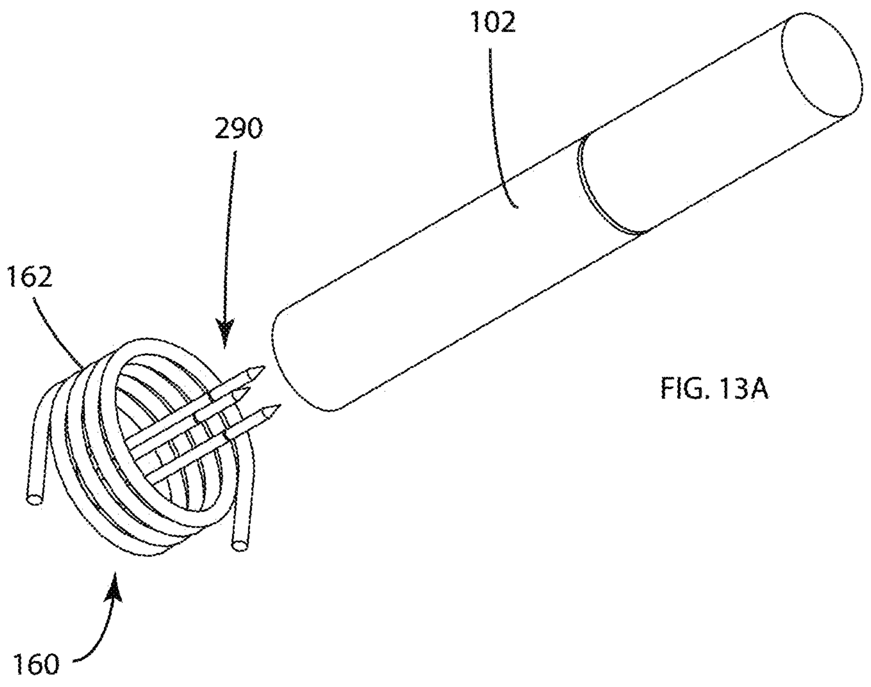
FIGS. 13A-13B show perspective views of a multi-pronged susceptor.
Figure 13B:
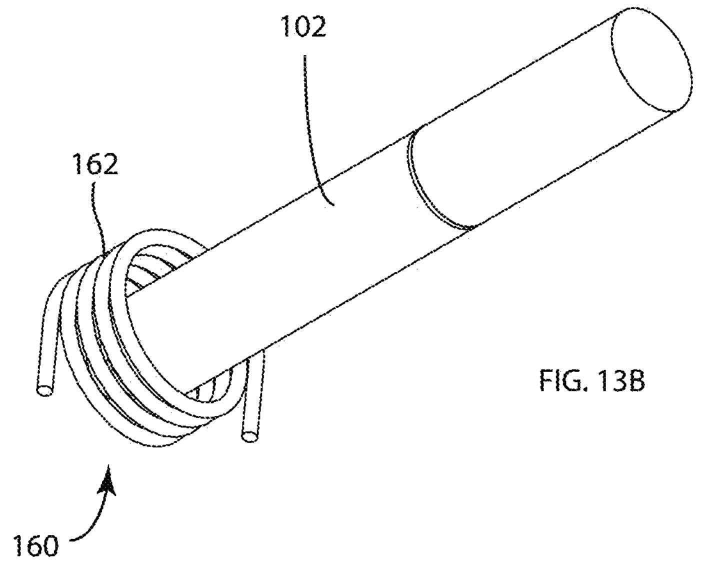
Figure 13C:
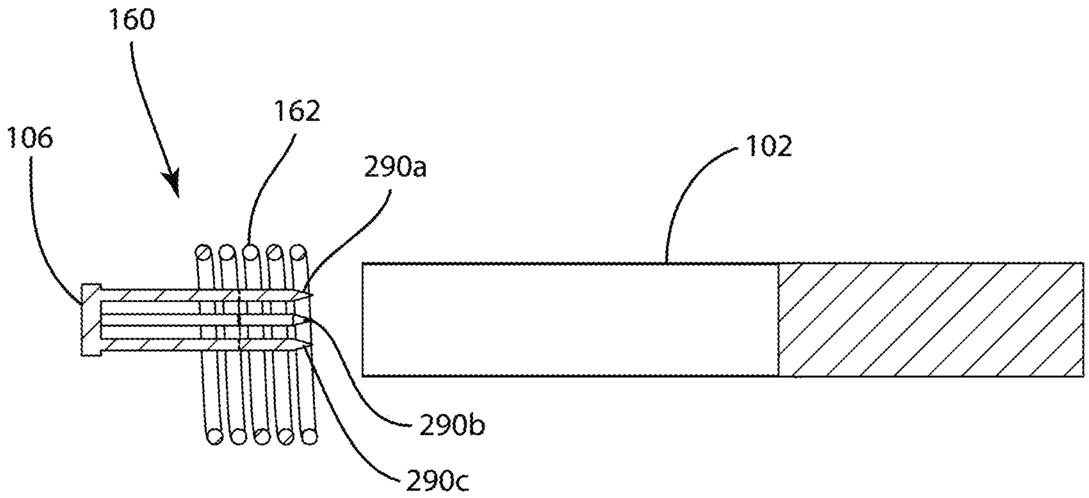
FIGS. 13C-D show cross-sectional side views of the embodiments in FIGS. 13A and 13B, respectively, cut along the longitudinal axis showing the multi-pronged susceptor removed and inserted into the consumable-containing package.
Figure 13D:
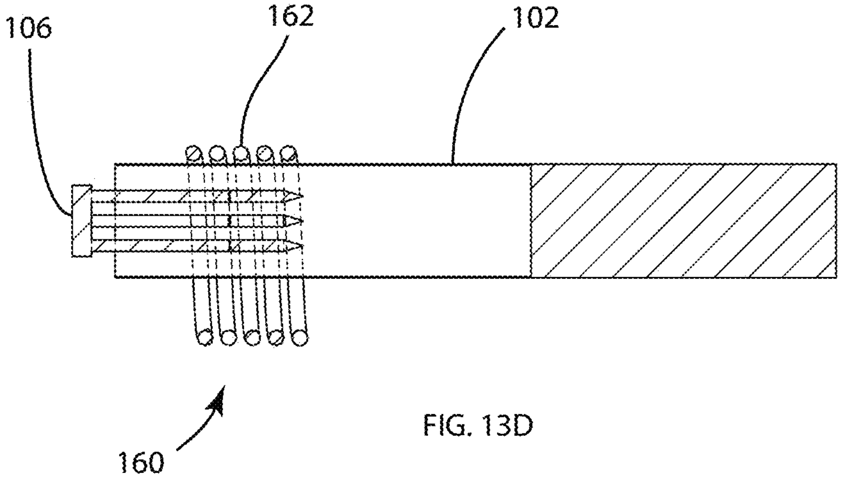
Figure 14A:
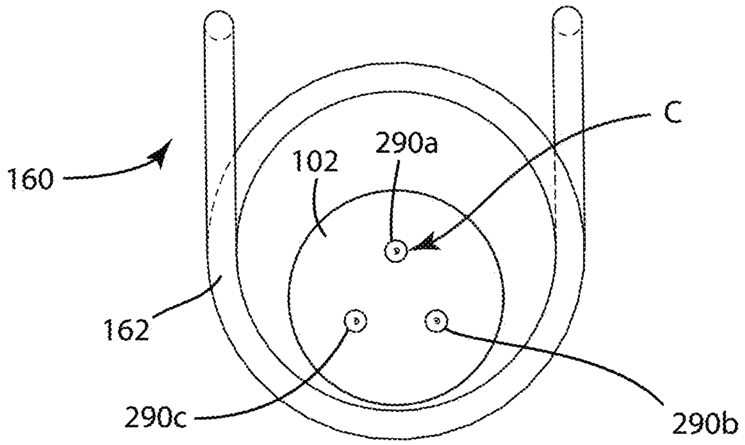
FIGS. 14A-14C show end views of an embodiment of the consumable-containing package with the heating element rotating about the consumable-containing package.
Figure 14B:
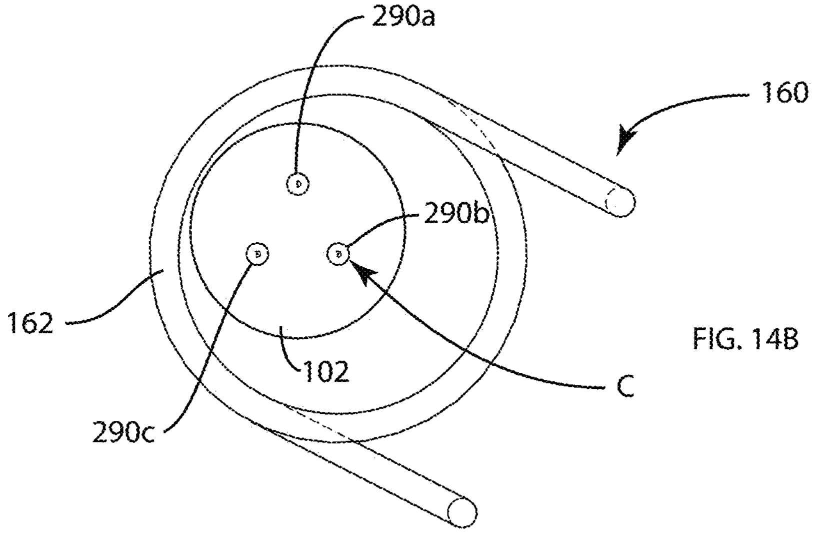
Figure 14C:
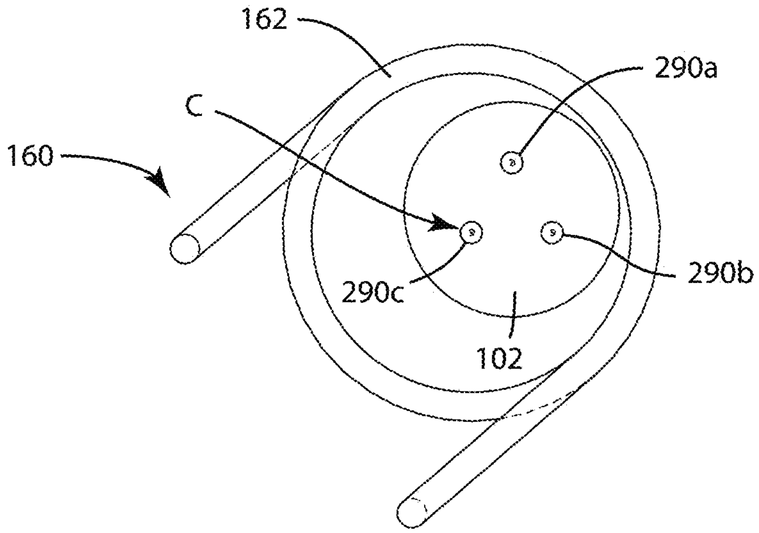
Figure 15A:
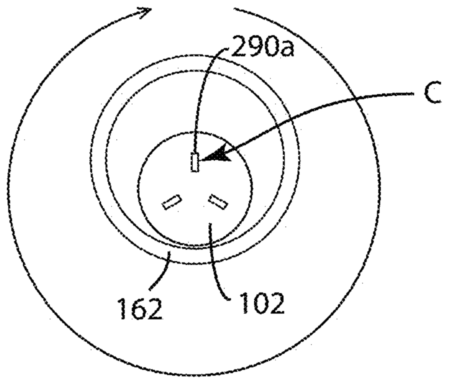
FIGS. 15A-15C show end views of an embodiment of the consumable-containing package having another three-pronged susceptor with the heating element rotating about the consumable-containing package.
Figure 15B:
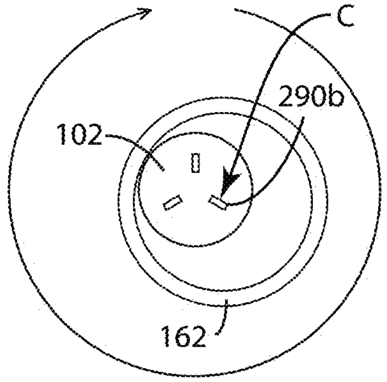
Figure 15C:
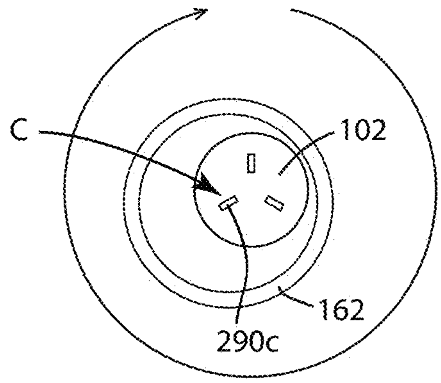
Figure 16A:
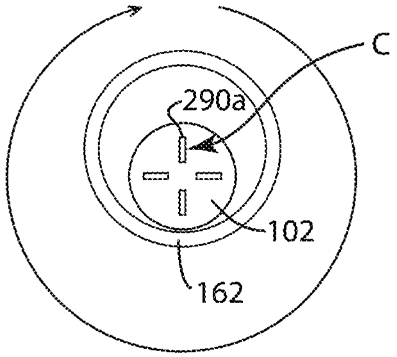
FIGS. 16A-16D show end views of an embodiment of the consumable-containing package having a four-pronged susceptor with the heating element rotating about the consumable-containing package.
Figure 16B:
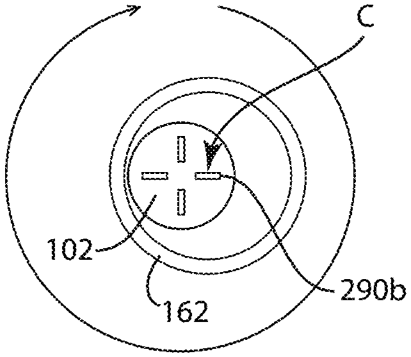
Figure 16C:
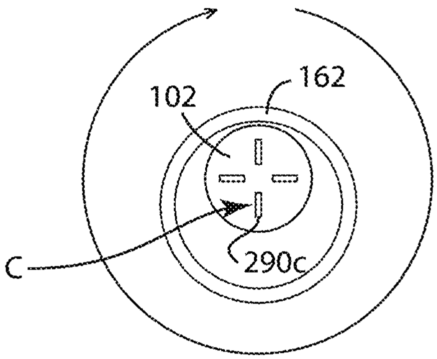
Figure 16D:
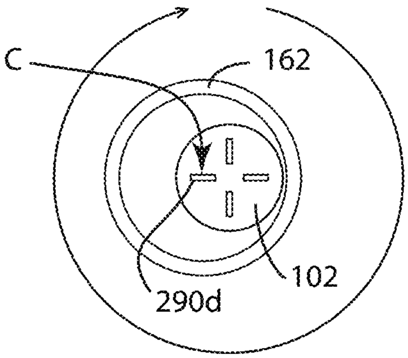

The multiple prongs 290*a*, 290*b*, 290*c* of the multi-pronged susceptor 106 are generally parallel to each other as shown in FIGS. 13C and 13D. The multi-pronged susceptor 106 is configured and may be embedded into the consumable-containing package 102 in such a way that each prong 290*a*, 290*b*, 290*c* is parallel to and equally spaced from the longitudinal axis of the consumable-containing package L, and equally spaced apart from each other along the perimeter of an imaginary circle. As such, when viewed in cross-section, as shown in FIGS. 14A-C, the susceptor prongs 290*a*, 290*b*, 290*c* are equally spaced apart from each other about the circular face of the consumable-containing package 102. Such arrangement allows each prong 290*a*, 290*b*, 290*c* to maximize non-overlapping heating zones for each prong, when each prong is maximally activated. In other words, when a susceptor prong 290*a*, 290*b*, 290*c* is heated, it will radiate heat radially away from the susceptor prong 290*a*, 290*b*, 290*c* creating a circular heating zone with the susceptor prong 290*a*, 290*b*, 290*c* in the center. Each susceptor prong 290*a*, 290*b*, 290*c* will heat its own circular zone, although some overlap may be inevitable. Collectively, an entire cross-sectional area of a consumable-containing unit 104 can be heated, one cross-sectional segment at a time.

When the heating element 160 is a cylindrical coil wrapped around a susceptor 106, the maximum amount of energy is transferred to the center of the cylindrical coil. Therefore, when the susceptor 106 is aligned with the center of the cylindrical coil, the susceptor 106 will receive the maximum amount of energy from the electricity passing through the coil. In other words, when the susceptor prong 290*a*, 290*b*, 290*c* is collinear with the cylindrical coil, the susceptor prong 290*a*, 290*b*, 290*c* will receive the maximum amount of energy from the cylindrical coil. Thus, to heat each susceptor prong 290*a*, 290*b*, 290*c* independently, the susceptor prong 290*a*, 290*b*, 290*c* and the center of the coil must be moved relative to each other so that the center of the coil aligns with one of the susceptor prongs 290*a*, 290*b*, 290*c* in sequence. This can be accomplished by moving the susceptor prong relative to the coil, or by moving the coil relative to the susceptor prong, or both.

In the preferred embodiment, the heating element 160 moves relative to the susceptor 106. For example, the cylindrical coil may be wrapped around the consumable-containing package 102 and configured to rotate along an eccentric path so that during one rotation of the cylindrical coil each of the prongs 290*a*, 290*b*, 290*c* will align with the center of the coil at different times as shown in FIGS. 14A-16D. The consumable-containing package 102 may be an elongated member defining a first longitudinal axis L, wherein the heating element 160 is a coil wrapped around the consumable-containing package 102 to form a cylinder defining a second longitudinal axis C, and wherein the heating element 160 is configured to rotate about the consumable-containing package 102 in an eccentric path such that the second longitudinal axis C aligns collinearly with each of the prongs 290*a*, 290*b*, 290*c* of the multi-pronged susceptor at some point during the movement of the heating element about the consumable-containing package 102. Therefore, the multi-prong susceptor 106 is stationary and the coil moves rotationally in an eccentric path so that coil center aligns with the linear axis of each susceptor prong 290*a*, 290*b*, 290*c*, in turn, through the rotation. Electrical slip rings would provide energy to an eccentric path rotating coil design.

Figure 17A:
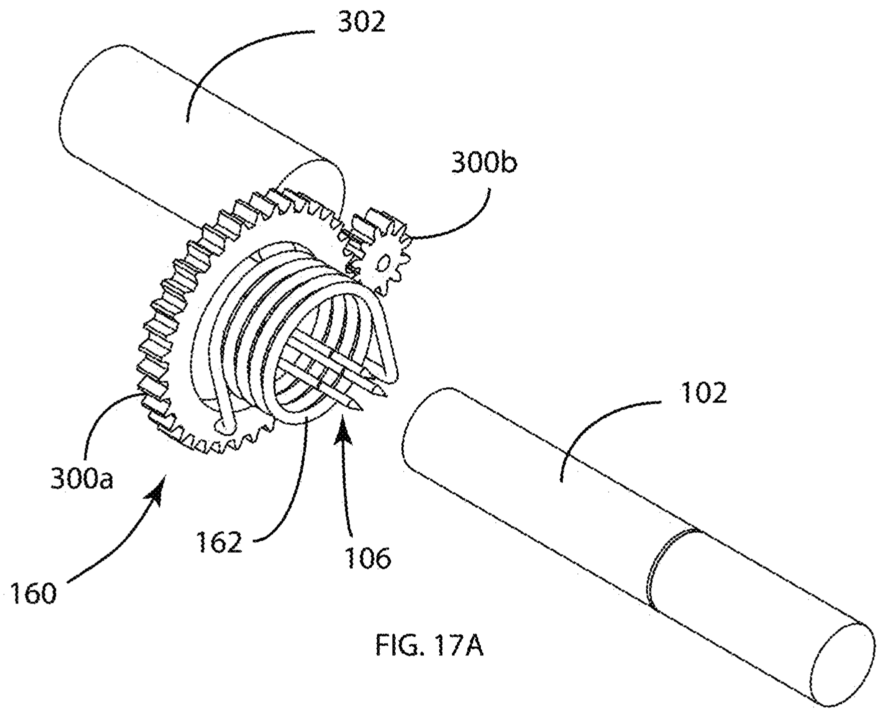
FIGS. 17A-17B show perspective views of an embodiment of a mechanism for rotating the heating element along an eccentric path about the consumable-containing package.
Figure 17B:
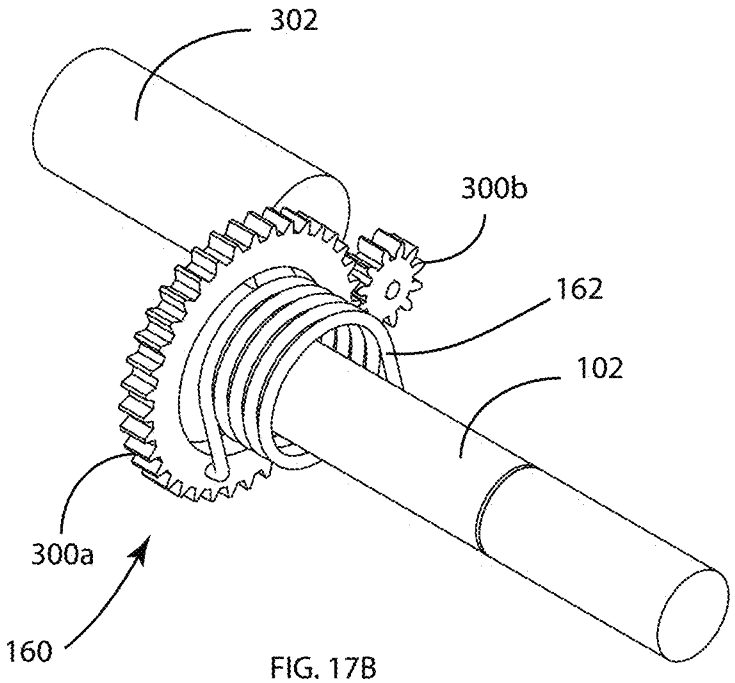
Figure 18A:
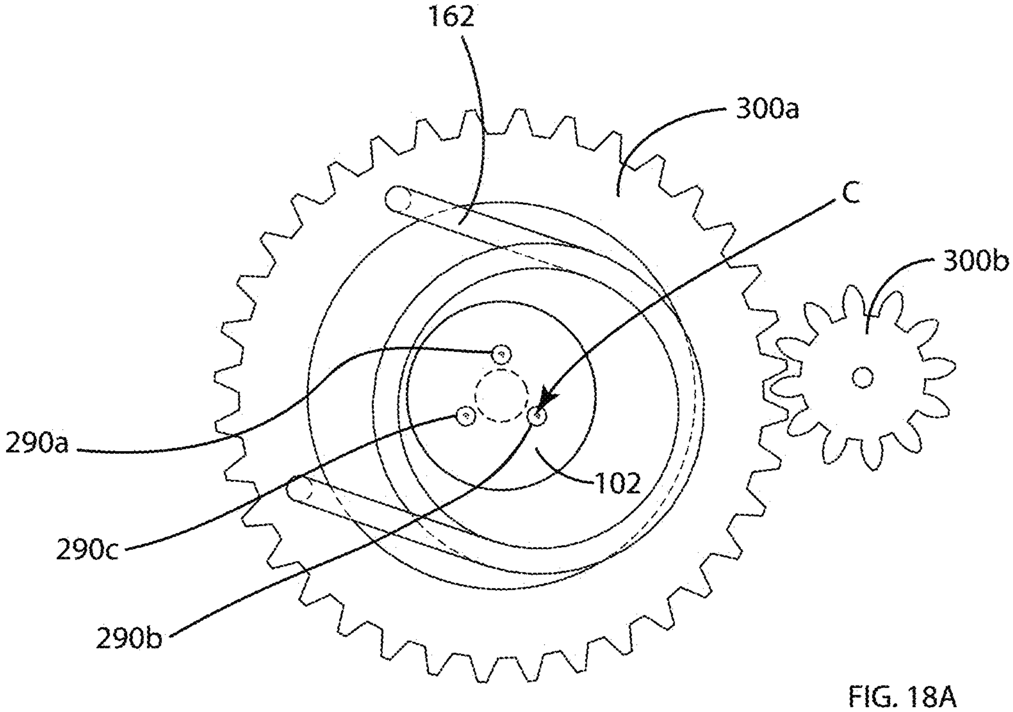
FIGS. 18A-18B show end views of the embodiment in FIGS. 17A-17B of a mechanism for rotating the heating element along an eccentric path about the consumable-containing package.
Figure 18B:
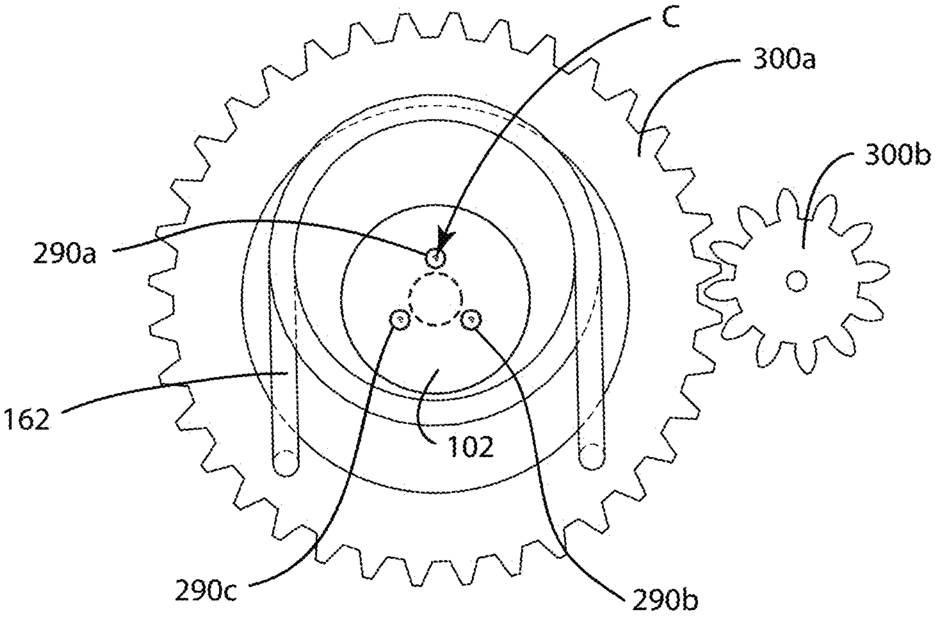

Rotation of the heating element 160 can be effectuated by a series of gears 300*a*, 300*b* operatively connected to a motor 302. For example, as shown in FIGS. 17A-B, the heating element 160 may be mounted on a first gear 300*a* so that the heating element can rotate with the first gear 300*a*. A second gear 300*b* can be operatively connected to the first gear 300*a* such that rotation of the second gear 300*b* causes rotation of the first gear 300*a*. The second gear 300*b* may be operatively connected to a motor 302 to cause the second gear 300*b* to rotate. The heating element 160 is mounted to the first gear 300*a* in such a manner that rotation of the first gear 300*a* causes the longitudinal axis C of the heating element 160 to move along an eccentric path rather than causing the heating element to rotate about a fixed, non-moving center. Thus, the center of the heating element 160 can shift to align with the different prongs 290*a*, 290*b*, 290*c*.

Figure 19:
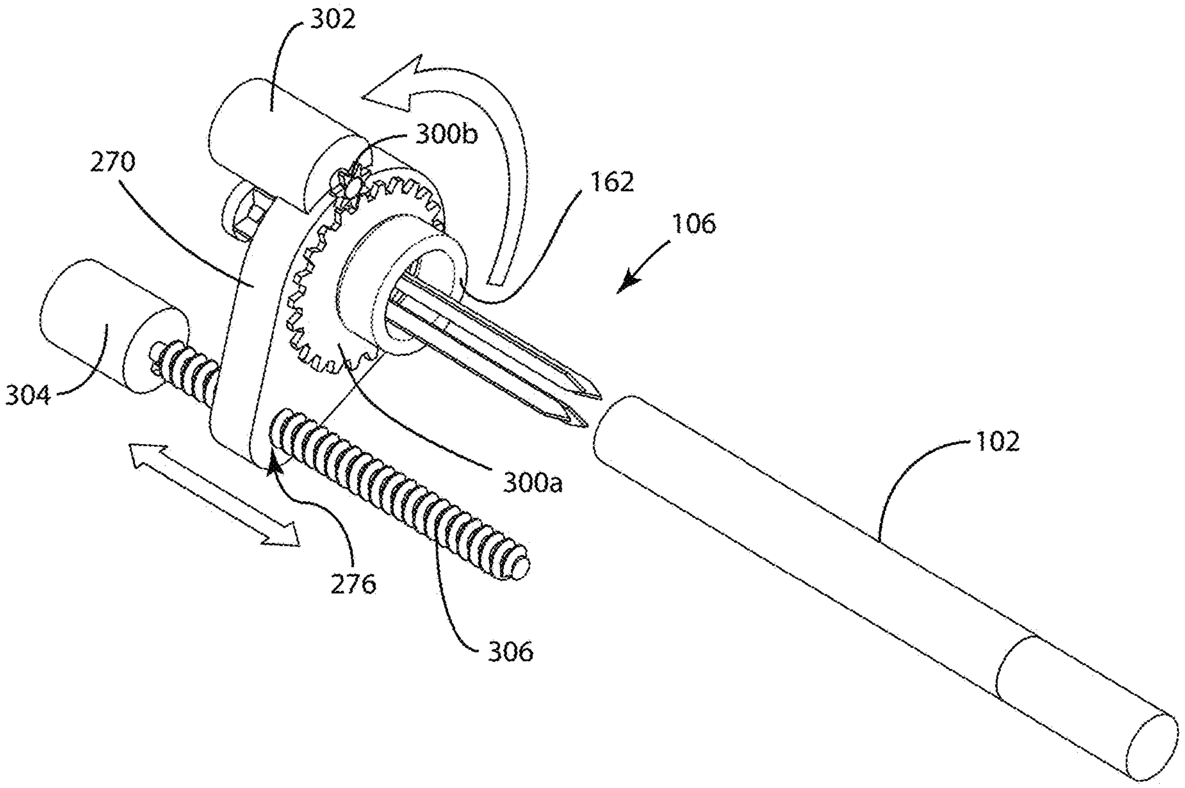
FIG. 19 shows a perspective view of an embodiment of a mechanism for rotating the heating element along an eccentric path and translating the heating element along the consumable-containing package.

In some embodiments, the heating element 160, the gears 300*a*, 300*b*, and the motor 302 may be mounted on a carrier 270 as shown in FIG. 19. The carrier 270 allows the heating element, gears 300*a*, 300*b* and the motor 302 to move axially along the length of the consumable-containing package 102. The carrier 270 may be operatively connected to a driver 306, which is operatively connected to a second motor 304. For example, the driver 306 may be threaded. The carrier 270 may have a threaded hole 276 through which the driver 306 is inserted. Activation of the second motor 304 causes the driver 306 to rotate. Rotation of the driver 306 causes the carrier 270 to move along the driver 306 as shown by the double arrow in FIG. 19.

In some embodiments, rather than having the heating element 160 rotate along an eccentric path, the heating element 160 can be moved translationally along the X-Y axis when viewed in cross section. Therefore, the consumable-containing package 102 may be an elongated member defining a longitudinal axis L, and wherein the heating element 160 is configured to move radially relative to the longitudinal axis L when viewed in cross-section to align the center of the cylindrical, coiled heating element 160 with each of the prongs 290*a*, 290*b*, 290*c* of the multi-pronged susceptor 106, in turn. In the X-Y axis positioning scenario the coil energy could be supplied through a flexible electrical conductor or by moving electrical contacts.

Figure 20:
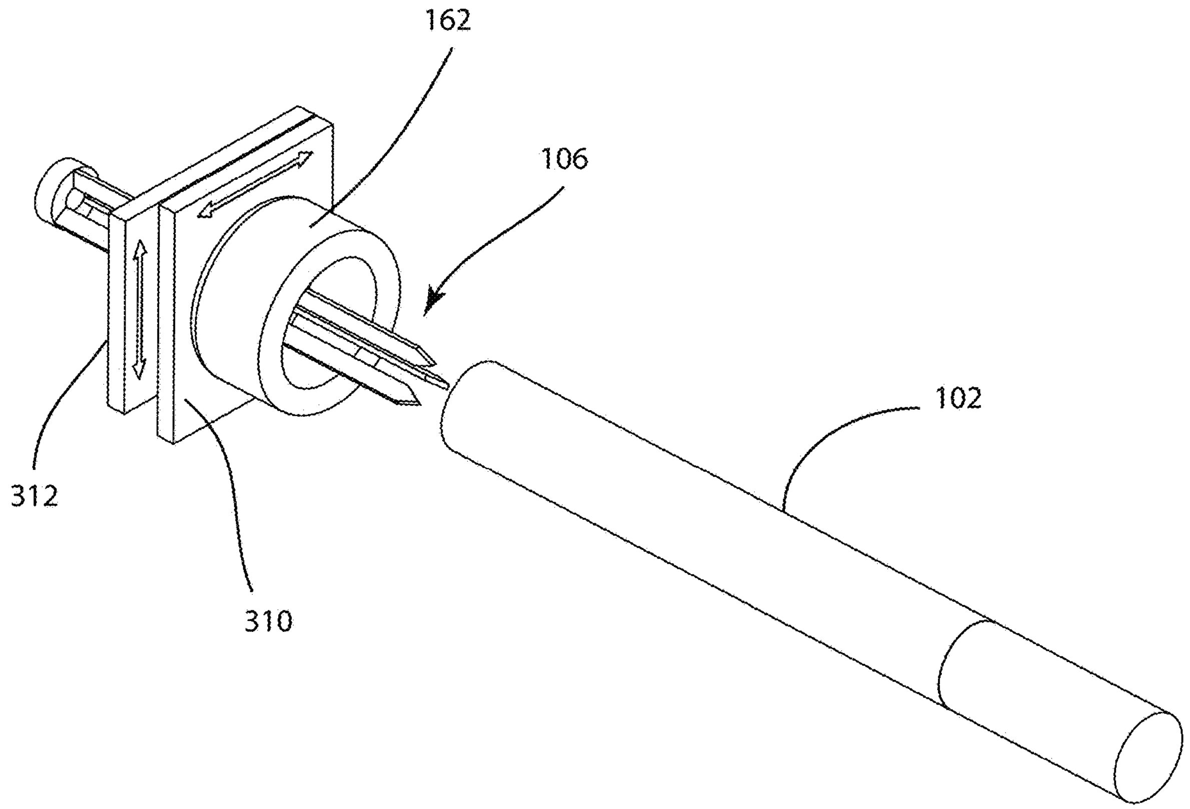
FIG. 20 shows a perspective view of an embodiment of a mechanism for moving the heating element relative to the consumable-containing package.

For example, the heating element 160 may be operatively mounted on a pair of translational plates 310, 312 as shown in FIG. 20. Specifically, the heating element 160 may be mounted directly on a first translational plate 310, and the first translational plate 310 may be mounted on a second translational plate 312. The first translational plate 310 may be configured to move in the X or Y direction, and the second translational plate 312 may be configured to move in the Y or X direction, respectively. In the example shown in FIG. 20, the first translational plate 310 is configured to move in the X direction, while the second translational plate 312 is configured to move in the Y direction. This configuration can be switched so that the first translational plate 310 is configured to move in the Y direction and the second translational plate 312 is configured to move in the X direction. The first and second translational plates 310, 312 may be operatively connected to their respective motors, for example, via gears, to cause the translational plates to move in the appropriate direction. Between the two translational plates 310, 312, the heating element 160 can be moved so that its longitudinal axis C can align collinearly with any of the prongs 290*a*, 290*b*, 290*c*.

In other arrangements the coil assembly could move along the susceptor's linear axis, independent of a rotation or non-rotation movement mechanisms as discussed above. Therefore, a three pronged susceptor would allow the device to heat a consumable-containing package 102 three times at the same linear position by heating the three different prongs 290*a*, 290*b*, 290*c* three different times before it moves to its next linear position, where it will be able to heat three times again. In a consumable-containing package 102 having four linear positions, one consumable-containing package should be able to provide 12 distinct "puffs," i.e. 3 prongs times 4 positions along the length of the consumable-containing package 102.

In some embodiments, rather than having the heating element 160 move relative to the consumable-containing package 102, the consumable-containing package 102 can be moved relative to the heating element. Therefore, the consumable-containing package 102 is configured to rotate within the heating element 160 in an eccentric path such that the second longitudinal axis C defined by the coils aligns collinearly with each of the prongs 290*a*, 290*b*, 290*c* of the multi-pronged susceptor at some point during the rotation of the consumable-containing package 102 within the heating element 160. Alternatively, the consumable-containing package 102 is configured to move radially within the heating element 160 such that the second longitudinal axis C aligns collinearly with each of the prongs of the multi-pronged susceptor at some point during the movement of the consumable-containing package 102 within the heating element 160. In some embodiments, both the consumable-containing package 102 and the heating element 160 may move. For example, the heating element 160 may move linearly along the longitudinal axis of the consumable-containing package 102, and the consumable-containing package 102 can move in an eccentric or radial path to move the susceptor 106 into position relative to the heating element 106, so that all of the consumables are heated sequentially as the user takes individual puffs. Other variations of movement may also be used.

The movement mechanisms described above are merely examples. The mechanism in an X-Y-Z movement scenario could be accomplished using a variety of combinations of motors, linear actuators, gears, belts, cams, solenoids, and the like.

Figure 21:
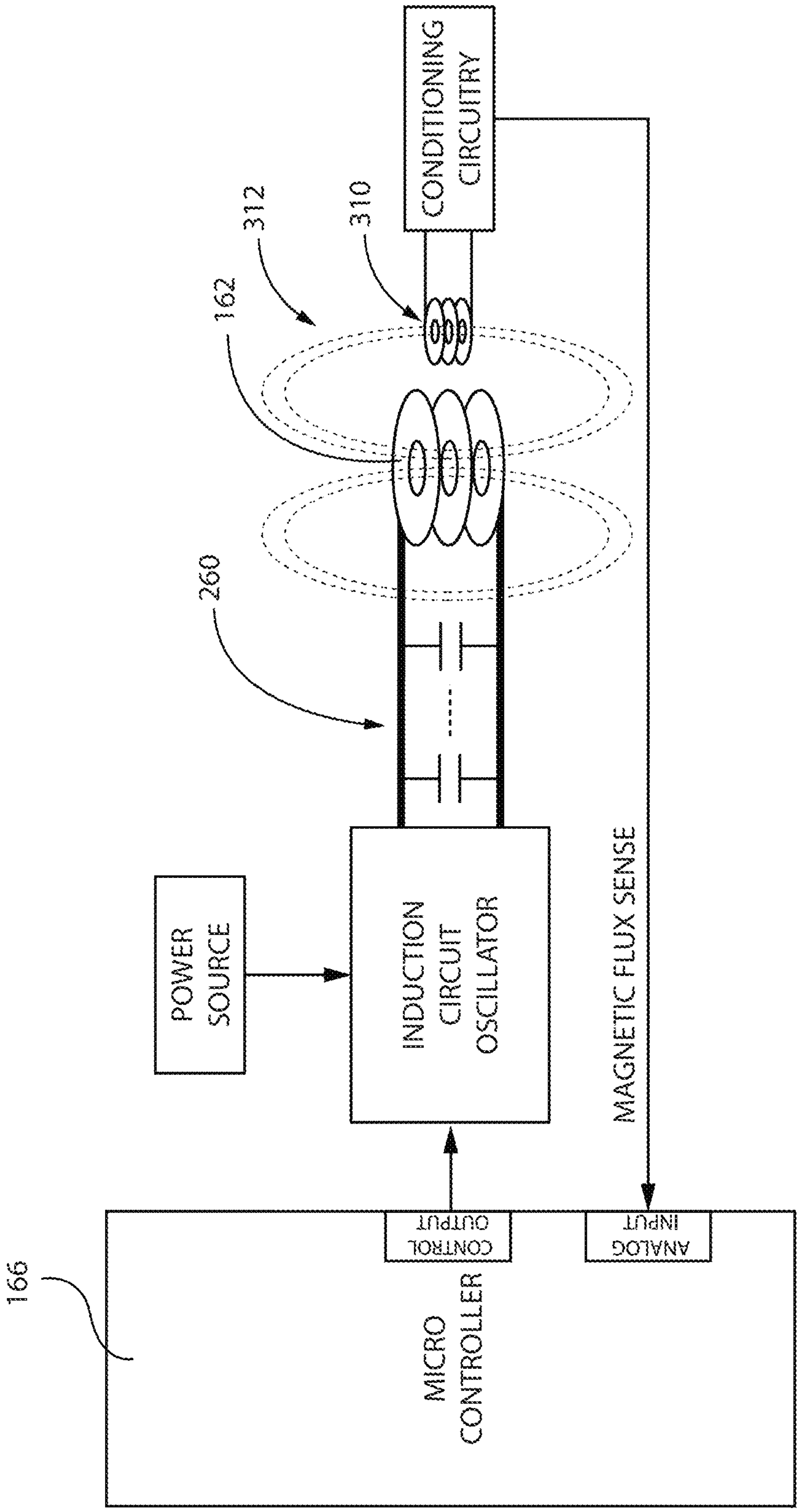
FIG. 21 shows a schematic diagram of an embodiment of the controller and its connection to other components of the present invention.

With reference to FIG. 21, a closed loop control of the induction heating system can be based on sensing of a magnetic flux density created by the induction heating system. Induction heating systems operate by virtue of creating a concentrated, alternating magnetic field inside of the induction coil heating element. This field will produce a heating effect in a metal susceptor by virtue of the eddy currents and magnetic flux reversal (assuming a ferrous receptor material) that occur in the susceptor material. Induction heating is typically "open loop" in that there are limited means of monitoring of the temperature of the susceptor inside of the induction coil while it is operating. Under controlled conditions, the magnetic field external to the induction coil and in reasonable proximity to the coil can be used determine the intensity of the flux inside of the coil. For example, a small coil 310 can be placed in reasonable proximity to the induction coil-type heating element 160 with its axis approximately parallel to the magnetic flux field lines 312 passing through the small coil 310, providing a means of detection of the magnitude of the magnetic flux of the induction coil-type heating element 160 present by virtue of the voltage induced across the small coil 310 due to the changing magnetic flux passing through the small coil 310. The magnitude of this external flux can then be calibrated to correlate to the magnetic flux density inside of the heating element 160, and therefore, be used as a means of closed loop control of the induction system to ensure consistent performance insofar as heating of the susceptor 106. The magnetic flux is symmetrical around the axis of the induction coil. A measurement of the flux density taken any place near the induction coil can be used to extrapolate the magnetic flux density inside of the heating element, based on characterization of the relative magnitudes of the magnetic flux in each location (inside of the induction coil and inside of the parasitic sensing coil). In practice, there is no need to quantify this, as the flux sensing is instead used to infer the rate of heating that will occur in a susceptor 106 that is present in this magnetic field. Thus, the small coil 310 configured in this way functions as a magnetic flux sensor.

Therefore, in some embodiments, the device may further comprise a magnetic flux sensor adjacent to the inductive heating element 160 and configured to measure a magnetic flux created by the inductive heating element 160. The magnetic flux sensor may be operatively connected to the controller 166 to control activation of the inductive heating element 160 based on feedback from the magnetic flux sensor.

In some embodiments, it is desirable to be able to detect whether a consumable-containing unit 104, or a portion thereof, has been heated or not. If a consumable-containing unit 104 has already been heated, then the heating element 160 can heat the next consumable-containing unit 104 or the next segment of a consumable-containing unit 104 so as to prevent energy from being wasted on a used portion of the consumable-containing unit 104. Therefore, in some embodiments, as shown in FIG. 11, a method of detecting the segments of the consumable-containing package 102 that have been used is provided in the device, allowing the device to autonomously determine the next unused segment that is available for use. For example, the device may comprise a use sensor 320 to detect whether a portion of the consumable-containing package 102 being sensed had been heated beyond a predetermined temperature. In some embodiments, the use sensor 320 may detect visual changes in the consumable-containing package 102 that is indicative of heating. In some embodiments, the use sensor 320 may detect thermal changes in the consumable-containing package 102 that is indicative of heating. In some embodiments, the use sensor 320 may detect textural changes (i.e. changes in the texture) in the consumable-containing package 102 that is indicative of heating. In some embodiments, the use sensor 320 may be the controller keeping track of where the heating element 160 is along the consumable-containing package 102 and when it has been heated relative to its movement along the consumable-containing package 102. For example, the controller may comprise a memory for storing locations of the portions of the consumable-containing package 102 that have been heated to the predetermined temperature.

In the preferred embodiment, the use sensor 320 is a photoreflective sensor. The photoreflective sensor may be configured to detect changes in the consumable-containing package 102 from its original state compared to a state when the consumable-containing package 102 has been exposed to significant heat (i.e. beyond normal temperatures of the day). More preferably, the consumable-containing package 102 may be comprised of a thermal sensitive dye that changes colors when heated to a predetermined temperature. Such change in color may be detectable by the photoreflective sensor.

The thermally sensitive dye may be printed around the exterior surface of the consumable-containing package 102. When a segment of the consumable-containing package 102 is heated, a band 322 in closest proximity to the heated segment changes colors. For example, the band 322 may change from white to black. The use sensor 320 mounted with the heating element 160 has optics 324 focused just above—or below—the heating element to provide a side view of the consumable-containing package 102 over the full range of the moving heating element 160.

In some embodiments, a limit switch 326 is also installed at one end 105 of the consumable-containing package 102 and used to detect when the consumable-containing package 102 is removed or reinserted into the device. When a consumable-containing package 102 has been re-inserted, the device activates the motorized heating element assembly and moves it across its full range of travel, allowing the use sensor 320 to detect if any segments have been previously heated, by detecting the dark bands 322 of the thermally sensitive dye. Thus, the device may further comprise a limit switch 326 to reset the memory when a new consumable-containing package 102 is inserted into the housing.

Figure 22:
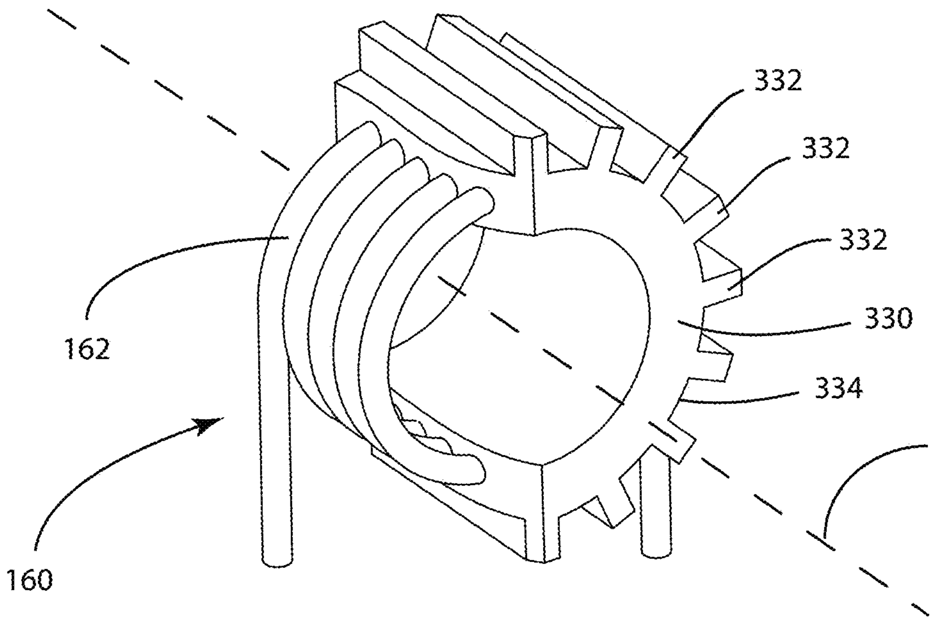
FIG. 22 shows an embodiment of a heat sink attached to the heating element, with portions of the heat sink removed to show the heating element.

In some embodiments, to manage the thermal heat dissipation from the heating element 160, the device may further comprise a heat sink 330 operatively connected to the inductive heating element 160. Induction heating involves the circulation of high currents in the induction coil, resulting in resistive heating in the wire used to form the coil. Thermal heat dissipation takes advantage of materials with high thermal conductivity that are electrically insulating to form heat sinks 330. Preferably, heat sinks 330 can be formed either through injection molding or potting processes. Because the preferred embodiment utilizes a cylindrical coil as the heating element 160, the heat sink 330 may also be a cylinder formed around the induction coil, so that it encapsulates the coil as shown in FIG. 22. The cylindrical heat sink 330 encapsulating the heating element 160 resides within a vertical cavity inside the case 202, forming a sort of “chimney” within which air convection occurs. The chimney requires venting at the top to support the airflow. This method also eliminates fringing of the electromagnetic field, allowing for a very focused heating method on each segment of the consumable-containing package 102. As a result of such focus, it would not be necessary to wrap the consumable-containing unit 104 inside the consumable-containing package 102 in a non-conductive foil or other similar material, paper or a similar material would suffice.

In the preferred embodiment, the heat sink 330 is a finned cylinder encompassing the inductive heating element 160. The finned cylinder is a cylindrically shaped heat sink with fins 332 projecting laterally away from its exterior surface 334. Preferably each fin 332 extends substantially the length of the cylinder to provide a substantial surface area from which heat from the heating element 160 can dissipate. The thermally conductive material of the heat sink 330 may be a polymer. Thermally conductive polymer may be a thermoset, thermoplastic molding or potting compound. The heat sink 330 may be machined, molded or formed from these materials. Material could be rigid or elastomeric. Some examples of the thermally conductive compounds used in thermally conductive polymers are aluminum nitride, boron nitride, carbon, graphite and ceramics. In the preferred embodiment, the heating element 160 is an inductive coil wrapped in a finned cylinder of a thermally conductive polymer that has been molded around the coil, with an open center creating venting via a chimney-like effect.

Figure 23:
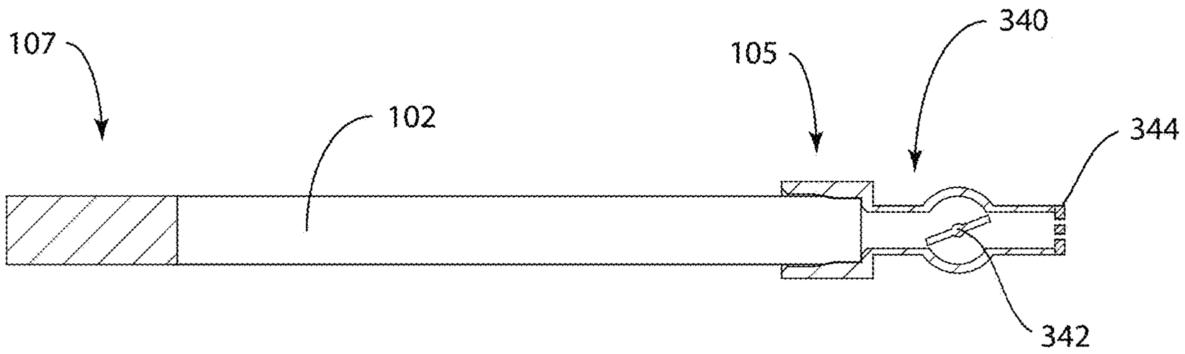
FIG. 23 shows a cross-sectional view of an airflow controller attached to the consumable-containing package.

In some embodiments, as shown in FIG. 23, the device may further comprise an airflow controller 340 to provide a means for adjusting the flavor robustness of the consumable-containing unit 104 by controlling the airflow that is drawn through the consumable-containing package 102. The design of the consumable-containing package 102 is such that the amount of vapor/flavor that is introduced into the airflow passageways is a function of the duration and intensity of induction heating, and the air pressure differential between the air passageway(s) through the consumable-containing package 102. This pressure differential draws the vapor out of the consumable-containing package 102 and into the airflow. If the airflow into the first end 105 of the consumable-containing package 102 can be controlled, this pressure differential can be varied, allowing more (or less) vapor to be introduced into the airflow, effectively altering the robustness of the flavor. This ability to alter the flavor robustness is closely integrated with the heating of the consumable-containing package 102, as it is the rise in temperature of the consumable that produces this vapor. By precise control of the heating process (time and rate) and the airflow through the first end 105 of the consumable-containing package 102, wide range of flavor robustness experiences can be produced.

For example, the airflow controller 340 may comprise an adjustable flow control valve 342, such as a needle valve, butterfly valve, ball valve, or an adjustable aperture. Adjustable flow control valves allow the user to control the airflow even during use. However, the airflow controller 340 may also be a membrane 344 with fixed apertures, such as a porous or fibrous membrane or element. A membrane 344 may also act as an intake particulate filter. Therefore, flow control mechanisms may or may not be user adjustable. In the membrane 344 embodiments, there may be provided multiple membranes 344 with different sized apertures. Thus, the user can select the desired aperture size and apply that membrane 344 to the first end 105 of the device. If the user prefers increased or decreased airflow, the user can select another membrane 344 with larger or smaller apertures, respectively. In some embodiments, the airflow controller 340 may use both a control valve 342 and a membrane 344. For example, the membrane 344 may be precede the control valve 342 so as to control airflow and filter particulates before the control valve 342, then the control valve 342 can further control the airflow for fine-tuned control of the airflow.

In some embodiments, rather than having the aerosol flow from the consumable-containing unit 104 through openings 120 of the encasement 108 into a filter tube 140, and towards the mouthpiece 158, the air flows into the susceptor 106, draws out the active from the consumable-containing unit 104 to create the aerosol that flows through the susceptor 106 towards the mouthpiece 158, as shown in FIG. 25A-E. In such, embodiments, the susceptor 106 may have one or more hollow prongs 350 with at least one inlet 352 along the length of the each prong 350, and at least one outlet 354. The prong 350 comprises a connected end 356 operatively connected to a susceptor base 358, and a free end 360 opposite the susceptor base 358. The hollow prong 350 is connected to the susceptor base 358 at the connected end 356. The outlet 354 of the hollow prong 350 is located towards the free end 360. For example, the outlet may be at the tip 362 of the free end 360, or there may be a plurality of outlets 354 angularly spaced apart around the perimeter surface of the hollow prong 350 at the free end 360 side.

In some embodiments, the tip 362 of the free end 360 may be pointed or sharp to facilitate penetration into the consumable-containing unit 104. The particle size, density, binders, fillers or any component used in the consumable-containing unit 104 may be engineered to allow the penetration of the susceptor prongs 290, 350 and/or perforation needles without causing excessive compression or changes to the density of consumable-containing unit 104. Changes to the density from compression "packing" of consumable containing unit 104 could negatively effect air or vapor flow through the consumable-containing unit 104.

Any consumable particulate that may be pushed thorough the encasement 108 after susceptor 106 penetration would be held captive in the cavity 368 between consumable-containing unit 104 and mouthpiece 158. Since tips 362 of the prongs 290, 350 are sharp it is unlikely that consumable will be ejected out from the encasement 108.

In some embodiments, the outlets 354 and/or the inlets 352 may be covered with the coating that melts away at heated temperatures. In the preferred embodiment, the consumable-containing unit 104 is long enough to cover the entire hollow prong 350 except for the outlet 354.

The susceptor base 358 may comprise an opening 364 that corresponds with the hollow prong 350. In embodiments with multiple hollow prongs 350*a-d*, each hollow prong 350*a-d* has its own corresponding opening 364.

In some embodiments, there may be multiple hollow prongs 350*a-d*. The hollow prongs 350*a-d* may be arranged in a circle making it compatible with the moving heating element 160 or moving consumable-containing package 102. In some embodiments, there may be a single hollow prong 350 with the hollow prong 350 centered in the susceptor base 358. In some embodiments, there may be a center hollow prong 350 surrounded by a plurality of hollow prongs 350*a-d*. Other hollow prong 350 arrangement can be used.

Each hollow prong 350 may have at least one inlet 352 and at least one outlet 354. Preferably, the hollow prong 350 comprises a plurality of inlets 352 and a plurality of outlets 354. The inlets 352 may be arranged in a series along the length of the hollow prong 350. In some embodiments, the inlets 352 may be circularly arranged about the perimeter of the hollow prong 350. Increasing the number of inlets 352 on a hollow prong 350 increases the number of points through which the aerosol generated can escape from the consumable-containing unit 104 and out of the consumable-containing package 102. Similarly, there may be a plurality of outlets 354 circularly arranged about the perimeter of a prong 350 at the free end 360 side.

In some embodiments, the consumable-containing unit 104 does not extend from one end 105 of the consumable-containing package 102 to the mouthpiece 158. As such, a cavity 368 exists in between the consumable-containing unit 104 and the mouthpiece 158. This cavity 368 can be filled with thermally conductive material, flavoring, and the like.

Figure 25A:
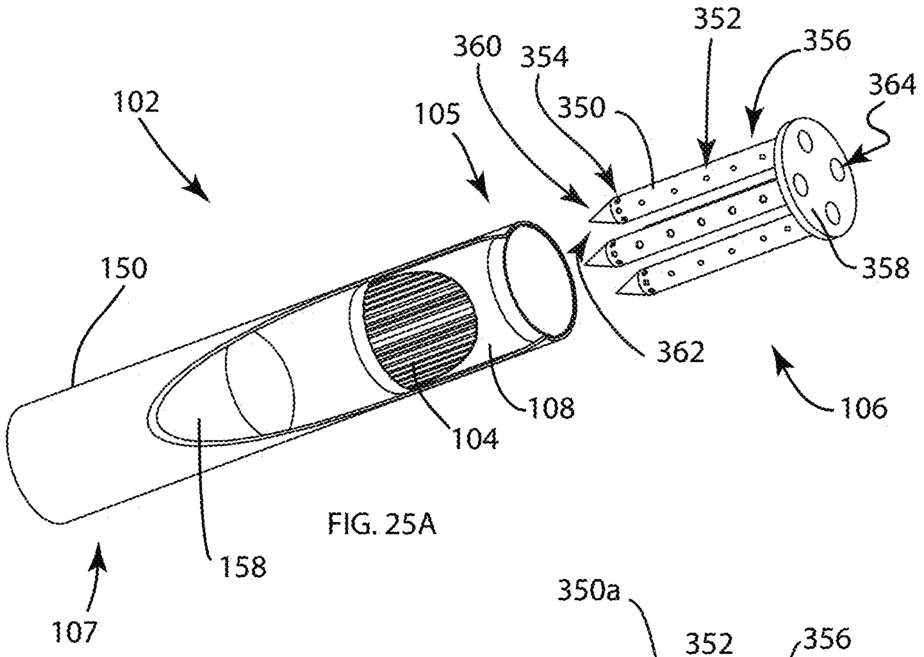
FIGS. 25A-B show partial cutaway views of the consumable-containing package in perspective with the susceptor removed to show a configuration inside the consumable-containing package that uses a hollow-pronged susceptor.
Figure 25B:
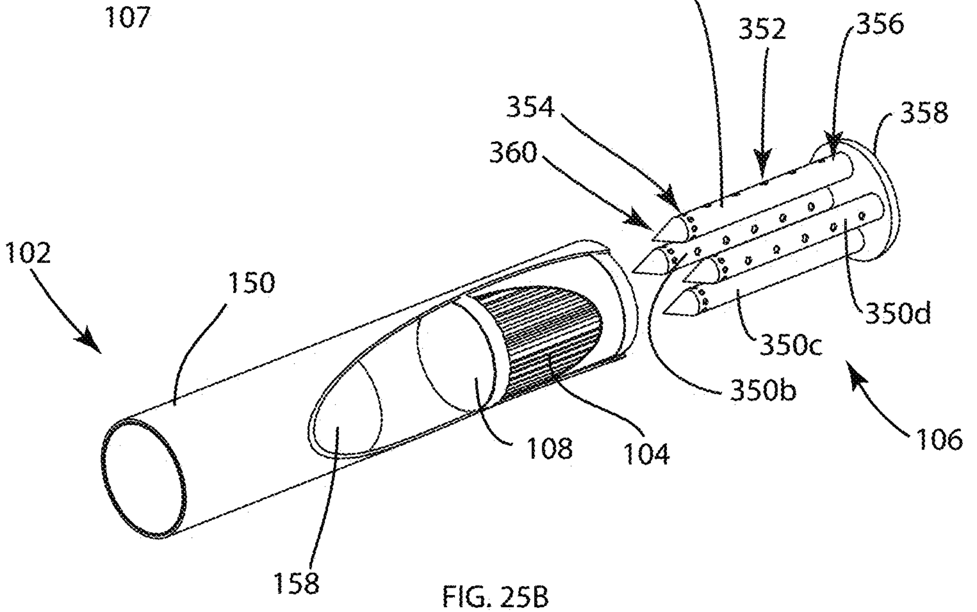
Figure 25C:
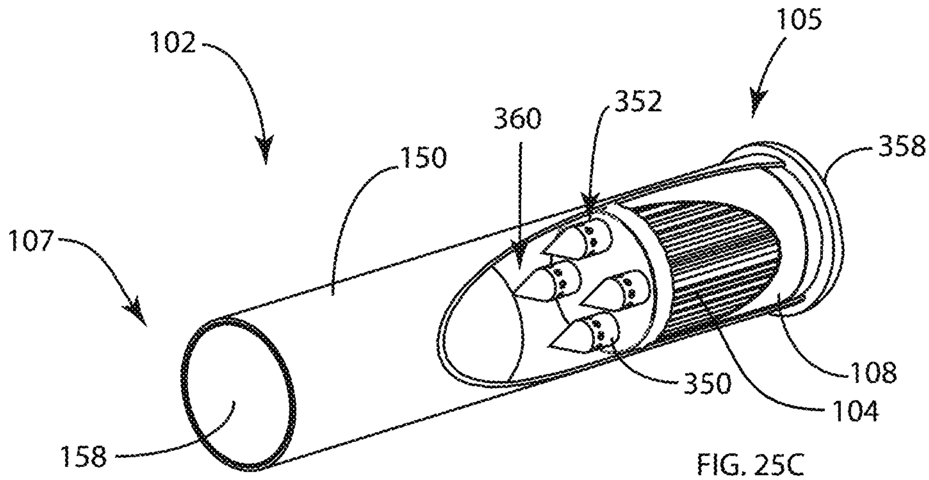
FIGS. 25C-D show partial cutaway views of the embodiments in FIGS. 25A-B, respectively, with the hollow-pronged susceptor embedded into a consumable-containing package.
Figure 25D:
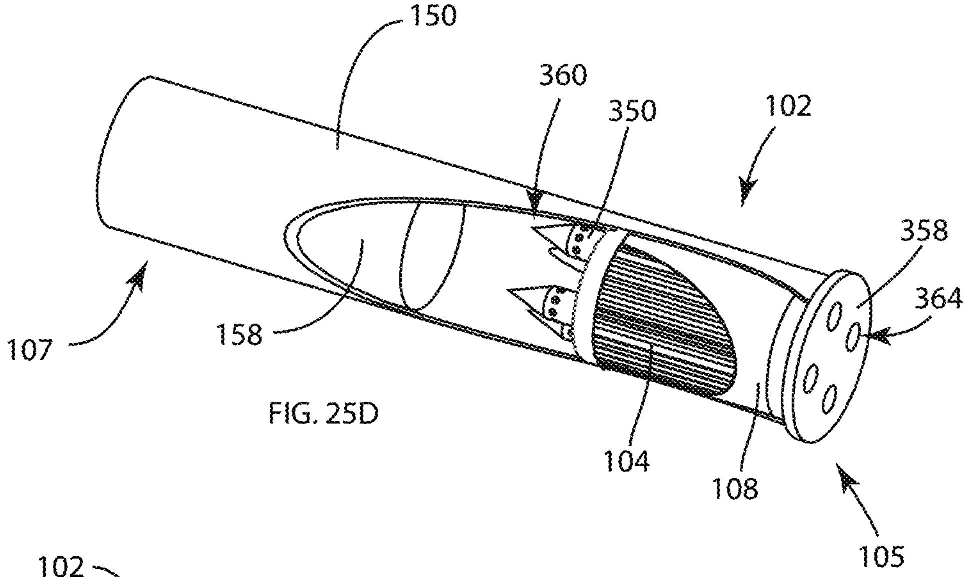
Figure 25E:
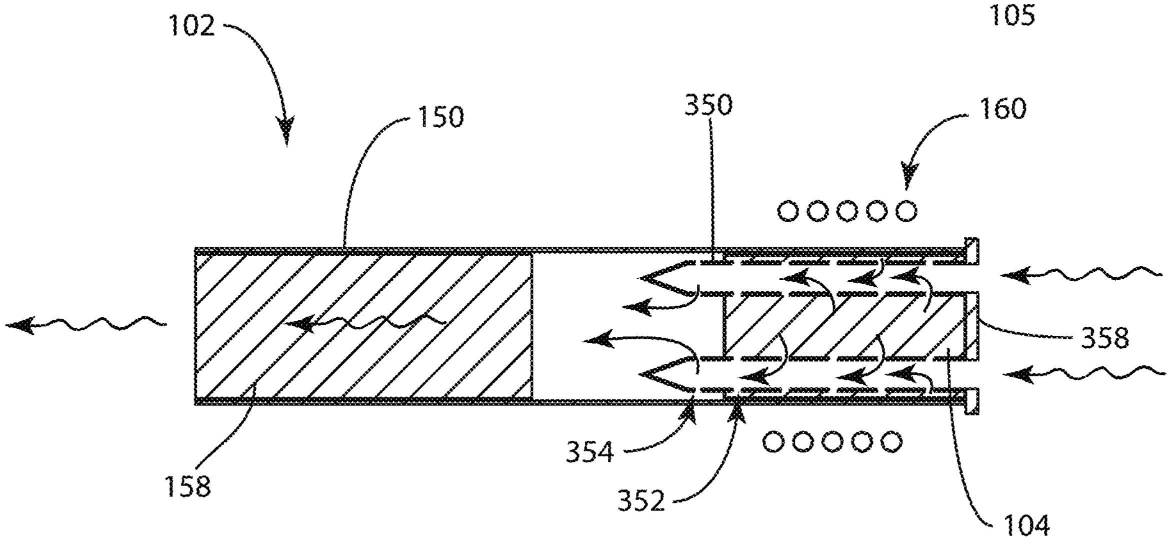
FIG. 25E shows a cross-sectional view of the embodiment shown in FIGS. 25A-D cut along its longitudinal axis to show the air flow during use.

As shown in the cross-sectional view of FIG. 25E, in use, the susceptor 106 is embedded in the consumable-containing unit 104. When the susceptor 106 is heated via inductive heating by the heating element 160, the consumable-containing unit releases the aerosol. As the user sucks on the mouthpiece 158, the pressure differential inside the consumable-containing package 102 causes the aerosol to enter into the hollow prong 350 through the inlet 352 and exit through the outlet 354 (see arrows showing airflow). The aerosol then enters the cavity 368 of the consumable-containing package 102 and is filtered through the mouthpiece 158 for inhalation by the user. As such, the encasement 108 need not have any openings 120.

In some embodiments, as shown in FIGS. 26A-G, there may be a single hollow prong 350 centrally positioned on the susceptor base 358, with a plurality of prongs 290*a-d* surrounding the hollow prong 350. In such an embodiment, the hollow prong 350 need not be capable of heating via induction heating, although it can be. In this embodiment, the consumable-containing unit 104 may have a central hole 366 through which the hollow prong 350 can be inserted for a tight fit.

Figure 26A:
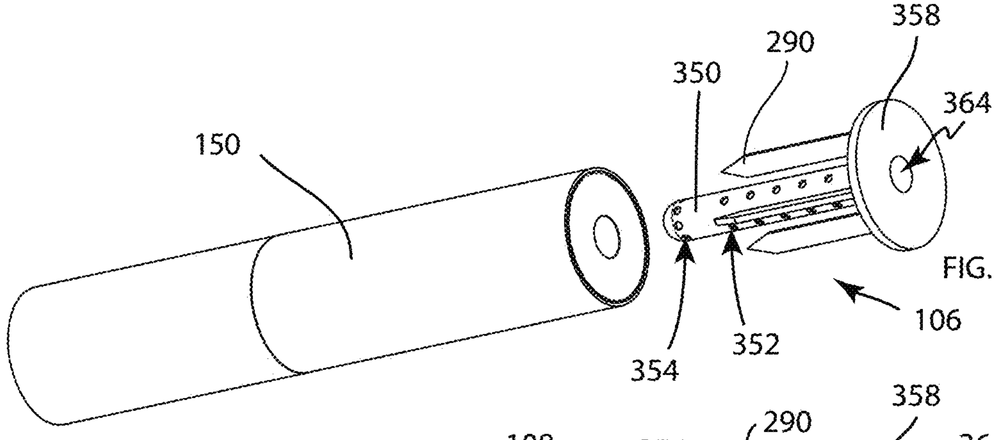
FIG. 26A shows a perspective view of another embodiment of the consumable-containing package prior to insertion of a susceptor.
Figure 26B:
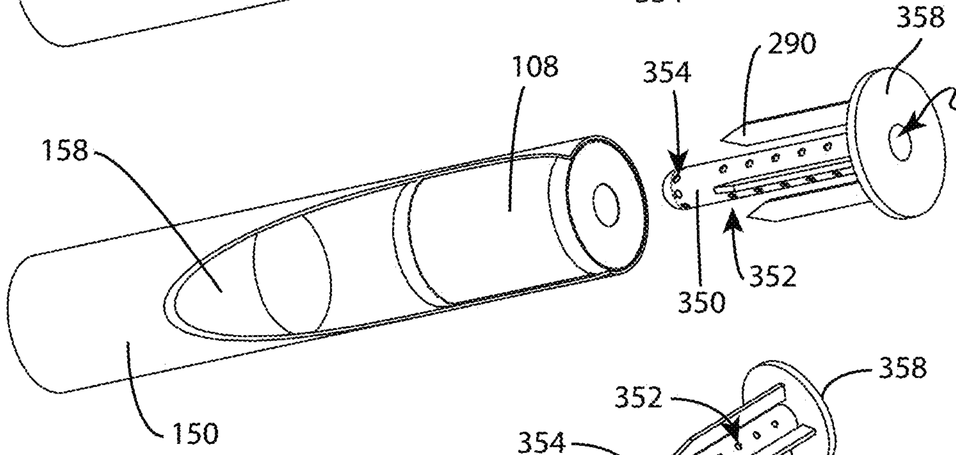
FIGS. 26B-C show partial cutaway views of the embodiment shown in FIG. 26A to show the relationship of the internal components prior to insertion of the susceptor.
Figure 26C:
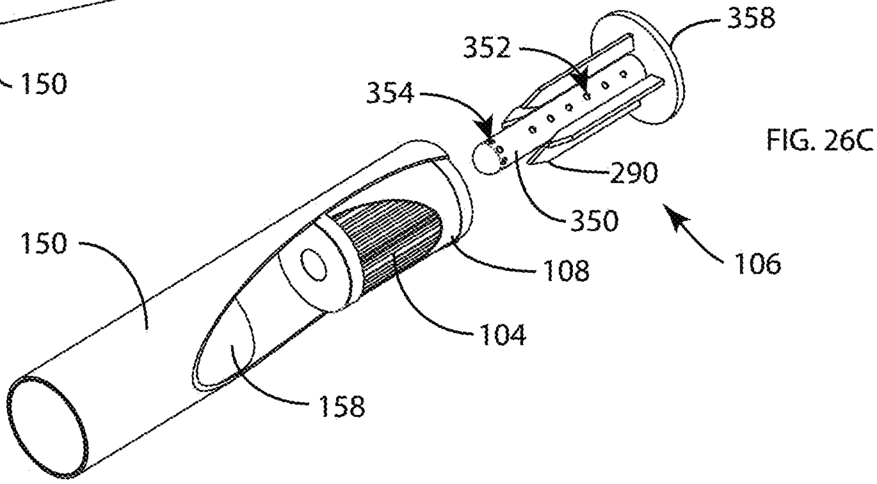
Figure 26D:
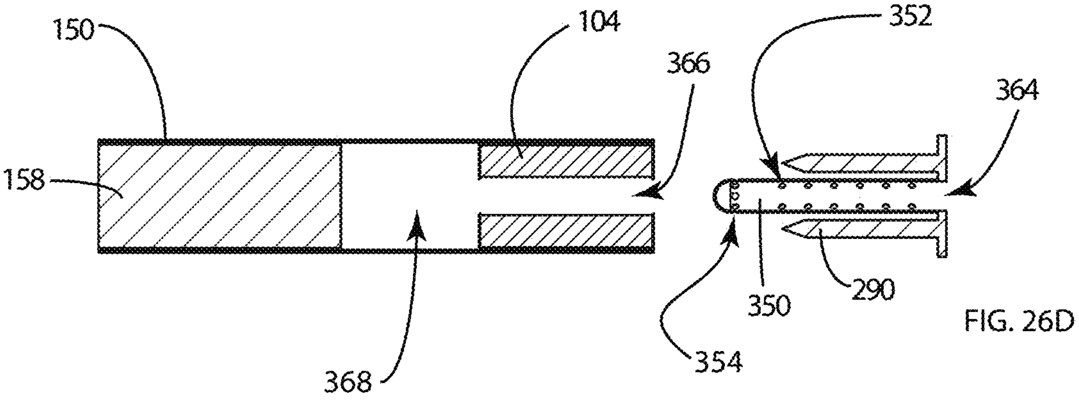
FIG. 26D shows a cross-sectional view of the embodiment of the consumable-containing package shown in FIGS. 26A-C cut along it longitudinal axis.
Figure 26E:
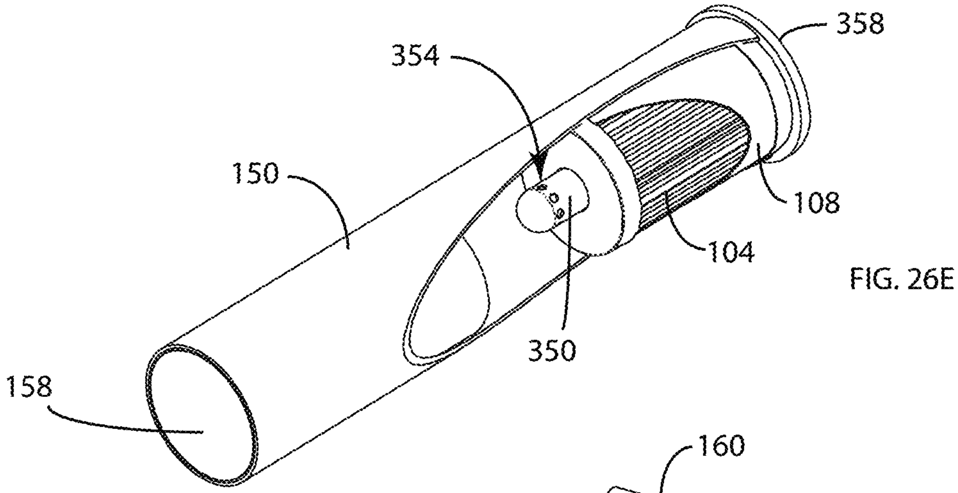
FIG. 26E shows a partial cutaway view of the embodiment shown in FIG. 26A after insertion of the susceptor.
Figure 26F:
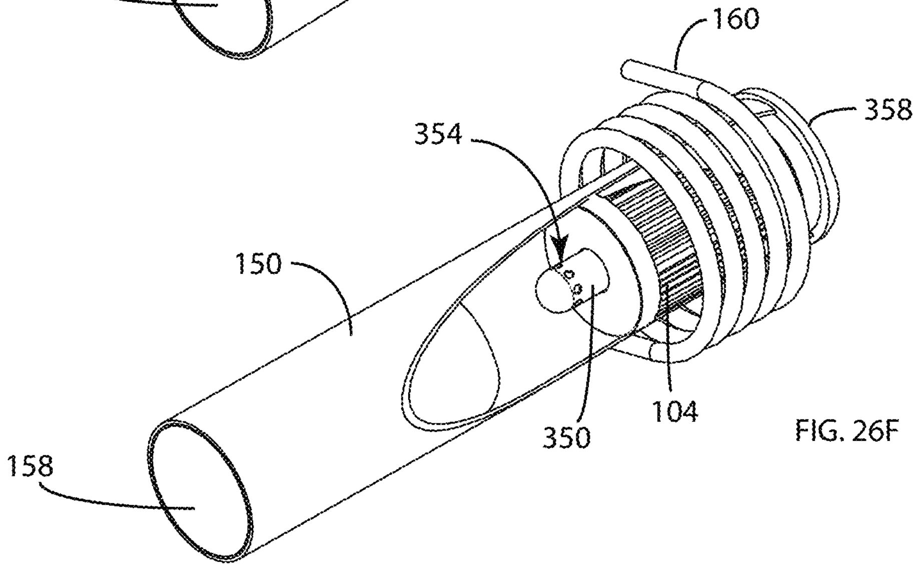
FIG. 26F shows the partial cutaway view shown in FIG. 26E with a heating element wrapped around the consumable-containing package.
Figure 26G:
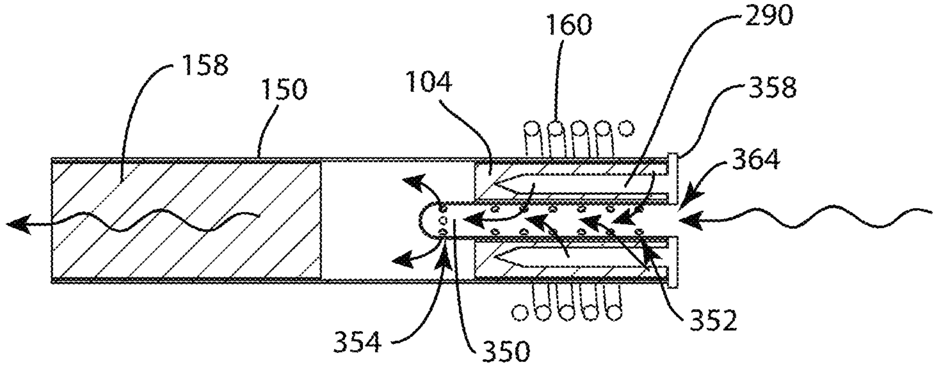
FIG. 26G shows a cross-sectional view of the embodiment of the consumable-containing package shown in FIG. 26F cut along it longitudinal axis.

As shown in FIG. 26G, in use, when the susceptor prongs 290 are heated, the aerosol generated enters through the inlets 352 of the hollow prong 350 and exits through the outlets 354 and into the mouthpiece 158 as shown by the airflow arrows.

Aerosol produced by the methods and devices described herein is efficient and reduces the amount of toxic byproducts seen in traditional cigarettes and other heat-not-burn devices.

Example

Figure 24B:
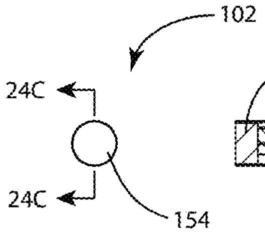
FIG. 24B shows an end view of the embodiment in FIG. 24A.
Figure 24C:
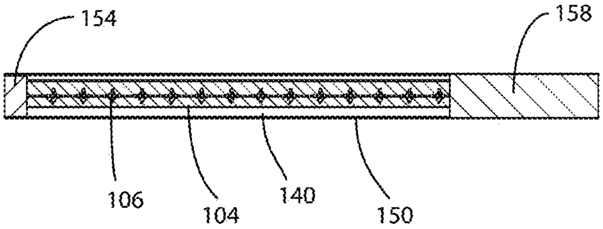
FIG. 24C shows a cross-sectional view taken through line 24C-24C shown in FIG. 24B.
Figure 24A:
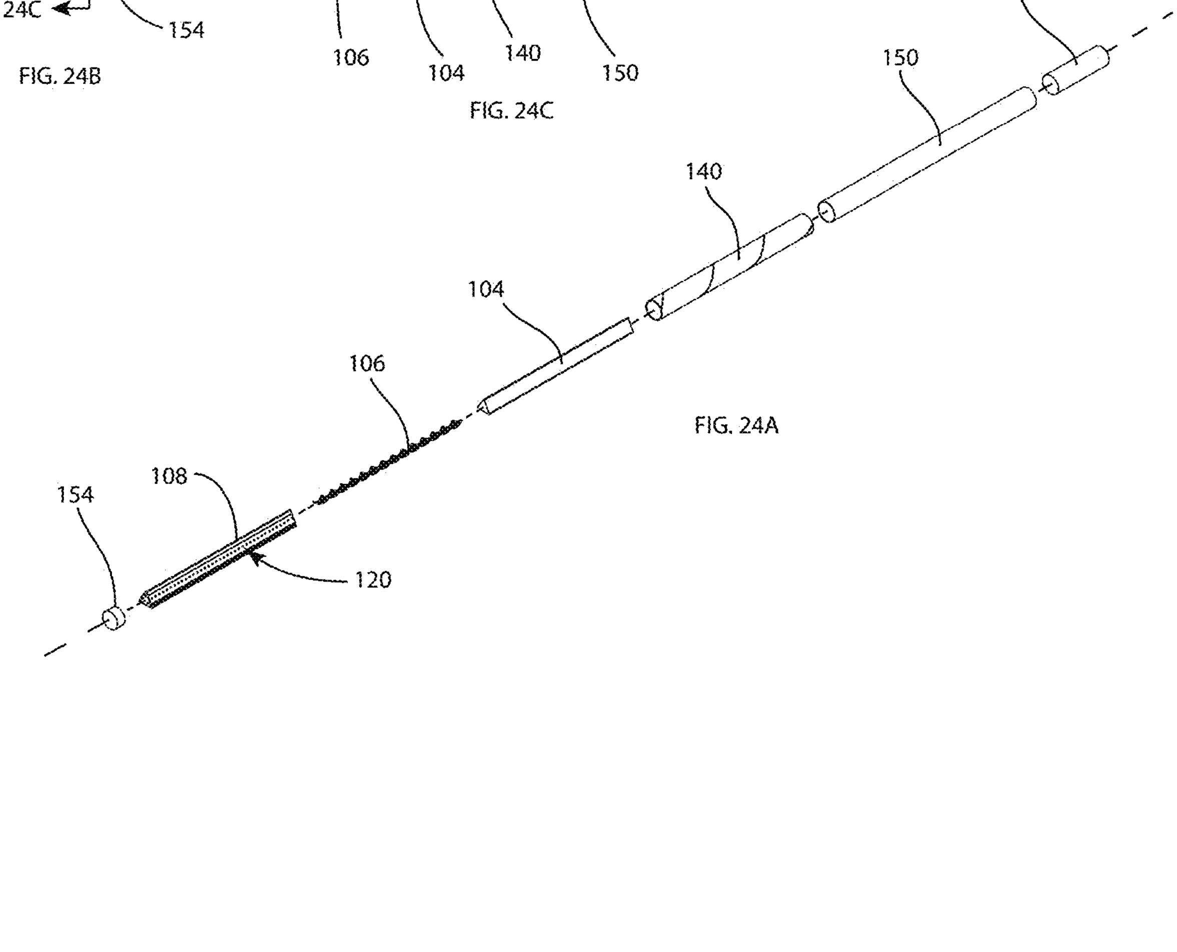
FIG. 24A shows an exploded perspective view of another embodiment of the present invention.

As shown in FIGS. 24A-C, testing was conducted on consumable-containing packages 102 that were prepared by compressing powdered tobacco mixed with an humectant and PGA, to form the consumable unit 104, around a susceptor 106, encased in a foil covering as the encasement 108, inserted into a filter tube 140 in such a way that openings 120 were present on three sides as air channels, covered in standard cigarette paper as the housing 150, capped on one end with a high flow proximal filter as the mouthpiece 158 and on the other end with a distal filter tip as the end cap 154. The susceptor 106 is in the form of a metal sheet twisted into a spiral. The consumable-containing unit 104 and the encasement 108 have triangular cross-sections. The filter tube 140 is a spiral paper tube.

The testing in Durham, North Carolina was done with a prototype device that was determined to have heated the susceptor to 611 C (Degrees Centigrade) by virtue of calibrating the electrical power that was used in the testing process.

The Durham test was conducted using a SM459 20-port linear analytical smoking machine and was performed by technicians familiar with the equipment and all associated accessories. Technicians placed three consumable-containing packages 102 in the smoking machine. Each consumable-containing package 102 was then "puffed" 6 times for a total of 18 puffs. The resulting aerosol was then collected on filter pads. The "smoking" regimen was a puff every 30 seconds with 2-second puff duration and a volume of 55 mL collected using a bell curve profile. The analysis of the collected aerosol determined that 0.570 mg of carbon monoxide (CO) was present in the aerosol of each consumable stick, well below the levels at which it could be assumed that combustion has occurred, despite the fact that it is generally assumed that combustion will occur at temperatures greater than 350 C.

A second set of tests was conducted in Richmond, Virginia The Richmond tests were done with a similarly configured consumable-containing package 102 and a prototype device that was calibrated to heat a susceptor 106 at three separate settings of 275 C, 350 C and 425 C. CO data was generated by Enthalpy Analytical (EA) (Richmond, Virginia, USA), LLC in accordance with EA Method AM-007. Consumable-containing packages 102 were smoked using an analytical smoking machine following the established, Canadian Intense smoking procedure. The vapor phase of the smoke (i.e. aerosol) was collected in gas sampling bags attached to the smoking machine configured to the requested puffing parameters. A non-dispersive infrared absorption method (NDIR) is used to measure the CO concentration in the vapor phase in percent by volume (percent vol). Using the number of consumable-containing packages 102, the puff count, the puff volume, and ambient conditions, the percent CO was converted to milligrams per consumable-containing package (mg/cig).

At the calibrated temperature settings it was determined that no CO was found to be in the aerosol produced at each of the settings, despite the fact that it is generally assumed that combustion will occur at temperatures greater than 350 C.

The tests conducted are industry standard tests. In similar industry standard tests, commercially available heat-not-burn products report CO at 0.436 mg/cig. Standard combustible cigarette reports CO at 30.2 mg/cig.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method of manufacturing a device for generating aerosol, comprising a. embedding a susceptor into a consumable-containing unit;

b. placing the consumable-containing unit and the susceptor into an encasement, wherein the encasement has a first end and a second end opposite the first end, wherein the encasement comprises an opening;

c. placing the encasement into a filter; and d. placing the filter containing the encasement into a housing.

2. The method of claim 1, further comprising applying a coating onto the opening.

3. The method of claim 1, wherein the consumable-containing unit is pressed into a pellet to minimize oxygen within the pellet.

4. The method of claim 3, wherein the consumable-containing unit is mixed with an additive to minimize oxygen within the pellet.

5. The method of claim 4, further comprising placing a plurality of encasements stacked inside the filter.

6. The method of claim 5, wherein the encasements are separated from each other by a fold created in one or more ends of the encasement.

7. The method of claim 6, further comprising providing a heating element to heat the susceptor and a self-resonant oscillator for controlling the heating element.

8. The method of claim 7, wherein the heating element is configured to heat the susceptor to a temperature of 400 degrees C. or higher.

9. A device for generating aerosol, comprising:

a. a consumable-containing unit;

b. a susceptor embedded within the consumable-containing unit;

c. a heating element configured to at least partially surround the consumable-containing unit and configured to heat the susceptor to a temperature of 400 degrees C. or higher;

d. a controller to control the heating element;

e. a case to contain the consumable-containing unit, the susceptor, the heating element, and the controller; and f. a self-resonant oscillator for controlling the heating element wherein the self-resonant oscillator comprises a capacitor operatively connected to the heating element, wherein the heating element comprises a plurality of coiled wires each coiled wire operatively connected to the controller for activation independent of the other coiled wires.

10. The device of claim 9, wherein the consumable-containing unit is pressed into a pellet to minimize oxygen within the pellet.

11. The device of claim 10, wherein the consumable-containing unit and the susceptor are enclosed in an encasement, wherein the encasement comprises openings, and the openings are covered with a coating.

12. The device of claim 11, wherein the heating element is configured to move relative to the consumable-containing unit.

13. The device of claim 12, wherein the susceptor is a multi-pronged susceptor.

14. A device for generating aerosol, comprising:

a. a consumable-containing unit;

b. a susceptor embedded within the consumable-containing unit;

c. a heating element configured to at least partially surround the consumable-containing unit and configured to heat the susceptor to a temperature of 400 degrees C. or higher;

d. a controller to control the heating element; and e. a case to contain the consumable-containing unit, the susceptor, the heating element, and the controller, wherein the heating element is moveable, wherein the consumable-containing unit is an elongated member defining a first longitudinal axis, and wherein the heating element is configured to move axially along the first longitudinal axis.

15. The device of claim 14, wherein the consumable-containing unit comprises a cylindrical magnet at one end of the consumable-containing unit, the cylindrical magnet defining a second longitudinal axis, wherein the heating element is a cylindrical coil wrapped around the consumable-containing unit, the cylindrical coil defining a third longitudinal axis, wherein the cylindrical magnet and the heating element are configured to maintain collinear alignment of the second longitudinal axis with the third longitudinal axis.

16. The device of claim 14, wherein the susceptor is a multi-pronged susceptor.

17. The device of claim 16, wherein the heating element is configured to rotate about the consumable-containing unit.

18. The device of claim 17, wherein the multi-pronged susceptor comprises a plurality of prongs parallel to each other and embedded within the consumable-containing unit.

19. The device of claim 18, wherein the consumable-containing unit is an elongated member defining a first longitudinal axis, wherein the heating element is a coil wrapped around the consumable-containing unit to form a cylinder defining a second longitudinal axis, and wherein the heating element is configured to rotate about the consumable-containing unit in an eccentric path such that the second longitudinal axis aligns collinearly with each of the prongs of the multi-pronged susceptor at some point during the rotational movement of the heating element about the consumable-containing unit.

20. The device of claim 16, wherein the consumable-containing unit is an elongated member defining a longitudinal axis, and wherein the heating element is configured to move radially relative to the longitudinal axis.

* * * * *